(12) United States Patent
De et al.

(10) Patent No.: US 10,670,334 B2
(45) Date of Patent: Jun. 2, 2020

(54) HIGHLY COST EFFECTIVE TECHNOLOGY FOR CAPTURE OF INDUSTRIAL EMISSIONS WITHOUT REAGENT FOR CLEAN ENERGY AND CLEAN ENVIRONMENT APPLICATIONS

(71) Applicants: Dilip Kumar De, Mansfield, TX (US); Idowu Ayodele Oduniyi, Ikeja (NG)

(72) Inventors: Dilip Kumar De, Mansfield, TX (US); Idowu Ayodele Oduniyi, Ikeja (NG)

(73) Assignees: Dilip Kumar De, Mansfield, TX (US); SUSTAINABLE GREEN POWER INDUSTRIES

( * ) Notice: Subject to any disclaimer, the term of this patent is extended or adjusted under 35 U.S.C. 154(b) by 97 days.

(21) Appl. No.: 15/915,007

(22) Filed: Mar. 7, 2018

(65) Prior Publication Data
US 2019/0170436 A1    Jun. 6, 2019

Related U.S. Application Data

(60) Provisional application No. 62/593,828, filed on Dec. 1, 2017.

(51) Int. Cl.
| | |
|---|---|
| *F25J 3/06* | (2006.01) |
| *B01D 53/00* | (2006.01) |
| *B01D 46/12* | (2006.01) |

(52) U.S. Cl.
CPC .............. *F25J 3/062* (2013.01); *B01D 46/12* (2013.01); *B01D 53/002* (2013.01); *F25J 3/066* (2013.01); *F25J 3/067* (2013.01); *F25J 3/0665* (2013.01); *F25J 3/0695* (2013.01); *F25J 2205/20* (2013.01); *F25J 2205/84* (2013.01); *F25J 2205/86* (2013.01); *F25J 2210/70* (2013.01); *F25J 2215/14* (2013.01); *F25J 2215/80* (2013.01); *F25J 2220/02* (2013.01); *F25J 2220/80* (2013.01); *F25J 2220/82* (2013.01); *F25J 2220/84* (2013.01); *F25J 2230/20* (2013.01); *F25J 2230/30* (2013.01); *F25J 2240/02* (2013.01); *F25J 2260/44* (2013.01); *F25J 2260/80* (2013.01); *F25J 2270/42* (2013.01); *F25J 2270/80* (2013.01); *F25J 2290/30* (2013.01); *F25J 2290/44* (2013.01)

(58) Field of Classification Search
CPC .. F25J 3/062; F25J 3/0665; F25J 3/067; F25J 3/0695; F25J 2205/84; F25J 2205/86; F25J 2210/70; F25J 2215/14; F25J 2215/80; F25J 2220/02; F25J 2230/20; F25J 2240/02; F25J 2260/80; F25J 2270/42; F25J 2270/80; B01D 46/12; B01D 53/002
USPC .......................................................... 62/617
See application file for complete search history.

(56) References Cited

U.S. PATENT DOCUMENTS

| | | | |
|---|---|---|---|
| 139,543 A | | 6/1873 | Childs |
| 4,255,926 A | * | 3/1981 | Heyn ............... F01K 23/067 60/39.12 |

(Continued)

*Primary Examiner* — Justin M Jonaitis

(57) ABSTRACT

A cryogenic technology for the cost-efficient capture of each known component of emissions, such as carbon dioxide, sulfur oxides, nitrogen oxides, carbon monoxide, any other acid vapor, mercury, steam, in a liquefied or frozen/solidified form, and unreacted nitrogen (gas) from industrial plants, such that each of the components is captured separately with minimum use of energy and is industrially useful.

20 Claims, 11 Drawing Sheets

(56) References Cited

U.S. PATENT DOCUMENTS

| | | | | |
|---|---|---|---|---|
| 4,403,575 A | * | 9/1983 | Kral | F22D 1/12 |
| | | | | 122/20 B |
| 4,543,110 A | * | 9/1985 | Engelhardt | B01D 53/48 |
| | | | | 423/242.1 |
| 5,435,975 A | * | 7/1995 | Bastos | B01J 19/14 |
| | | | | 422/168 |
| 5,569,436 A | * | 10/1996 | Lerner | B01D 53/64 |
| | | | | 110/235 |
| 5,618,506 A | | 4/1997 | Sujuki | |
| 5,732,571 A | * | 3/1998 | Maerz | B01D 53/002 |
| | | | | 62/611 |
| 5,887,418 A | * | 3/1999 | Bruckner | F01K 23/106 |
| | | | | 60/783 |
| 6,062,017 A | * | 5/2000 | Liebig | F01K 23/106 |
| | | | | 60/39.182 |
| 8,506,914 B2 | | 8/2013 | Bara | |
| 9,410,736 B2 | | 8/2016 | Baxter | |
| 2008/0209807 A1 | * | 9/2008 | Tsangaris | C10J 3/20 |
| | | | | 48/89 |
| 2008/0210089 A1 | * | 9/2008 | Tsangaris | C10J 3/00 |
| | | | | 95/90 |
| 2008/0314726 A1 | * | 12/2008 | Choros | C10B 53/00 |
| | | | | 202/105 |
| 2017/0158504 A1 | * | 6/2017 | Merritt, Jr. | C01B 3/56 |

* cited by examiner

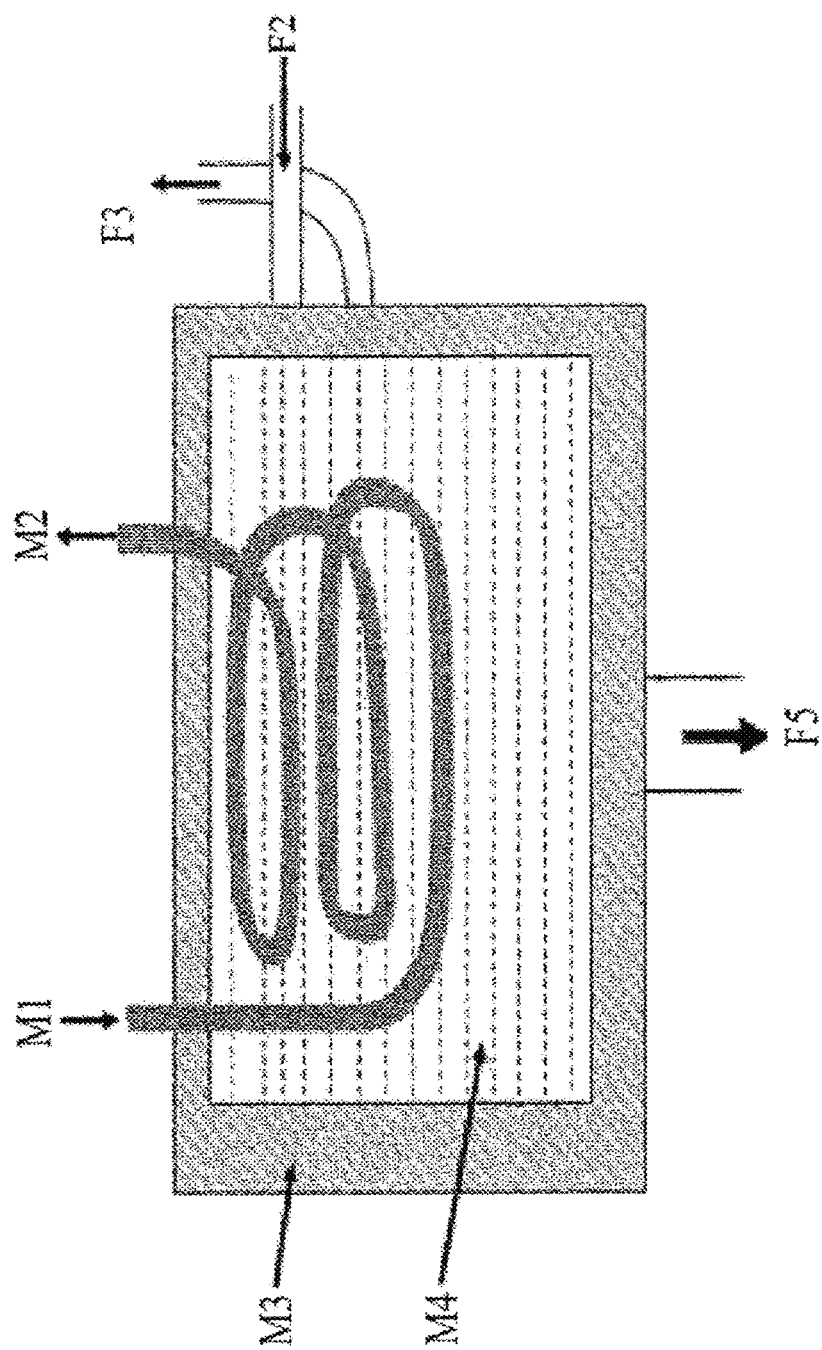

HIGHLY COST EFFECTIVE TECHNOLOGY FOR CAPTURE OF INDUSTRIAL EMISSIONS WITHOUT REAGENT FOR CLEAN ENERGY AND CLEAN ENVIRONMENT APPLICATIONS

FIELD OF INVENTION

This invention relates to the cost effective and energy efficient capture of components of emissions (toxic acid gases, mercury, $CO_2$, CO, unreacted nitrogen) contained in the flue gases from power plants and industries in general, without the use of any chemical/reagent (except water) [after removal of fly ashes and mercury oxides]. This invention primarily relates to coal and natural gas power plants, cement and steel plants where carbon based fuel is burnt using air. However, when such fuel is burnt using predominantly oxygen or oxygen rich air, such invention would be useful too for cost effective capture of $CO_2$. This new technology is based on (i) the fractional condensation of each component gas at appropriate temperature through compression, cooling with cold nitrogen gas (which is major component a flue gas) obtained at the end of the third and isentropic turbine expansion; (ii) generation of auxiliary power from the heat of the flue gas to make the process energy efficient and further cost effective; (iii) work obtained from turbine expansion is used for the compression of the gases to reduce the net energy needed to compress the gases; (iii) scientific analysis of application of the techniques to two specific cases of power generation using coal and natural gas. More particularly, this invention relates to the applications for clean energy generations by coal and natural gas power plants and for clean environment.

BACKGROUND OF THE INVENTION

Electric power plants and cement factories release flue gas that contains large amount of pollutants[1-50] (carbon dioxide ($CO_2$, $NO_x$ (Nitrogen oxides), (x=0.5, 1, 1.5, 2, 2.5), $SO_x$ (sulfur oxides), (x=2, 3), mercury (Hg) and oxides of Hg, volatile organic compounds (VOCs), soot and particulate matters (PM) along with hot steam and unreacted nitrogen to the atmosphere. The pollutants (except steam and nitrogen) cause environmental pollution and contribute to global warming[10-15]. Literature abounds on the nature, amount, the effects on health and environment of these emissions, the current state-of-the-art technologies for capturing these emissions, the cost implications to control the emissions in part or full. By studying a number of such literatures [Refs. 1-50, Refs Z1-Z33], we find that:

(i) There is no single technology that can remove/capture, with one installed equipment that can be connected as bolt-on to an industrial plant, for capture of flue gas emission components, such as mercury (Hg) and oxides of Hg, sulfur oxides, nitrogen oxides, acid vapors in general, carbon dioxide, carbon monoxide from flue gas of coal and natural gas power plants and industrial plants in general;

(ii) The cost of installation of the different equipment needed for removal/capture of individual component is too high for many countries in the world to afford and even in the USA not all plants can easily be retrofitted with existing clean energy (or full emission capture) equipment, because of high installation and operational costs involved (which can be seen in the cited literature);

(iii) Even the most modern coal gasification project with carbon capture technology, known as the Kemper Project in Mississippi[Z23], which was supposed to be in service by May 2014, at a cost of $2.4 billion was still not in service and the cost had increased to $7.5 billion[Z24]

(iv) The cryogenic techniques [46,47,35,42]] investigated so far have been found to be very energy intensive and have not so far addressed the techniques of separation of various individual toxic component of the flue gas and has mostly focused on separation of $CO_2$ at costs much higher than the state-of-the art amine technology employed for capture of $CO_2$. These are found to be not commercially viable for large scale capture of $CO_2$ and capture of other individual components of flue gas.

(v) The cost of $CO_2$ capture with current state-of-the-art amine technologies of $CO_2$ capture is still very high [41-48,50]. The storage and retrieval of the gaseous $CO_2$ is quite tedious apart from huge cost involved, as it requires transportation of the captured $CO_2$ to empty oil or coal fields underground.

(vi) Environmental pollution from such plants [4-7,16-21, 36,38-40,50,] is increasing globally and global warming is becoming a threat for humanity, specially, when demands & usage for and uses of fossil fuel power continues to increase globally.

Emissions of SOx ($SO_3$, $SO_2$), NOx ($N_2O$, NO, $NO_2$) causes serious health and environmental hazards[16-21, 36,38]. There are technologies developed to capture these components at the industrial plants. Such technologies, such as FGD (flue gas desulphurization, selective catalytic reaction (SCR), selective non-catalytic reaction (SNCR) and many others are highly costly[16-21, 36,38-40,50] for most of the countries to afford.

(vii) Emission of mercury from coal power plants poses serious health threats and current technologies to capture Hg from the flue gas is very expensive[1,2, 29-30].

(viii) Thus, there is a need to develop a new technology which is very cost effective and energy efficient so that one installed equipment can capture/remove all (nearly 100%) the toxic components like $SO_x$, $NO_x$, Hg, CO and carbon dioxide from coal power and other industrial plants such that the removed components can find industrial uses and the cost effective technology/equipment can be employed even in countries which currently do not employ any emission capture technology. Moreover, the new technology would be such that it allows capture of these items in a form or forms that can easily be stored and retrieved when needed for uses. This is where our new emission capture invention excels over all existing state-of-the-art emission capture technologies that can be retrofitted to industrial plants but at very high costs. The new technology is very cost effective with very low operational costs as it does not require any reagent/chemical and requires significantly lower energy per ton of pollutant capture than any existing technology. Moreover, our new technology captures the above items in forms that are very easy to store.

OBJECTS OF THE INVENTION

Therefore, an object of the invention is to provide a new cryogenic technique that can capture each component of the gaseous emissions (flue gas) from power plants, cement plants and industries in general without the use of any chemical or reagent (except fixed amount of water) and with minimum energy usage, high efficiencies and at low cost not heretofore possible. Still another object is to provide a method of separating and capturing each component of the flue gas [mercury, steam, $SO_3$ (sulfur trioxide), $SO_2$ (sulfur dioxide), $N_2O$ (nitrous oxide), NO (nitric oxide), $NO_2$ (nitrogen dioxide), $CO_2$ (carbon dioxide), CO (carbon monoxide), unreacted nitrogen] from power plants individually in pure form (such that each captured component itself is industrially useful) with one single equipment which is much easier to apply and which produces results, not possible by any technology before. Another object is to capture the heat of the flue gas for production of auxiliary power in an efficient way so as to improve the cost effectiveness and energy efficiency further. Another object is to reduce the net compression work on gasses as much as possible through innovative ways, so that the net energy of capture becomes the lowest in comparison to the emission capture technologies that exist today. A final object is to provide an improved apparatus/equipment capable of employing cryogenic technique with auxiliary power generation from the flue gas heat and use of cooled nitrogen gas produced at the end of the third turbine expansion corresponding to step 15, to capture each said component of the flue gas emission from industries in general and to utilize the turbine expansion work to reduce the work needed for compression of gasses in earlier stage such that the capture is performed in most cost effective and energy efficient way, and in forms such that the captured components find industrial applications and can easily be stored.

SUMMARY OF THE INVENTION

This invention is a process by which emission gasses from power plants and industries in general are fractionally condensed using a series of heat exchangers, compressors and expansion valves, to separate, capture and store the constituents (oxides of sulfur and nitrogen, metals including Hg, carbon monoxide (CO) and most importantly, carbon dioxide ($CO_2$)) using no chemicals but lowest amount of electrical energy and fixed amount of water (the fixed amount of water can be repeatedly used). The power required for this is augmented with an ammonia power plant for very high energy efficiency and relatively very low cost.

The objects stated above are attained using methods that include cryogenic technique for capture of individual component of an industrial flue gas comprising the steps of:
(a) Capture of the heat of flue gas from the power plants and industrial plants in general for the generation of auxiliary power using anhydrous ammonia turbine.
(b) Separation of ashes, soot, mercury oxides. from the said flue gas by first using ceramic filters, conventional fabric filter and electrostatic precipitator of conventional technologies.
(c) Capture of partial $SO_3$ and partial mercury through heat exchange in the process of said turbine expansion (step (a)).
(d) Capture of $SO_3$, mercury and steam of the flue gas through compression and cooling in a coil immersed in a water tank which is cooled by passing cold nitrogen gas (of the said flue gas) obtained at the end of the third turbine expansion (step 15) through tubes immersed in water so that a fixed amount of water is maintained at a specified temperature for this capture.
(e) Capture of $NO_2$ and remaining steam of the said flue gas through compression and cooling of the said flue gas in the said similar coiled tubes and tank at specified temperature.
(f) Capture of $SO_2$ of the said flue gas by further compression from step (e) and cooling in a tank containing heat conducting blackened pebbles or metal chips and helium gas, the tank being cooled at a specified temperature by flowing the said cold nitrogen gas (obtained at the end of the operation).
(g) Capture of $CO_2$ of the flue gas in the form of cold liquid $CO_2$ ($LCO_2$) after step (f) by further compression and cooling in another said similar tank.
(h) Conversion to dry ice by throttling said $LCO_2$ of step (g) in a flash chamber and cooling the remaining flue gas (after operation g) by flowing cooled $N_2$ gas obtained at the end of third turbine (T3) expansion (step 15) into the said chamber.
(i) Further cooling of the flue gas of step (14) (specification) containing mostly $N_2$ and small percentage of NO, $N_2O$ and CO by the cold $N_2$ gas exiting the said chamber.
(j) By first, second and third stage of isentropic turbine expansion of the compressed flue gas remaining after step (i) to condense, $N_2O$, NO and finally CO each separately into appropriate chambers (tanks) cooled by flow of the said cooled $N_2$ [(obtained at the end of the third turbine expansion following capture of CO.]
(k) Using the turbine expansion work at step (j) of compressed flue gas to drive some of the shafts of earlier compressors.
(l) Using the super-cooled $N_2$ gas (of the flue gas) obtained at (j) to cool the flue gas at earlier stages of operation as mentioned in (a) to (k).

The methods associated with steps (a) to (l) ensure:
Capture of $CO_2$, $SO_x$, $NO_x$ and mercury contained in the flue gas from coal and natural gas fired power plants and industries in general, at costs much lower than any existing current technology could allow.
The most cost effective and energy efficient means of capturing large volumes of $CO_2$ of the flue gas from power plants and industrial plants in general and conversion to cold liquefied pure $CO_2$ and dry ice, which are sources of pure $CO_2$ and which can find large industrial applications currently and in future.
The most cost effective and energy efficient means of obtaining pure $N_2$ gas from the flue gas of power plants.
The most cost-efficient means of mitigating global warming and environmental pollution arising out of the flue gas from power plants and industries in general.

The above methods are supported by scientific analysis of the energy requirement for capture and liquefaction of $CO_2$ and super cooling of unreacted nitrogen gas of the flue gas, using data in two specific examples of power generation. Detailed methods of scientific analysis of the net energy requirement and the cost involved in two specific examples for the steps g through l (which are described in details in section I) are included in this invention. The estimated cost of capture $CO_2$ in liquefied and or frozen form includes cost of capture of the toxic components also.

This invention is limited to capturing the components of the flue gas coming out of power plants using coal or natural gas. It does not cover any way the technology of producing the main power by the plants most of which are already known in the existing arts.

The coil F7 is designed such that the desired component of the flue gas (say, e.g., $SO_2$ or $CO_2$) condenses rapidly as the flue gas cools down to specific temperature at specific pressure, as described in the steps in the specification, while the uncondensed part of the flue gas (in part G8) flows to other heat exchangers and the condensed part (G10 (FIG. 7) flows to a collector pot G15. This is necessary so that the condensed part does not block the flow of the uncondensed flue gas to move from one part of the tube to the other part and finally to another heat exchanger.

Figure 7:
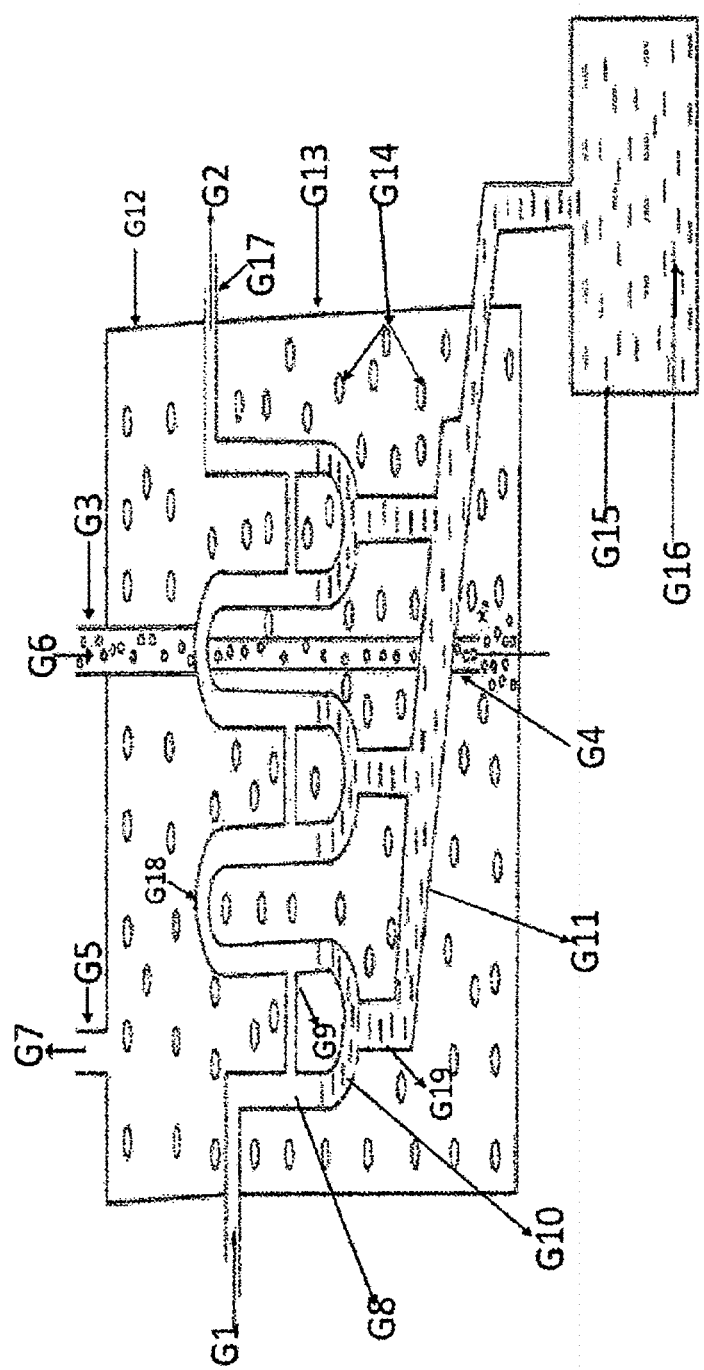
FIG. 7 is a sectional view of flue gas tube G8 inside an insulated chamber, G12 (heat exchanger of type 2) to condense each component of flue gases separately. The flue gas tube G8/G18 (through which the flue gas passes) is made of several U-tubes. The arms of two adjacent U-tubes in the flue gas tube are connected arms by a bent tube (FIG. 7). The two arms a U-tube are connected by a short straight tube G9. The bottom part of each U-tube is connected to a long pipe, G11, kept at slanting position, by a short straight tube G19. The equipment is used several times in the capture processes described in this invention. The design of heat exchanger depends on the nature of captured items as follows: A. For collection of steam, $SO_3$, Hg, HCl, $NO_2$ the tubes of FIG. 6 or FIG. 7 (without pebbles) are immersed in water (FIG. 11) (not shown in FIG. 7) inside the chamber (type I) and the water M4 (FIG. 11) is cooled by controlled amount of cold nitrogen gas passing through many turns of a coil of a heat conducting tubes (not shown in FIG. 7) connecting port G3G4 with port G5. Water (M4—FIG. 11) in the chamber is then stirred (not shown in FIG. 7). B. For collection of liquefied $SO_2$, $CO_2$, $N_2O$, NO, CO, each separately (all with boiling point below 0 C), the heat exchanger chamber (type II) does not contain any water and instead, either of the following arrangements (C & D) is made. C. (i) Instead of water, the chamber contains heat conducting dust free and dry pebbles (G14) or metal chips arranged in perforated racks horizontally placed (not shown in FIG. 7) such that the racks surround the tubes carrying the flue gas (G1). The cold nitrogen gas (G6) is passed through the tube G3 and comes out of the open end G4 of the said tube. The cold nitrogen gas (G17) fills up the chamber and cools the flue gas carrying tube (G18)(FIG. 7) as well as the pebbles/metal chips (G14) which retain the coldness. The nitrogen gas (G7) vents out through the port (G5) which is connected to the port of another heat exchanger. Its (i.e., the nitrogen gas's) flow rate and pressure inside the chamber (FIG. 7) are measured by pressure gauge and flow meter (not shown). D. In an alternate arrangement, the tube coil (not shown in FIG. 7) carrying cold nitrogen gas surrounds the flue gas carrying tube-coil G18 (FIG. 7). In such case the chamber G13 contains helium gas at pressure 1.5 to 2 bar. Helium gas enhances the heat transfer ~41% (compared to air) between the flue gas carrying coil and the cold nitrogen gas carrying coil. The helium is circulated inside the closed chamber G13 of FIG. 7 by fan (not shown in FIG. 7) to further increase the heat transfer rate. The external surface of both the tubes are painted black to increase heat transfer between the two. In this second alternative, while the conducting pebbles help retain the low temperature produced by the said cold nitrogen, the helium gas speedily conducts away the heat from the surface of the flue gas tubes to the conducting pebbles and the tubes carrying the said cold nitrogen gas. The said cold nitrogen gas G7 (obtained from the flue gas at the end of the in step 15) enters through the port G3 and then passes through the said coils of beat conducting tubes connecting G3 and G4, inside the chamber; it finally exits through G4. For any of the arrangements the chamber is air tight and water leak-proof when water is used. The second arrangement D is preferred if very pure nitrogen gas is to be collected at the exit point near a-$b_1$ in FIG. 1. The arrangement C is preferred when the nitrogen gas does not find further use near the said exit point and is vented out to air, as it is simple to make. The flow rate and pressure of cold nitrogen gas are controlled using pressure gauge and valve available in markets and already known (not shown in any figure in this invention) in existing arts. The temperature of the flue gas at various heat exchangers is measured using, devices such as resistance or thermocouple (not shown in any Figure in this invention)—digital thermometers already available in markets and already known in existing arts.

With arrangement D, helium gas enables rapid heat exchange between flue gas tube G18 and the cold nitrogen gas through tubes connecting ports G3 and G5 (FIG. 7). The heat exchange can be further enhanced by using a small fan (not shown in FIG. 7) that will circulate the helium gas throughout the chamber, and thereby increasing the heat exchange rate. For good insulation, the inner walls of the chamber are coated with reflecting materials and the outside walls contains alternate layers of shining aluminum sheets and Styrofoam or polyurethane or any material with low thermal conductivity (0.02-0.03 W/m·K). This device is the heat exchanger referred to many times for capturing components of flue gas with boiling point temperature below 0 C FIG. 1 and in the descriptions of methods, claims etc. contained in this disclosure of invention. The tubes carrying cold nitrogen inside the chamber would be made of copper or any metals of good thermal conductivity such as aluminum and the external surface of the tubes coated black paint.

The part of the cold nitrogen lines outside a heat exchanger is wrapped with insulating sheet of polyurethane. The helium gas in arrangement D enables good heat conduction between the flue gas tube and cold nitrogen gas tube. [Z11]. It has been seen by Jiang et al (Z11) that helium filled chambers enhances heat conduction (transmission) by 41% compared to air filled chamber. Even though hydrogen has slightly higher thermal conductivity (0.18 W/m·K) than that (0.15 W/m·K) of helium (Z12), it is not chosen as the filling gas of the chamber G13 (FIG. 7), because it is explosive. The thermal conductivity of helium (0.15 W/m·K) is much higher than that (0.026 W/m·K) of air. Helium will thus facilitate better heat conduction than with air inside. A small fan inside the chamber operated by a solar power circulates the helium gas throughout the chamber and thus will further enhance the heat exchange rate in chamber of FIG. 7 when used for steps 10-15.

Both the tubes described above are made of copper (thermal conductivity $K_{th}$=~450 W/m·K at temperatures between 300 K and 77 K (–196 C) or aluminum ($K_{th}$=205 W/m·K) to capture flue gas components having boiling point below 0 C. Good thermal conduction ($K_{th}$>100 W/m·K) between flue gas and cold nitrogen gas through the walls of the tubes (($K_{th}$>100 W/m·K) is needed for condensation of the components with boiling point below 0 C. To prevent the flue gas tube from toxic effects of flue components, $SO_2$ (sulfur dioxide), $N_2O$ (nitrous oxide), NO (nitric oxide) etc. it is important that the inner wall of the flue gas tube is coated with corrosion resistant coating before the equipment is used. In this invention we found that for the flue gas tube (G18 in FIG. 7) made of aluminum (Kth>100 W/m·K) the inner wall can be coated with $Al_2O_3$ (aluminum oxide) by two techniques: (i) Anodizing and (ii) Plasma Electrolytic Oxidation (PEO) as developed by Keronite. https://blog.keronite.com/5-corrosion-resistant-metal-coatings-compared. We found that a coating thickness 20 to 50 micron which can be grown by these two techniques can protect the Al-metal tube (G18 in FIG. 7) from corrosion due to the said oxide components.

Figure 8:
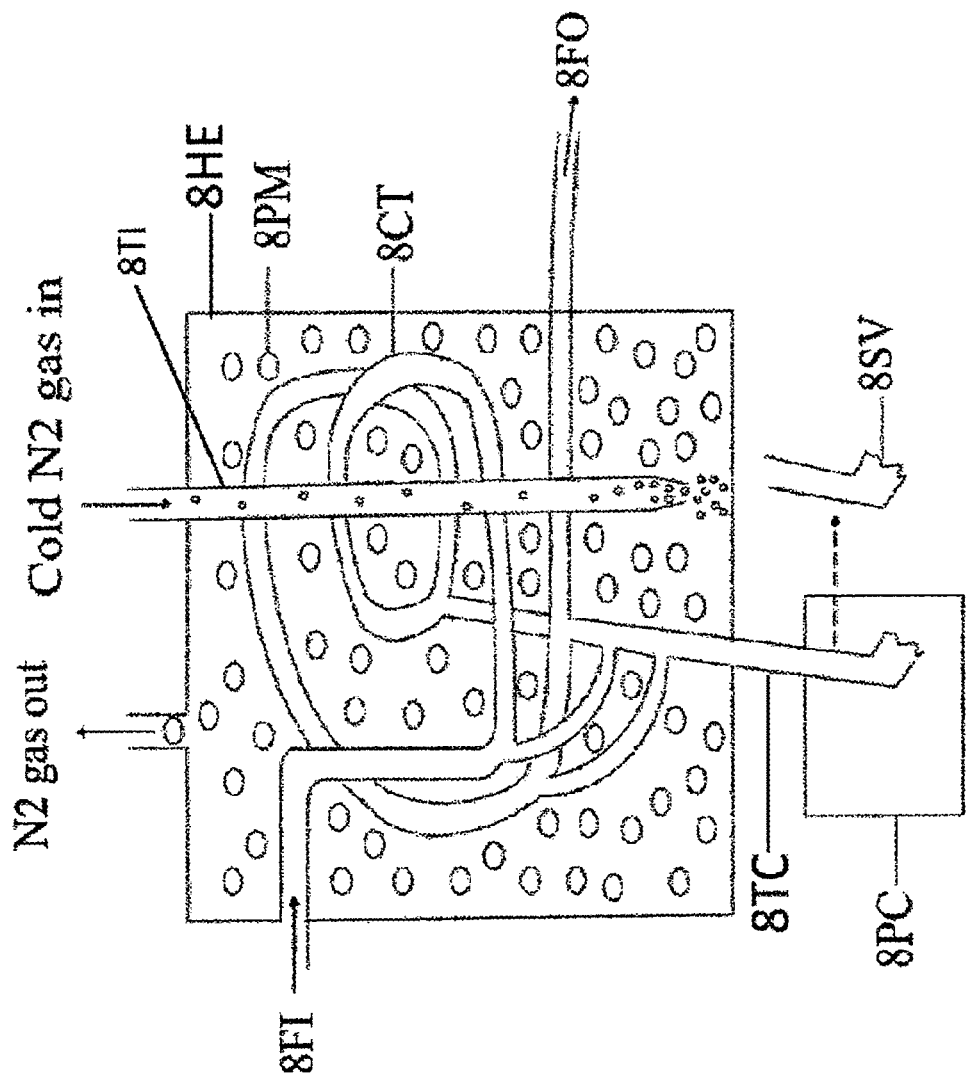

FIG. 8 is a sectional view of another type of coiled tube that also can be used to condense and collect liquefied steam, $SO_3$, Hg, $NO_2$, $SO_2$. The spring 8SV at the end of the lower part of the tube, 8TI prevents escape of the gases when enough liquid is not formed. The flue gas enters as 8FI through one port of the flue gas tube, 8CT, and exits through a port as 8FO. The flue gas tube, 8CT, is surrounded by conducting pebbles or metal chips, 8PM, which are contained in the heat exchanger enclosure, 8HE. Cold $N_2$ gas flows in through one port of the heat exchanger through the tube 8TI. It fills the chamber and cools the pebbles/metal chips and the flue gas tube before exiting out through another port. The desired component of the flue gas condenses in various parts of the tube 8CT and trickles down through the tube 8TI and collects in an external pot, 8PC, when the spring valve, 8SV opens automatically. The valve 8SV opens up when the condensed fluid in the tube 8TI, reaches certain height.

Figure 9:
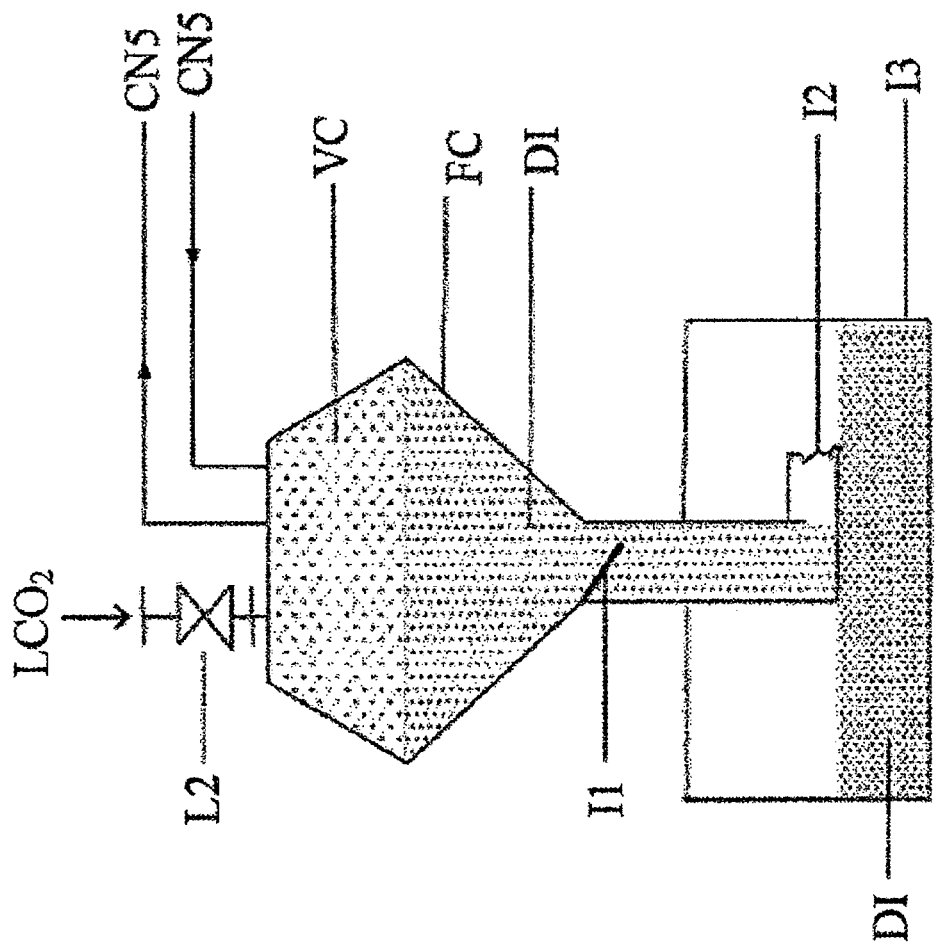

FIG. 9 is a sectional view of a flash chamber for the formation and collection of dry ice. Very cold $N_2$ gas, obtained at the end of the cycle (step 15), is inserted into the chamber to freeze the remaining dry vapor to solid dry ice through one port and exited out after freezing the dry $CO_2$ vapor at –78° C. to solid dry ice. The flash chamber contains a throttle valve which is connected to the insulated chamber collecting liquefied CO, at step 12 in section I.1

Figure 10:
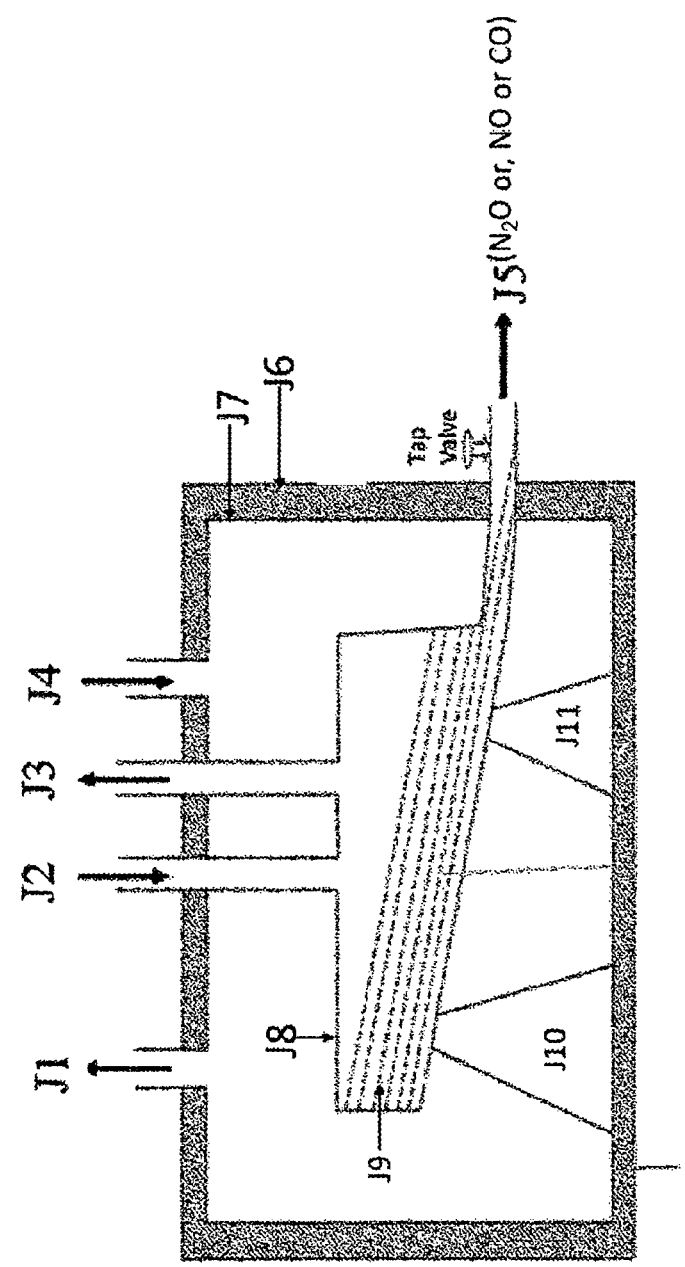

FIG. 10 is a sectional view of condensing chamber for collection of $N_2O$, NO and CO. J8 is the metallic chamber where a specific component, J9 (any one of $N_2O$, NO and CO) is condensed from the flue gas as it enters the port (J2) of the metallic chamber (J8) and leaves J8 through port J3. Cold nitrogen gas enters the insulating chamber (J6) through port (J4) and leaves through port J3. The metallic chamber J8 is supported by insulating stands, J10 and J11. The condensed component is collected as J5, into a pot (not shown) by opening a tap valve. The insulating material (J7) or that used for stands, J10 and J11 has thermal conductivity of 0.03 W/m·K or less. Such materials have been described in the specification. The tap valve is connected to the metallic chamber but outside the insulation of chamber J6. J5 refers to collection of any one of the liquefied components $N_2O$, NO and CO.

FIG. 11. Is a sectional view of heat exchanger used to cool (for components having b.pt above 0 C) compressed flue gas at different steps in this invention. The heat exchanger contains water (M4), which is cooled by controlled flow of cold nitrogen gas [obtained at the end of the expansion of the compressed flue gas by the third turbine (step 15)]. The cold nitrogen gas enters through one port, M1 of a several turns of heat conducting tubes and exits out through a second port, M2. These turns of cold nitrogen carrying tubes surrounds the flue-gas flow tubes of FIG. 6 (not shown in FIG. 11) of which the exit pipe for the condensates passes through the bottom of wall of this chamber, M3. The water is stirred (the stirrer not shown in FIG. 11). The chamber M3 is insulated.

Figure 6:
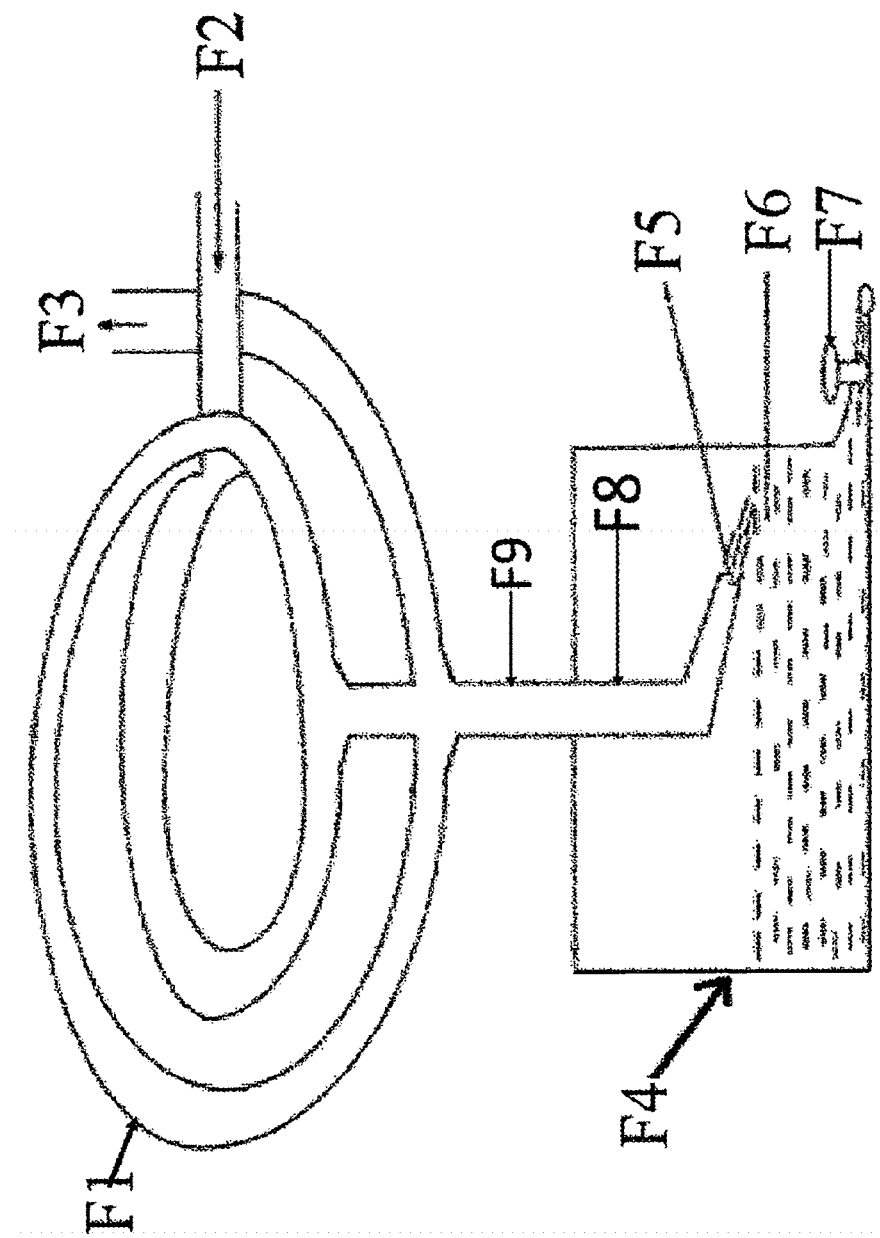
FIG. 6. is a sectional view of the coils of a tube (F1) through which flue gas (F2) passes and for condensation of mercury, steam, $SO_3$ and other components of flue gas with boiling point above 0 C into collection chamber F4; The coiled tube is to be kept inside the heat exchanger of type 1, after fabric filter or before the N-stage compressor in FIG. 1. The arrangement prevents escape of the flue gas during condensation and collection by allowing condensed liquid to trickle down while uncondensed flue gas to pass over. There is a spring valve (F5) that opens when the weight of the condensed liquid (F6) exceeds a limit set by the user and closes automatically when the liquid has dropped down into the collection chamber (F4). There is a tap (F7) to drain out the collected liquid for further use by the industry.

The flue-gas flow tubes of FIG. 6-8 are made of materials that can stand temperature ~300° C., possess high thermal conductivity $$\left( \geq \frac{100\ W}{m \cdot K} \right).$$

and at the same tame non-corrosive to the toxic components of the flue gas. Such materials are described in section I.1 [under title "Protection of equipment from corrosion due to acidic oxides, acid vapors and toxic materials in the flue gas during the entire capture process" before step 1 of the processes of this invention.

Figure 1:
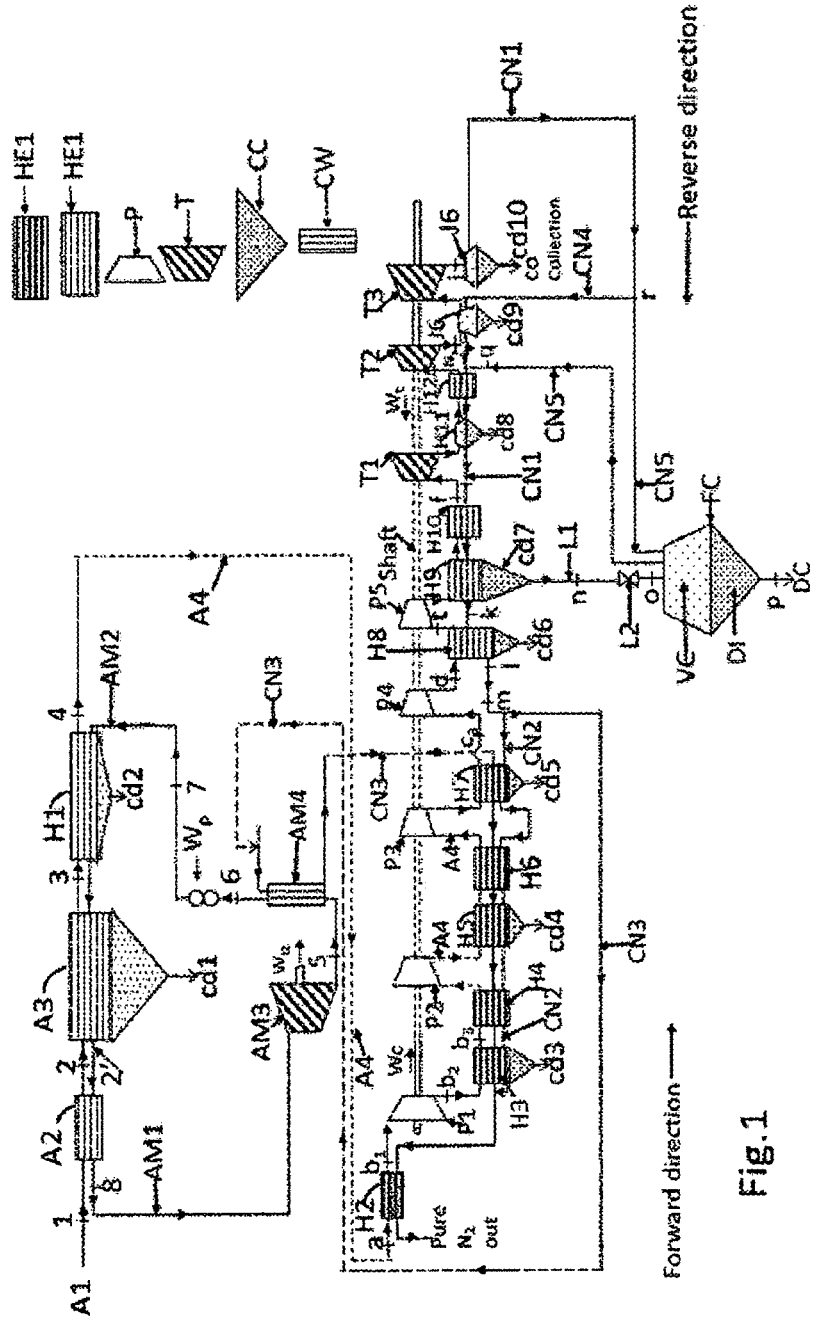
FIG. 1 is a block diagram which shows schematically the main equipment in accordance with the invention for capturing each component of flue gas emissions from power and industrial plants separately. It comprises of (i) $NH_3$ super heater with ceramic filters; (ii) precipitator/fabric filter; (iii) heat exchangers (one for near flue gas temperature and the other for temperature slightly above liquid nitrogen); (iv) $NH_3$ turbine with condenser & pump; (v) partial $H_2O$ and Hg collection chamber; (vi) N-stage compressors with water cooling arrangement using heat exchangers for complete $H_2O/SO_3$/Hg collection; (vii) sections for productions & collections of liquefied $NO_2$, $SO_2$, $CO_2$, and $N_2O$ including arrangement for appropriate heat exchangers; (viii) sections for production and collection of dry ice from liquefied $CO_2$; (ix) triple stage $N_2$ turbine expanders for cooling $N_2$ gas of the flue gas; (ix) NO & CO collection chambers. Symbols: HE1—Heat exchanger with water; HE2—heat exchanger without water; P—compressor; T—Turbine; CC—condenser with collector; CW—condenser with water.

The "reverse direction" of cold nitrogen gas flow as mentioned many times in this invention refers to direction from right to left in with respect to the equipment schematically shown in FIG. 1. The term "the said cold nitrogen gas" in this invention (if defined in place or not) refers to the cold nitrogen gas obtained at the end of the third turbine expansion and this cold nitrogen gas as it flows in reverse direction through different heat exchangers.

TERMINOLOGIES

In this invention, the following terminologies are used with definition/meaning given below:

Power plant—It refers to either a coal power plant or a natural gas power plant that produces electrical power The capture process (s)—specific process(s) described to capture a particular component(s) of the flue gas The chambers of the heat exchangers—the container in which the heat exchanging coils are embedded.

The 'flue gas' in this invention refers to the entire emissions of gaseous products from either a coal or a natural gas fired power plant after the respective fuel such as coal or natural gas is burned. The said components refer to the any one or more of the components of the flue gas which are: from a coal power plant: (i) mercury vapor (Hg), steam ($H_2O$), sulfur trioxide ($SO_3$), sulfur dioxide ($SO_2$), carbon dioxide ($CO_2$), nitrous oxide ($N_2O$), nitric oxide (NO), carbon monoxide (CO), unreacted nitrogen in the flue gas; from a natural gas power plant: steam, carbon dioxide ($CO_2$), nitrous oxide ($N_2O$), nitric oxide (NO), carbon monoxide (CO), unreacted nitrogen in the flue gas;

(i) Directions Forward and Reverse (FIG. 1), Right and Left

In the invention we have used the term forward and reverse, right and left. The forward direction is the direction of flow of the flue gas from left to right and the reverse direction is the direction of flow of the cold nitrogen gas from right (ii) Condensers Attached to Heat Exchangers:

In FIG. 1 there are twelve heat exchangers H1 to H12. There are condensers cd2 to cd10 attached at the end of some of these heat exchangers. A specific component of the flue gas condenses as the liquid form of a component in a condenser as the flue gas passes through the heat exchanger. The condensed liquid is finally collected in an external container (not shown) as described in the specification. Different components are condensed in different condensers. The figures used to described the heat exchangers also include the condensers where liquids are collected.

(iii) Compressors in the Equipment (FIG. 1) for Capture of Emission Components, Separately There are 15 compressors employed in this invention. These are represented by P1 to P5 in FIG. 1 and described in steps below.

(iv) The Remaining Flue Gas

In this invention the phrase "the remaining flue gas" has been used in both the specification (steps) and also in claims. It is meant to be the flue gas remaining after capture of a specific component, as accomplished in the previous step/process, for further processing in the given step where it is mentioned.

(v) One Cycle of Flue Gas Capture Operation in this Invention

In this invention, a cycle of flue gas capture, [not a cycle of ammonia auxiliary power generation and not a Rankine cycle mentioned in section I.2.1] begins as the flue gas enters the ammonia superheater, A2, at point 1 (FIG. 1) and ends when it exits (to atmosphere) as pure nitrogen gas from the heat exchanger, H2, placed between a and $b_1$ (FIG. 1).

(vi) One Cycle of Auxiliary Power Generation

It is defined at the end of step 5.

I. SPECIFIC (DETAILED) DESCRIPTION

The Present Invention

Our cost effective and energy efficient technique captures toxic components of the flue gas from power plants and industries in general and the carbon dioxide in liquefied and, or in frozen form, without the use of any chemical/reagent. It generates auxiliary power using anhydrous ammonia to make the processes (of capturing the emissions) further energy efficient and cost effective. The present invention technology is not dependent on existing technologies to capture $CO_2$ and the associated components in the flue gas emission from industries. The new technique is also going to be especially useful and cost effective to capture carbon dioxide (a global warming agent), if that is left over after controlling the toxic emissions and the particulates using the existing but expensive current state-of-the art technologies, which can be seen in the cited literature Refs. 1-50, RefsZ1-Z33. Despite many past inventions of state-of-the-art technologies for capture of components of emissions of flue gas from Our technology of invention is useful to capture any one or all components of emissions from coal/natural gas/oil fired power plants, generators and emissions from industries, such as cement etc. in general. Thus, the invention is useful to prevent environmental pollution and mitigate climate changes resulting from the pollution. This invention relies on the fact that the major component of the flue gas is the nitrogen gas. In one report (Z20), its (nitrogen gas) concentration varies from 67% to 72% for natural gas power plants and from 72% to 77% for coal fired power plant. In another report (Z21), the said concentration varies from 73% to 74% for natural gas power plant and 76-77% for coal power plant. When this nitrogen gas of the flue gas is cooled to temperature −194 to −195 C, then it is sufficient to cool the incoming flue gas to desired temperatures before capture of $CO_2$ and the associated components with boiling points below −10 C. This cold nitrogen gas obtained at step 15 is passed in reverse direction to cool the flue gas at various heat exchangers. This cold nitrogen gas when passed in reverse direction is referred to as "the said cold nitrogen gas" in many places of this invention.

The 'flue gas' in this invention refers to the entire emissions of gaseous products from either a coal or a natural gas fired power plant after the respective fuel such as coal or natural gas is burned.

This invention relates to capturing the components of the flue gas finally coming out of power plants after producing the energy/power. It relates to capturing the said components in a most cost-effective way. It relates to capturing the components without use of any existing chemical based technology, except the normal uses of electrostatic separator and fabric filters, ceramic filters, which are non-chemical based particle separator. The flue gas components have no further uses for main power generation. If they are released to atmosphere without capturing $CO_2$ and the toxic components (soot, VOCs, SOx, NOx, CO, Hg vapor etc.) they cause global warming and health and environmental hazards. Different chemical based techniques have been developed to capture $CO_2$ and the toxic components. The most dominant technique existing today for capture of $CO_2$ in the flue gas from power plants is the amine-technique. In this technique the flue gas is brought into contact with monoethanolamine (MEA) solution which absorbs the $CO_2$ and the $CO_2$ lean gas is withdrawn either for further processing or released into atmosphere. The absorbent solution (with water) reach in $CO_2$ is reheated to regenerate the $CO_2$. The $CO_2$ gas mixed with steam is further processed to remove water (steam). A variant of amines have been used in techniques to separate $CO_2$, from the flue gas stream. There several patents on this technique. EP0558019B1 [The Kansai Electric Power Co., Inc.-date: 1996 Dec. 27]; U.S. Pat. No. 5,618,506A [The Kansai Electric Power Co., Inc.; 1997 Apr. 8]; DE69428057T2 [Kansai Electric Power Co, 2002 Apr. 18]; CA2651888C [Basf Se, 2015 Jul. 7];

WO2010100100A1 [[Basf Se, 2010 Sep. 10]; WO 2006/08942 A1 [Sylvie and Olievera]; WO 2013000953A2 [Collins]

Hallvard F. Svendsen, Anastasia A. TROLLEBØ, [WO2013000953A2], Jan. 3, 2013]. Svendsen et al. [WO 2013/000953 and] describes an improved version of amine technology in which $CO_2$ upon being absorbed separates into a rich $CO_2$ phase amine solution and a lean $CO_2$ phase amine solution. This reduces the energy demand for regeneration. However the inventors did not fully analyze the energy requirements and the final cost of capturing one ton of $CO_2$. Michael A. Ouimet developed Despite so many inventions on capture of $CO_2$ from flue gas using chemical based technique, the cost of $CO_2$ capture per ton is not lower than $61 and many countries can't afford it, since $CO_2$ is emitted in billion tons or more annually from countries like India, China, USA. etc. Moreover, the amine techniques have the following drawbacks too: (i) there are secondary pollutions; (ii) there are amine losses gradually. The latter adds to the cost not included in the $61 per ton of $CO_2$ avoided. Stern et al (2013) developed a technique of electrochemically mediated amine regeneration technique (EMAR) which promises to bring down the cost of capture to $45-55 in 2025. Moreover, there is no single technique invented so far which can capture $CO_2$ and the toxic components (SOx, NOx, Hg vapor, CO etc.) and different chemical based techniques (SCR for NOx removal and FGD for SOx removal) have to be employed to capture all these components in order to have a environment and air completely free of these components. Such techniques are still too expensive as discussed later in this invention.

The major problem with such techniques is the energy required to regenerate the $CO_2$ and separate the steam. Recently Jason E. Bara [U.S. Pat. No. 8,506,914; Aug. 13, 2013] showed that swapping water (steam) in the process with imidazoles saves energy, since the solvent can be regenerated (and $CO_2$ released) without requiring large amount of energy to boil off water. His work shows that it does not affect the amount of $CO_2$, released.

Bastos; Braulio Luis C. X. [U.S. Pat. No. 5,435,975, Mar. 31, 1993] describes a process of compressing the flue gas from a diesel engine after separation of water and solid particles (PMT, soot etc.) to 172 bars (2500 psi) and cooling the hot compressed flue gas finally to 38 C, using 4 stage of compressors and heat exchangers, all power being supplied by the diesel engine. The finally compressed (nearly 2500 psi) and cooled gas, low in oxygen and rid of water and solid particles, rich in inerts, are then ready for injection in oil fields for lift of oil. This particular invention does not talk of separation of the individual components like, $N_2$, $CO_2$, $NO_x$ (x=0.5, 1, 2) etc. which our present invention is concerned with. Moreover, high pressure compression (subsequent high temperature rise) and cooling used by Bastos requires huge energy (work done on compressors) from the output of the diesel engine.

Lerner; Bernard j.[U.S. Pat. No. 5,569,436 dated [Oct. 29, 1996] described a method of removal of mercury and cadmium and their compounds in mostly chloride form in the flue gases from incinerator using dry finely divided alkaline material (to increase the surface area of absorption of the compound vapors) and dry activated carbon. After the resulting solids including the earlier fly ashes, the particulate matters (PMTs) etc. are separated the resulting flue gas is scrubbed (to rid of residual metals and their compounds) with recycle hydrochloric acid solution formed in situ by absorption of HCl from the gas. The activated carbon injection for removal of mercury was already known and is too expensive to afford by many industries. The average concentrations of mercury in the coals range from 0.12 to 0.28 μg/g (NJ DEPE, 1993) [Z31]. The average concentration of mercury that is present in the gas emissions from the power plant is slightly less than 10 μg/m$^3$ [Z32] which translates to 8 μg/kg. This is significantly less than the average mercury concentration in municipal waste (2 mg/kg−1) and in the flue gas (0.08-3.61 mg/m$^3$)[Z33]. It would be very expensive to apply the method Bernard J for removal of mercury from the flue gas from coal power plant.

Baxter [Barry, Larry L. U.S. Pat. No. 9,410,736, Aug. 9, 2016] invented Systems and methods for integrated energy storage and cryogenic carbon capture. Their method use power-plant energy during off-peak demand to liquefy natural gas to store the liquefied natural gas for cooling the flue gas from power plant (which can be coal or natural gas power plant) for cryogenic carbon capture from light gases in a flue gas by condensing the $CO_2$ to a liquid or solid and separating the liquid or solid $CO_2$ from the light gases and use thus warmed natural gas for power generation during peak demand period.

One advantage of our invention is that the equipment of this invention for industrial emission capture can be retrofitted (or, bolt-on) as a single unit to a coal or natural gas power plant or to a cement or a steel plants. It does not require any chemical or natural gas to be used as a refrigerant and does not need storage systems for the refrigerant to cool the components of the flue gas. The system does not need recurrent use of water. Same fixed amount of water can be used repeatedly during the capture processes. Faced with pressure to control emission from power plants, cement and steel industries and the high cost of capturing the components of emissions and the secondary pollution arising from chemical based capture technologies, the said industries can benefit tremendously from the very cost-efficient methods of capturing the components, each separately in a form(s) that has(ve) industrial demands.

We discuss below in details the various steps/processes involved in our new industrial emission capture technique. Our technique will produce vast amount of pure liquid $CO_2$ and dry ice (source of pure (99.9%) $CO_2$) from the flue gas of the power plants very cost effectively. In this invention, we have used a total of 15 compressors and three turbine expanders and assessed (through rigorous scientific analysis) the energy efficiency & cost efficiency of the new technology in capturing the entire flue gas emissions in two cases: coal power generation and natural gas power generation. However, due to space limitation only 5 compressors are shown in FIG. 1. Each compressor block in FIG. 1 may be assumed to three small compressors. In FIG. 1, the cold nitrogen gas (1 to 2 C above boiling point −196 C) is obtained at the point I after the triple stage expansion. The single nitrogen gas line, CN1 (FIG. 1) is divided into two lines, CN4 and CN5 at the point r. One goes to the $CO_2$ flash chamber and the other to the NO condensation chamber. The arrowed line path indicated by the points q-j-k-l-m indicates the flow (in reverse direction) of cold nitrogen obtained at the end of triple stage expansion of compressed flue gas (see the step 15 below). At the point m, the cold nitrogen gas line is again split in two lines as shown in FIG. 1 and explained below.

The steps involved in separately capturing each component of flue gas (emissions) from coal fired and natural gas fired power plants industrial plants in general, with this new technology are discussed below in reference to FIG. 1 through 11. In this invention wherever "ammonia" is mentioned, it refers to anhydrous ammonia.

The steps described below relate to FIG. 1 and FIGS. 2-11. FIG. 1 shows the schematic of the main equipment used in the capture of components of flue gas cost-effectively. In this equipment there are heat exchangers with condensers where condensed liquid is collected and also heat exchangers without condenser where the flue gas is further cooled. These are all discussed in details below.

In the steps described below we call our invention the new clean energy technique (NCET).

I.1. Equipment/Steps/Processes Involved to Achieve the Said Objects of Invention I.1.A. The Equipment In this invention we use a single piece of equipment that can be retrofitted as a single unit to a coal power plant or a natural gas power plant or an industrial plant in general to the pipe through which the flue gas from a plant is exiting. The equipment is shown schematically in FIG. 1 and the various parts are described in FIGS. 2 to 11.

The equipment in FIG. 1 consists of a connecting pipe line at 1 (which would be connected to the flue gas exhaust pipe line of the plant) through which the flue gas A1 (FIG. 1) is entering. It passes through ceramic filters (FIGS. 4 & 5) and then through an ammonia superheater E14 (FIG. 5), the combination being kept at the position A2 (FIG. 1). The flue gas after passing through A2 passes through electrostatic precipitator (ESP) and fabric filter kept at A3 (FIG. 1). In A3 there is also a condenser/collector, cd1 to extract condensed part, if any at this position. The flue gas then passes through a (first) heat exchanger H1 with a second condenser Cd2. The flue gas then passes through a second heat exchanger H2 and then to the first compressor, then through a third heat exchanger (H.E.) H3 (H3 attached with a condenser cd3), then the fourth H.E. (H4). After passing through H4, the flue gas passes through the second compressor (P2 in FIG. 1), then through a fifth H.E. (H5) with a condenser cd4, then through the sixth H.E. (H6), [where no condensate is collected]. After passing through H6, the flue gas passes through the $3^{rd}$ compressor (P3) and then through a 7th H.R. (H7) and then through two compressors at P4. After passing through P4, it passes through the $8^{th}$ H.E. (H8) with a condenser, cd6. After passing through H8, the flue gas then passes through 10 compressors at P5 and then through $9^{th}$ H.E. (H9) attached with condenser cd7, cd7 attached with flash chamber FC. After passing through N9, the flue gas passes through a 10th heat exchanger H10, then through the first turbine T1, then through the $11^{th}$ H.E. (H11). After passing through H11, the flue gas passes through the second turbine T2, then through the condensing chamber J6 with condenser cd9. After J6, the flue gas then enters the third turbine T3 and then through the condensing chamber J6 with condenser cd10. After it passes through J6 with cd10, the flue gas is mostly pure nitrogen gas at −194 to −195 C in the line CN1. The CN1 is split at point r as CN4 and CN5. CN4 enters J6 with cd9 and CN5 enters the flash chamber FC. It comes out as CN5 which enters H12. Cold nitrogen gas flows from right to left while the flue gas flows from right to left in the equipment shown in FIG. 1. The two lines CN4 and CN5 merge at q as one line CN1. The cold nitrogen gas flow continues through H10, H9 and H8 and then at the point m (FIG. 1) the line splits into two lines as CN2 and CN3. CN2 continues through H7, H6, H5, H4 and H3 and CN3 first passes through ammonia condenser AM4 and then enters the H7 and passes through H7, H6, H5, H4 and H3. The two lines CN2 and CN3 joins as one line after passing through H3. It then passes through H2 and exits out either for collection by industry as pure nitrogen or to be vented out to air. The anhydrous ammonia after taking heat from H1 and A3 passes through ammonia superheater at A2 and then passes through ammonia turbine AM3. The superheated ammonia after expansion by AM3 (and after generation of auxiliary power) passes through condenser AM4 and then pushed by pump at 6 to enter the H1 and A3. After collecting the heat from these H.E. it enters the super heater at A2 to repeat the cycle of auxiliary power generation. It is to be noted that this single equipment (FIG. 1) where the flue gas line A1 (FIG. 1) can be bolted on to the flue gas emission line (not shown in FIG. 1) of a coal power plant after the major ashes are removed by the power plant.

In the case of a natural gas power plant, the flue gas line A1 (FIG. 1) can be bolted on to the flue gas exhaust line (not shown in FIG. 1) of the power plant.

1.B. Protection of Equipment from Corrosion Due to Acidic Oxides, Acid Vapors and Toxic Materials in the Flue Gas During the Entire Capture Process In all steps/processes described below the equipment surfaces, internal and external surfaces of tubes and surfaces of capture-vessels that come in contact with the acidic oxides, acids that may form on reactions of the oxides with condensed steam and other toxic components of the flue gas and or the captured liquefied products of these components, are protected as follows: they are either coated with or made of any one of the following plastics: VESPEL, TORLON, RYTON, NORYL of craftech industries [http://www.craftechind.com/dont-sweat-4-high-temp-plastics-can-take-heat/# comment-741] or any material that is non-reactive to these components of the flue gas and at the same time the material has good thermal conductivity (~1 W/m·K) and good thermal stability with respect to mechanical strength and structure. One of such materials is Vespel-22 [https://en.wikipedia.org/wiki/Vespel].

All of the above mentioned plastics can tolerate very well temperatures up to 100° C. in terms of heat resistance, lubricity, dimensional stability, chemical resistance, and creep resistance, and can be used in hostile and extreme environmental conditions.

Vespel can stand temperatures up to 300° C. It is used for tubes and vessels at high temperature end of the flue gas processing. Unlike most plastics, it does not produce significant outgassing even at high temperatures, which makes it useful for lightweight heat shields and crucible sport. It also performs well in vacuum applications, down to extremely low cryogenic temperatures (−196 C). VESPEL does not suffer any damage when used continuously in the temperature range 370 C to −224 C; TORLON, RYTON, NORYL are non-corrosive to all components of flue gas. Alternately, copper tubes with inner wall coated (2 mm±0.5 mm thick) with any one of these materials (plastics) are also found to be suitable in this invention for use in the methods described to capture the toxic components of the flue gas. This would ensure heat transfer required for fast condensation of the components. However, fully plastic tubes are cheaper than the latter ones. It is extremely important for all components of this emission capture plant that are in contact with the flue gas are coated with non-corrosive, temperature resistant coating/paint with good thermal conductivity. Alternately, the tubes employed in the heat exchangers of this invention can be made of copper or steel and then the inside of the tube through which flue gas flows are coated chemical resistant coatings which are available in the market. A list of such chemicals are already developed by Metals Coatings Corp [https://www.metcoat.com/chemical-resistant-coatings.htm].

The ammonia super-heater chamber of FIG. 1 and in steps 2 to 5 below is made of such high temperature tolerant and non-corrosive plastic possessing good thermal conductivity. The surface of the chamber is coated with thin layer of a material with high heat absorptivity (0.8 or higher) (for good absorption of heat from flue gas) and low heat emissivity (0.1 or lower) (low heat transfer to the flue gas or surrounding). One of such materials is nickel oxide which has high absorptivity (0.92) and low emissivity (0.08) [http://www.solarmirror.com/fotn/forn-serve/cache/43.html]]. The nickel oxide film on the ammonia superheater chamber's outer surface can be grown by any of the techniques known already in existing arts [Refs. Z6, Z7].

Figure 5:
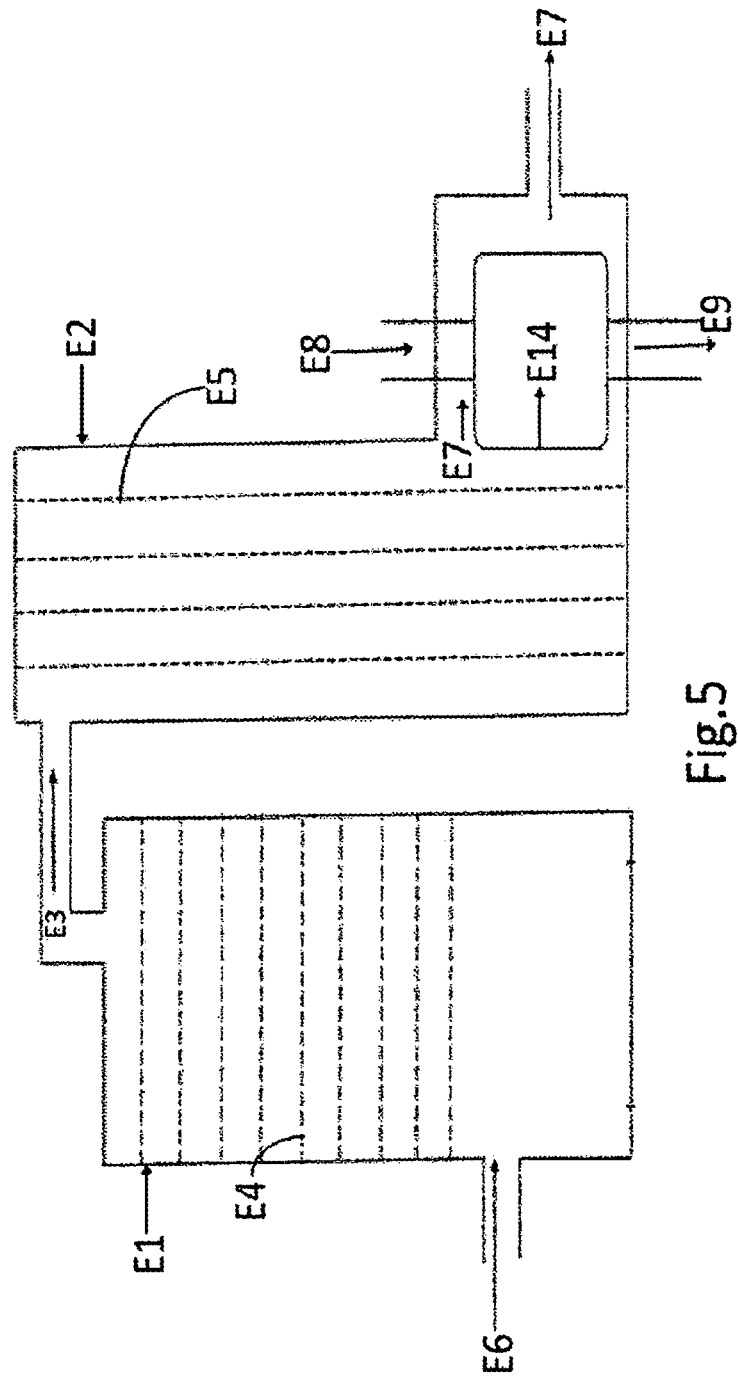
FIG. 5 is an arrangement of the ceramic filters (E4,E5) in two chambers E1 & E2 to capture some of the fly ashes and the position of the ammonia super heater (E14). This arrangement ensures capture of heat of flue gas by the ammonia super heater, E14. The arrangement to clear the captured fly ashes is discussed in specification.

Alternately, the ammonia chamber [FIGS. 1 & 5] can also be made of aluminum and then the external surface coated with nickel surface. Then the chamber is covered with sheets of graphene to protect it from toxicity effects of the components of the flue gas. Polymer graphene sheets or large size free standing graphene or nitrogen doped graphene sheets [Towards large-scale in free-standing graphene and N-graphene sheets, E. Tatarova et al. *Scientific Reports* volume 7, Article number: 10175 (2017)] which can be grown in size 1 $m^2$ or larger are examples of such materials. The external surface of such chamber can then be protected from the corrosive toxic components (SOx, NOx, acid vapors) of the flue gas. We also found that the ammonia super heater instead can be made of steel on which anti-corrosion coatings developed by Metal Coatings Corp can be put, to protect the inner and outer surface from said corrosion. [https://www.metcoat.com/corrosion-resistant-coatings.htm]. The coatings are to be applied before the equipment is used.

All protective coatings and black paint for good thermal radiation as described in this invention are applied prior to use of equipment.

Heat Exchangers Used in this Invention:

There are two types of heat exchangers used in this invention: type I and type H. Type I uses water, M4 (FIG. 11) inside the heat exchanger jacket M3. In this type I (heat exchangers H2, H3, H4, H5, H6 and H7 in FIG. 1), water is cooled by cold nitrogen gas flowing in through port M1 through a cooling coil M5 that surrounds the flue gas tube (not shown in FIG. 11 but are shown in FIG. 6). The flue gas enters through port F2 and exits through port F3 (FIG. 6 and FIG. 11). This cold nitrogen gas is produced by cooling the unreacted nitrogen gas of the flue gas to a temperature –194 to –195 C in step 15. The cold nitrogen gas leaves through port M2 (FIG. 11). The condensates ($H_2O$; $SO_3$, mercury, $NO_2$, acids etc.) shown by F6 in FIG. 6, drops through the tube F9 (FIG. 6) onto the collector pot F4 by automatically opening the valve F5. The condensate(s) can be removed from the pot F4 by opening the tap valve (FIG. 6). Type I heat exchanger is used to capture components (such as $H_2O$, $SO_3$, mercury, with boiling point above 0° C. These components could be any one or more of $H_2O$; $SO_3$, $NO_2$, mercury, acids etc. of the flue gas. Heat exchangers H2, H3, H4, H5, 1-16, H7 (FIG. 1) are of type I. However, the heat exchanger H1 is through of type I, the water in this first heat exchanger, H1 (FIG. 1), is not cooled by cold nitrogen gas. Instead ammonia from ammonia-condenser, AM4, (FIG. 1) enters through line AM2 (FIG. 1) to port M2 (FIG. 11) and then the ammonia collecting the heat from the heat exchanger leaves through port M3. Type II heat exchangers (H8, H9, H10, H11, and H12 in FIG. 1) are used in this invention to capture components of flue gas with boiling point below 0° C. These could be any one or more of $SO_2$, $CO_2$, $N_2O$, NO, CO). In Type II, the heat exchangers are shown by FIG. 7 & FIG. 8. The type II heat exchanger is described in details later in appropriate places while discussing the steps of processes to capture the components. In this invention the heat exchangers, H1 to H12 are referred as first to twelfth heat exchanger.

Cooling of Heat Exchangers H2, H3, H4, H5, H6, H7, H8, H9, H10, H12 in FIG. 1

The heat exchangers H2, H3, H4, H5, H6, H7 are of type I described later. These heat exchangers contain water M4 (FIG. 11) and the cooling coil M5 (FIG. 11) which surround the flue gas tube (FIG. 6) [not shown in FIG. 11]. The heat exchangers H8, H9, H10, H12 are of type U. These contain conducting pebbles or metal chips and the flue gas tube of FIG. 7 or FIG. 8. Cold nitrogen gas (–195 C) is produced after the third turbine (T3 in FIG. 1). This cold $N_2$ gas passes in reverse order (reverse direction in FIG. 1) through H12, H11, H10, H9, H8, H7, H6, H5, H4, H3, H2 successively. Since the nitrogen content of the flue gas varies from 70 to 74%, and it is cooled to –195 C, we find that this cold nitrogen gas is sufficient to cool the flue gas to various temperatures at which the flue gas is cooled in the steps described below. The two types of heat exchangers are described in details in this invention.

$N_2O$, NO and CO Collection Chambers, H1 and J6 (FIG. 1)

$N_2O$, NO and CO are all collected after respective turbine expansion in a chamber shown in FIG. 10. This chamber is shown as H11 and J6 in FIG. 1. It is described at length later.

Turbines T1, T2, T3 (FIG. 1)

There are three turbines used in this invention. These are referred to several times in the specification as first, second and third turbine.

Condensers Cd1 to Cd10 in FIG. 1

In FIG. 1 some of the heat exchangers are shown with condensers (CC) with a downward pointing arrow. This means that at such locations specific components are condensed and collected, as described later in the specification.

Direction of Flow of Flue Gas and Cold Nitrogen Gas in FIG. 1 of this Invention

In the specifications described below, the flue gas always is flowing from left to right and the cold nitrogen gas is flowing from right to left in each heat exchanger.

Limitations of the Pressures and Temperatures for Processing the Flue Gas in Steps 1 to 15.

Each of pressures quoted in the steps 1 to 15, P, is limited to P–0.5 bar to P+0.5 bar, except for the final pressure of 26.5 bar, the limit is 26.5 bar to 27.5 bar. The temperature T, each time quoted for processing of the flue gas has range T–2° C. to T+2° C. Any time the word 'around' or 'about' is used for the pressure (P) and temperature (T), it should be understood in this context.

1 bar pressure in this invention is related to 1 atmosphere pressure by 1 atm=1.01325 bar. In the steps below the temperature is expressed in units of centigrade degree (C. or ° C.); C or ° C. has been used to indicate temperature, meaning the same degree of temperature. In this invention often 'bar', rather than 'bars' is used. For example, '26.5 bar' instead of '26.5' bars is sometimes used.

Energy Efficiency or Energy Efficient

These terms, when used in sentence, are meant to reduce the energy usage for the capture process as much as possible.

Capture of Fly Ashes, Soot, Mercury Oxides

STEP 1: The new clean energy technology (NET) is schematically depicted through FIGS. 1-11. The flue gas [denoted by E6 in FIG. 5 and by A1 in FIG. 1] [from the boiler of a power plant after boiling the water to high pressure steam that drives the turbine in a coal power plant or, the flue gas from the exhaust of a natural gas turbine] is passed through a series of ceramic filter (D1) plates (FIG. 4) arranged in two chambers [FIG. 5] to remove the fly ashes that may include mercury oxides (HgO & $Hg_2O$)(if coal is used) and soot. FIG. 5 is a part of the equipment to remove course particulate matters of sizes between 1 mm to 0.5 mm in diameter and to retain the beat of the flue gas and further to enable the ammonia superheater (E14 in FIG. 5 represented by A2 in FIG. 1) collect heat from the flue gas by channeling the flue gas over it as shown in FIG. 5. In the first chamber E1 of FIG. 5, each ceramic filter (FIG. 4) is lined with circular holes (D2 FIG. 4) of a given diameter (D4) (for a given filter) that varies from 3.5 mm to 1.5 mm for different filters in the first chamber E1 (FIG. 5). A ceramic plate has holes of a given diameter (D4), the holes being arranged as shown (FIG. 4). The number of holes in a line and the number of lines and the size of a filter can vary depending on volume (or flow rate) of a flue gas to be filtered out per second. The separation (D3) (FIG. 4) of holes in a given line is 2 to 3 times the diameter of one hole. These plates can be made of Vespel (as mentioned earlier) or any plastic material which can stand temperature up to 300 C such that the material suffers no structural damage at temperature up to 300 C. The lines of holes (FIG. 4) are also similarly separated (D5) by about three times the diameter of the holes. The separation between the plates is six to eight inches. There are six of ceramic plates in one chamber and the alternate plates are placed in crossed position i.e., so that x axis (the side cd or ab) of one plate becomes the y axis (the side ad or bc) of the other plate [FIG. 4]. The diameter of the holes in the plates decreases from 3.5 mm in the first plate to 1.5 mm in the sixth plate by 1 mm. Two alternate plates have same diameter. The plates are placed normal to the direction of the flue gas motion. Theses plates are arranged horizontally in the first chamber E1 of FIG. 5. The flue gas E6 after entering the first chamber E1 moves up through the horizontal stack of plates and after separation of the course particles (between 0.5 mm to 1 mm size) of the flue gas moves in (E3) to the second chamber E2. In the second chamber E2 of FIG. 5 the plates E5 are arranged vertically. In the second chamber the holes are of diameter 1 mm to 0.5 mm. These stop further any course particles in the fly ashes that have diameter greater ~500 microns before the flue gas congregates and passes over the ammonia super heater, E14 in FIG. 5. Finer particles (particulate matters size less than 500 microns) in the fly ash will be stopped by ESP and fabric filter placed at points between points 2 & 3 in FIG. 1.

These ashes are wiped off the plates with automatic wiper using existing art (not shown). The wiped-off ashes fall to the bottom plate part E10 and E11 of FIG. 5 of the chamber E1. This part between E10 and E11 opens up electronically when the weight of the ashes exceeds certain limit (this arrangement which can be done by existing art is not shown in FIG. 5). This bottom plate automatically closes in when the ashes fall off and are removed from the first chamber E1 of FIG. 1.

For the second chamber E2 (FIG. 5) similar arrangement is made for the part E12-E13 of the bottom plate of FIG. 5 and also not shown in FIG. 5. The ceramic plates are arranged so that they can be cleaned easily of the ashes/soot/solid HgO and $Hg_2O$ (not shown in FIG. 5). Alternatively, the bottom plate in the chamber E2 can be kept in a slating position with each ceramic plate touching the bottom plate. The bottom plate is then automatically opened when the net weight of the ashes on the bottom plate exceeds certain limit set by the industry. The ashes fall by gravity and are collected (not shown in FIG. 5). The external walls of the chambers E1 and E2 are covered with a layer (6" (inches) thick) of glass wool followed by a layer (1 feet thick) Styrofoam. We find in this instant invention that this retains the heat of the flue gas enough to raise the temperature of the anhydrous ammonia in the auxiliary power generator (in chamber E2 in FIG. 5) to 200 C, when the initial flue gas temperature is 250 C or higher. If still some fine ash gathers on the surface of ammonia superheater (E14-FIG. 1) then it can be removed by means already known in the existing arts (for example, by using an electronic wiper that removes the dust from the top surface of the ammonia superheater). After the fly ash of the flue gas is filtered by the ceramic plates in the two chambers, the filtered flue gas E7 (FIG. 1) passes over the ammonia super heater and finally exits out as flue gas E7 in FIG. 5. This is represented by 2 in FIG. 1. The arrangement sufficiently retains heat from the flue gas, within the chamber of FIG. 5. The heat is collected by the said ammonia superheater.

The filtered flue gas, 2 (FIG. 1) (shown by E7 in FIG. 5) from coal fired power plants is then passed through fabric filters (FF) & ESP (FF & ESP are situated in A3 in FIG. 1) to remove further the remaining fine ashes/soot. This also can remove further mercury oxides. Such arrangements are suitable for flue gas containing high ash, specially, from power plants (e.g., those from India) using coal with high ash content. For coal power plants, with respect to FIG. 1 of the emission capture equipment, the ceramic plates (FIG. 5) are placed in the position. A2 where the ammonia superheater (E14 in FIG. 5) is. In this invention, we find that such arrangements to remove fly ash and mercury oxides is not necessary, if the flue gas is from natural gas fired power plants.

Capture of Flue Gas Heat for Auxiliary Power Generation Through Steps 2 to 5

The flue gas has temperature ranges from 150 to 300 C, or even higher. In this invention before processing the flue gas for capture of components, this heat is converted to auxiliary power using step 2. This recovery of flue gas heat is different from and not dependent upon the prior art [U.S. Pat. No. 4,255,926] on an installation for recovering energy from solid fossil fuels more particularly bituminous coal high in inerts. There have been several prior arts in utilizing the flue gas heat. For example, the U.S. patent [4,403,575 by Kral et al] relates to device for preventing flashing to steam in an economizer of a flow through steam generator. Our invention relates to capturing components of the flue gas as it comes out of a boiler or a natural gas turbine. Engelhardt, et al. [U.S. Pat. No. 4,543,110], invention relates to method and plant for reheating flue gases behind a wet flue-gas desulfurization plant. In their novel technique, the flue gas heat is used to preheat the air for combustion, before the flue gas undergoes desulphurization. In our technique, we do not use desulphurization to capture any component or specially, SOx and as we need electrical energy to run the compressors, we need to look for efficient way of generating auxiliary power from the heat of the flue gas coming out of boiler or natural gas turbine at temperature 250 C or higher.

Step 2: The flue gas A1 in the equipment shown in FIG. 1 passes from point 1 through points 2, 3 & 4 from left to right. After passing through point 4, the flue gas is subject to the processes of capturing the gaseous components. We call this flue gas line A4 in FIG. 1. After the step/process 1), the flue gas is passed through a chamber [FIG. 1] that contains an ammonia super heater [FIG. 1, FIG. 5] which heats (using the heat of the flue gas) the anhydrous ammonia of the ammonia power plant to high pressure (~200 bars) to drive a turbine AM3 (FIG. 1) for generation of auxiliary power that either augments the output power obtained from the main steam turbine [not included in any drawing here] or helps run the compressors P1 to P5 (FIG. 1). In this arrangement, the flue gas is not allowed to escape to air and this arrangement increases the pressure of the gas and helps the ammonia turbine capture most of the flue gas heat and it thus functions well. After capture of all components, the unreacted nitrogen gas of the flue gas is either released to the air or collected near the point a (FIG. 1). Thus, the pressure does not build up excessively and the flue gas flows continuously through the equipment (FIG. 1).

Whatever ash may still be deposited on ammonia super heater surfaces is removed employing any conventional means. However, it is still necessary to have said protective coating (as described earlier) on the ammonia chamber surface to prevent corrosion due to toxic flue gases and high temperature. After the auxiliary power generation the flue gas temperature drops from 200 C to ~70 C.

Step 3: The flue gas from the said chamber (i.e., A2 in FIG. 1) is finally passed through a chamber A3 (FIG. 1) containing fabric filter (FF) and Electrostatic Precipitator (ESP) to capture fly ashes that may remain after process of step 1 and a collector cd1 (FIG. 1) to collect soot, VOcs and remaining fly ashes. Fabric filter can also capture some of the mercuric oxide ($Hg_2O$, b.pt: 500° C.)) [https://hub-.globalccsinstitute.com/publications/coal-quality-impacts-and-gas-quality-control-oxy-fuel-technology-carbon-capture-and-storage-cost-impacts-and-coal-value/62-hg-removal-cost-estimation] Mercuric oxide HgO is solid at the flue gas temperatures (~300 C) we operate in this invention. If the flue gas temperature is above 300 C, the temperature needs to be brought down using air preheater [which can be included, technology of which is already known in the existing art[Z25, Z26, Z27] to utilize waste heat for boosting main power generation. After passing through the fabric filter, the flue gas is passed through an electrostatic precipitator (ESP)

FIG. 1 to remove the soot or any smoke particles, VOCs which are not previously captured. The fly ash/soot is fully captured at step. However, metallic mercury vapor still remains in the flue gas at this point. This will be captured partially in successive steps 4 to 8.

Step 4: En steps (1-2) the anhydrous $NH_3$ gas is superheated at super critical pressure 200 bars at temperature 200° C. by the heat of the flue gas in a heat exchanger chamber (FIG. 5) for expansion in an $NH_3$ power plant to generate the auxiliary power ($W_{12}$ in FIG. 1). If the flue gas heat is used to preheat air (APH) for the combustion of coal, till the flue gas temperature drops to 300° F. (150° C.), then the anhydrous $NH_3$ gas is heated to 100° C. at pressure 100 bars. In the latter case, the auxiliary power generated is less than the first case. In this section, it is necessary that the tubes & vessels containing $NH_3$ inside the superheating chamber has an external coating or wrapping of materials that is non-reactive to the toxic gases and with good thermal conductivity (>100 W/m·K.) Graphene film could be such a material (1, 2) [1. A Review on the use of Graphene as a Protective Coating against Corrosion Jianchen Hu, Yanfeng Ji, Yuanyuan Shi, Fei Hui, Huffing Duan and Mario Lanzal, Annals of Materials Science & Engineering, Ann J Materials Sci Eng—Volume 1 Issue 3-2014 ISSN: 2471-0245|www.austinpublishinggroup.com, p. 1-16; 2. Impermeable barrier films and protective coatings based on reduced graphene oxide, Y. Su, V. G. Kravets, S. L. Wong, J. Waters, A. K. Geim, & R. R. Nair, *Nature Communications* 5, Article number: 4843 (2014), doi:10.1038/ncomms5843]. Other protective coating that is found suitable is discussed in the beginning of this section. Alternatively, silicon carbide and silicon nitride are also found to satisfy the above requirements as these materials have thermal conductivity >250 W/m·K., can stand temperature ~700 C and can resistant corrosion due to acid vapors. Thin films of such materials (10 to 15 micron) can be grown by techniques already known in existing arts[Z28]. All coatings/films are applied prior to the use of the equipment for capture of flue gas components.

Step 5. The superheated ammonia AM1 [FIG. 1, FIG. 5] drives the ammonia turbine (AM3 in FIG. 1) and produces auxiliary power [sec section I.2]; it under goes expansion through the turbine AM3. The expansion drops the temperature of ammonia gas from 200 C to ~50 C. The ammonia gas after passing through point 5 in FIG. 1 is then passed through a condenser AM4 [FIG. 1] which is cooled further by fixed amount of cold water. The water is cooled by a fraction of cold nitrogen gas passing through the line (dotted) CN3 (see FIG. 1). The ammonia gas is then compressed and pushed (AM2) by a pump (at position 6 in FIG. 1) through a heat exchanger H1 (in direction right to left in FIG. 1) to collect some of the heat delivered by the flue gas which passes from left to right with respect to FIG. 1. This ammonia gas AM2 then passes through the chamber A3 in reverse direction to collect more heat from the ESP and fabric filter (in the chamber A3—FIG. 1), that was delivered by the flue gas (which flows from left to right with respect to FIG. 1). The ammonia gas, AM2 then enters the ammonia superheater A2 (FIG. 1) and becomes the pressurized superheated ammonia, AM1 again (FIG. 1), which is passed through the ammonia turbine AM3 (FIG. 1) again to generate auxiliary power ($W_{12}$ in FIG. 1). Thus, the auxiliary power cycle repeats in this invention of capturing components of the flue gas cost-effectively as the flue gas (A1 in FIG. 1) continues to flow from the power plant exhaust to the equipment of FIG. 1. The external surface of the tube(s) in fabric filter and ash removing chamber through which the ammonia gas passes has protective coating as discussed earlier. The protective coating is similar to that mention in step 1 above. CN3 line exiting from the ammonia condenser AM4 (FIG. 1) enters the heat exchanger H7 (FIG. 1).

One Cycle of Auxiliary Power Generation

One cycle of auxiliary power generation involves the following steps: (1) Ammonia gas entering the superheater (the ammonia superheater E14 in FIG. 5 is placed in A2 of FIG. 1) along line 2' (FIG. 1), or by arrow E8 (FIG. 5); (2) collecting heat from A2 as the flue gas enters A2 along line A1 (FIG. 1); (II) the superheated ammonia flowing along line AM1 (FIG. 1) to drive turbine AM3; (3) the ammonia after expansion by turbine (AM3) (hence after generation of the auxiliary power) passing through condenser AM4; (4) the condensed ammonia from AM4 being pushed along line AM2 (FIG. 1) to enter the first heat exchanger (H1); (5) the ammonia passing through H1 entering FF & ESP in A3 and back to A2 through line 2' completes one cycle of auxiliary power generation.

Successive Condensation of Mercury Vapor (Hg, b.Pt. 356.7 C), Sulfur Trioxide ($SO_3$, b.Pt. 44.9° C.), and Steam ($H_2O$, b.Pt 100 C) and Capture of Through Steps 6 to 8

Step 6: First part of the partial capture of Hg, $SO_3$ and $H_2O$ is accomplished in heat exchanger H1 which is type I (described earlier). The flue gas F2 (FIG. 6) from step 3 enters the coil of tube F1 (FIG. 6) which is inside a heat exchanger (FIG. 11), type 1, H1, placed between points 3 & 4 in FIG. 1. It condenses partially the mercury, the steam, and part of sulfur trioxide gas, $SO_3$ (F6, FIG. 6), which are collected in chamber F4 (FIG. 6). The coil F1 of FIG. 6 is embedded inside the cooling coil M5 of the heat exchanger unit of FIG. 11. For H1, only condensed ammonia coming from ammonia condenser AM4 (FIG. 1) is pumped (by pump at position 6 in FIG. 1) along line AM2 (FIG. 1) through port M2 inside H1. The heat exchanger coil M5 (FIG. 11) surrounds the condenser coil F1 of FIG. 6. The insulated chamber M3 contains water, M4 that is stirred (not shown) for good heat exchange between cold nitrogen gas and the flue gas. The heat exchanger, which is of type I is shown in FIG. 11. It is used several times for heat exchangers H2, H3, H4, H5, H6 and H7 (FIG. 1) also. Only in H1 (FIG. 1), the water is not cooled by cold nitrogen gas as mentioned earlier. Instead ammonia from condenser AM4 (FIG. 1) enters through line AM2 (FIG. 1) to port M2 (FIG. 11) and then the ammonia collecting the heat from the heat exchanger leaves through port M3.

There would be partial condensation of components with boiling points between 50 C and 0 C in H1 (FIG. 1). These condensates ($H_2O$; $SO_3$, mercury, $NO_2$, acids) shown by F6 in FIG. 6, drops through the tube F9 (FIG. 6) onto the collector pot F4 by automatically opening the valve F5. The condensate(s) can be removed from the pot F4 by opening the tap valve (FIG. 6).

It drains the partially condensed components which majorly comprise of steam, mercury and some of $SO_3$ into a collection chamber F4. This draining is accomplished by means of spring valve F5 which opens when the height of the collected fluid in tube F8 reaches pre-set value. This step partially condenses vapors of acids like $H_2SO_4$, $HNO_3$ that may be present in the flue gas from power plants [EDWARDS. RUBIN, Toxic Releases from Power Plants, Environ. Sci. Technol. 1999, 33, 3062-3067]. These acid vapors along with some part HCl (hydrochloric acid) and other acid vapors are dissolved also in the partially condensed steam (water). It contains liquid $SO_3$ which is dissolved in the condensed water of the steam. The collection (cd2 (FIG. 1)) of these condensates occurs with the automatic opening of the said valve F5 (FIG. 6) when enough liquid pressure is built up (FIG. 6). At this stage small amount of mercury is also drained. Alternatively, the opening of the valve can be arranged electronically (not shown in FIG. 6) when condensates reaches a certain pre-set level. The condensed flue gas components can be taken out through valve F7 (FIG. 6) for further use by industry. Finally, after the acid components are partially captured then the flue gas exits at F3 (FIG. 6) to enter other heat exchanger and condensing units in following steps. The flue gas temperature after passing through H1 is brought down to 50 C.

Further Partial Capture of $SO_3$, Steam and Mercury (Hg)
Step 7:

The heat exchangers H2 to H5 (FIG. 1) used for partial capture of $SO_3$, steam and mercury (fig) are of type I described earlier. After steam, mercury and $SO_3$ are partially collected by step 6, the flue gas contains mostly $N_2$ (70 to 75%), $CO_2$ (15-24%), and $SO_2$ of a small percentage (0.1% to 0.25%), oxides of nitrogen and carbon monoxide in very small amount. It also contains steam, $SO_3$ and Hg and acid vapors which are only partially captured in step 6. After step 6, the flue gas is cooled further by passing through coils (FIG. 6) in a heat exchanger, H2 (between a and b1 in FIG. 1. H2 is the second heat exchanger in the equipment of FIG. 1). The beat exchanger H2 (shown in the section $a-b_1$ in FIG. 1) is the same as that discussed earlier and in step 6. This heat exchanger H2 unlike H1 is cooled by passing cold nitrogen gas in reverse direction (from point b1 to point a of FIG. 1). This $N_2$ gas (going from point b1 to point a in FIG. 1) is in the last leg of its (nitrogen gas) reverse journey, before either being vented out to atmosphere or being collected as pure nitrogen by the industry for use. This is the unreacted nitrogen of the flue gas (the production of which is explained in Steps 14 and 15). The flue gas, which is cooled to 45 C.±2 C, through the heat exchanger H2 (FIG. 1), is then compressed adiabatically by the first compressor $P_1$ to 2 to 2.5 bars [$b_1$ to $b_2$ in FIG. 1]. This compressed gas is cooled further by passing the compressed gas at $b_2$ through a heat exchanger H3 (third heat exchanger, FIG. 1), the same type of heat exchanger H2, placed between points b2 and b3 in FIG. 1 that is maintained at 35° C.±2 through controlled flow of cold nitrogen gas CN2 entering near b3 and flowing towards b2 (FIG. 1). Appropriate temperature controller available in market (not shown in FIG. 1) is used at this stage that controls the flow of the said cold nitrogen gas. The water in the chamber (FIG. 11 containing FIG. 6) is stirred (not shown) to have uniform temperature 35° C.±2. In this section significant part of $SO_3$ (b.pt 44.9 C) is condensed. Also steam and mercury remaining after step 6 are further condensed. The steam, $SO_3$ and part of mercury partially condensed is further collected by condenser cd3 (FIG. 1). The collection process is similar to that described in step 6. It may be necessary to have more than one such chamber (H3—FIG. 1) if the flow rate of the flue gas is high to ensure complete condensation of $SO_3$ (boiling point 44.9 C) and significant part of steam $H_2O$ [section $b_2-b_3$]. Here, (significant) part of mercury vapor (b.pt 357.6 C) in the flue gas also condenses to metallic elemental liquid mercury and is collected in a container (not shown) that is connected below the water tank (FIG. 11). The mercury may be mixed with water (from condensation of steam) and also with dissolved HCl or $SO_3$. As mercury is much heavier (density 13.6 glee) than water (1 g/c), mercury will be collected at the bottom of the tank and it is collected in a separated vessel using a tap.

Proper stirring of water (in FIG. 11) for step 7 is needed to have uniform cooling of water (for capture of flue gas components that have b.pt above 0° C.). It is not shown in FIG. 1 or FIG. 11. The arrangement for stirring water is not shown in FIG. 11.

The water temperature in heat exchanger H3 (FIG. 1) is kept at 35° C.±2 in this step 7 [through use of a temperature controller, sensor and flow controller of cold $N_2$ gas, fans for the heat radiator-these are not shown in FIG. 7] to condense $SO_3$ & $H_2O$ which is collected at the bottom as shown in FIG. 7 or FIG. 6. Some of the acid vapors in the flue gas gets dissolved in the condensed water. This mixture of dissolved acids, $SO_3$ & $H_2O$ may also contain partly condensed mercury, which, however, is heavier and will settle at the bottom. If the flue gas is obtained by burning low sulfur content coal, then it is expected that the sulfuric acid formed in the collector [FIG. 6] will be fairly dilute. If the flue gas is obtained by burning coal with high sulfur content (similar to Indian coal) then the sulfuric acid formed in the container [FIG. 6 or FIG. 7] may be slightly concentrated. In most of the cases it would be dilute since $SO_3$ concentration is quite less than that of $SO_2$ in coal fired power plant. Part of the captured mercury may form compounds with the captured HCl and sulfuric acid [$H_2SO_4$] in the collection chamber. The compound however will be dissolved in the condensed steam and will stay in the form of liquid which can be collected in any normal acid-containers available in the market. The part of the condensed mercury may be collected at the bottom of the container in FIG. 6 or FIG. 7.

It may be mentioned that with the current existing state-of-the-art technologies, in case of a coal fired plant, powdered activated carbon (PAC) is injected into the flue gas for mercury capture [1](Moretti and Jones. 2012). This process costs $45000.00 per pound of Hg removed and $5 million to 6.75 million annually for a 500 MW power plant[1a,b,c,d]. In general, the cost of mercury removal with existing technologies is high[61,61a]. With our new technology invention, no such injection of materials is needed. This new technology described in this invention is very economical, since only electrical power is used to compress the flue gas and to obtain cold $N_2$ gas at the end. $SO_3$ of the flue gas [from coal fired power plants] also liquefies and is collected. Mercury, being heavier, will collect at the bottom. Alternately, both mercury vapor and $SO_3$ can be collected separately in two chambers maintained at 53° C. (for Hg) and 35° C. (for $SO_3$) respectively. This process would not be needed if the flue gas comes from natural gas fired power plants. The control of the temperatures is done through a temperature control circuit (not shown in FIG. 1) that regulates the flow of cool nitrogen gas through the water. The internal parts of the compressors have some protective coating so that the compressors are not corroded by toxic components of the flue gas. Such corrosive characteristics is reduced significantly as the flue gas temperature drops successively in this invention.

Step 8: After step 7, the flue gas containing remaining $SO_3$ under pressure (2 to 2.5 bars) is further cooled by passing through a heat exchanger H4 (fourth heat exchanger, FIG. 1) which is a type I heat exchanger (similar to H2 and H3) to 30° C.±2° C. and then compressed by a second compressor, P2 (FIG. 1) isoentropically to ~4.5 Bars by compressor P2 (FIG. 1). The compressed flue gas passing through the continued flue gas line A4 is then passed through the heat exchanger H5 (fifth heat exchanger, FIG. 1) tubes immersed in a water tank M3 (in FIG. 11) similar but different to that of FIG. 6 or FIG. 7 but maintained at 25° C.±2° C. by passing controlled amount of said cold nitrogen gas through the coil M5 which surrounds the flue gas tube F1 of FIG. 6 and using temperature controller (not shown in FIG. 1 or FIG. 11). In this section (stage $c_1$ in FIG. 1), $SO_3$, as well as any leftover steam is further liquefied and collected in a chamber cd4 below the water tank M4 (FIG. 11). Mercury (boiling pt. 356.7° C.) is majorly condensed in steps 6 & 7. Some of the remaining mercury is also condensed in this step 8. Any mercury vapor that condenses along with $SO_3$ or water from steam will settle at the bottom (FIG. 6) and can be separated by gravity. This happens in process within in collector cd4 of heat exchanger H5 in FIG. 1. In cd4 chamber (FIG. 1), more steam from the flue gas will be collected, compared to that in steps 6 &7. Thus, the sulfuric acid formed from the dissolved $SO_3$ in condensed steam is dilute in this section compared to that in step 6 & 8. The internal linings of the tube in FIGS. 6, 7 & 8 have protective coating as said earlier. It is to be noted that the steps to capture mercury in this invention may not capture all of mercury in the flue gas as the mercury content after capture of some mercury is quite small (in the ppb range).

Capture of Nitrogen Dioxide $NO_2$ (b.Pt 21° C.)

Step 9: To separate $NO_2$ (boiling point 21° C.), the compressed flue gas (~4 bars) from step 8 is further cooled to 21C by passing through tubes (not shown) inside a heat exchanger H6 of type I (in FIG. 1). The flue gas then passing through the continued line A4 is then compressed adiabatically (to ~7 bars) by two pumps denoted by P3. This compression is done in two stages. The first pump at P3 (which is the third pump in the series of 15 pumps used in this invention) isoentropically compress the flue gas from step 8, to 5.5 bar; the compressed gas is then cooled to ~18 to 19° C. by passing through tubes inside a (sixth) heat exchanger, H6 (FIG. 1) of type I, which is cooled by said cold $N_2$ gas flowing in two lines CN2 and CN3 [FIG. 1]. The flue gas is then further compressed to 7 bars by the second pump at P3 (which is the fourth pump of the said 15 pumps used in this invention) and cooled by passing through 7th heat exchanger, of type I, H7 (FIG. 1) maintained at 8° C.±2 by controlled flow of the cold nitrogen gas conveyed by two nitrogen lines, CN2 and CN3 passing through H7 (FIG. 1) from right to left (in direction opposite to the flue gas flow direction). The flue gas tube (F1 in FIG. 6) of the heat exchanger H7 is similar to that shown in FIG. 6 which is embedded in FIG. 11. The nitrogen gas carrying coil M5 (FIG. 11) is wrapped around the coil F1 and then embedded in water M4 of FIG. 11. We found that the condensing coil G18 of FIG. 7 is also suitable for the heat exchanger H7, if the said coil is embedded in FIG. 11 without any pebbles or metal chips, but with water, M4 (FIG. 11). This process will condense and separate liquefied $NO_2$ (boiling point 21C) from the flue gas. In this step the most of the acid vapors $HNO_3$ (b.pt 83° C.) and $H_2SO_4$ (b.pt 337), if present in a flue gas, are also condensed. These will also dissolve in the water condensed from the water vapor in the flue gas. This step will also condense and separate most of the remaining mercury vapor (but not completely) in the flue gas. There is arrangement for the condensate to be collected either in flue gas tube of a heat exchanger shown in FIG. 6 or FIG. 7. It will further separate the steam of the flue gas in the form of water.

In this invention we found that it is necessary to separate all the steam ahead of subjecting the flue gas to cryogenic processes below 0° C. in the steps described below, so that compressors do not get chocked when compressing flue gas below 0° C. Liquefied $NO_2$ and water (condensed steam) may be mixed as the condensed flue gas components are collected in the collection chambers F4 of FIG. 6 with FIG. 11, or, collection chamber G16 of FIG. 7 through pipe G11. The collection is shown by arrow to cd5 FIG. 1. or FIG. 8. FIG. 8 could be an alternative collection chamber to FIG. 7 for this step 9 also. In the case of flue gas from natural gas fired power plants, this step will condense most of the water vapor of the flue gas along with $NO_2$ which is collected as condensate F6 (FIG. 6). This is important so as to prevent the formation of solid ice in the latter cryogenic stages. Formation of ice during the cryogenic processes at latter stages can choke the compressors and expansion valves. Such possibility is avoided in this invention.

Capture of $SO_2$ (Boiling Point −10 C)

Step 10: The $SO_2$ concentration in a normal air-fired (without excess oxygen) coal-fired plant ranges from 1000 to 1700 ppm (Z22) while the $CO_2$ and $H_2O$ concentrations are in the range: 12% and 4.5%[Z22]. After removal of steam as discussed in earlier steps, this concentration increases slightly.

After step 9 the flue gas contains mostly $SO_2$, $CO_2$, $N_2O$, NO, CO, unreacted nitrogen/oxygen, some traces of noble gases. In this invention henceforth we call the unreacted nitrogen/oxygen, some trace noble gases, as simply "nitrogen, $N_2$". It is the major component. The flue gas after step 9 is further compressed gas to pressure 8 to 9 bars by the fifth compressor at P4 (FIG. 1) (in section $c_3$-d in FIG. 1. This is the fifth compressor of the said 15 compressors). The compressed gas is passed through the eighth heat exchanger H8 (of FIG. 7) as shown in FIG. 1. This heat exchanger and all heat exchangers up to the point of capture of carbon monoxide are of type II. Type II heat exchangers in this invention do not contain water but pebbles or metal chips (G14 in FIG. 7) to provide enough heat capacity to retain the "coldness" from the cold nitrogen gas.

The pebbles or metal chips are made dust free and dry before being kept in racks surrounding the tube (G18) of FIG. 7. For collection of liquefied $SO_2$, $CO_2$, $N_2O$, NO, CO, each separately, the chamber (FIG. 7, FIG. 8) does not contain any water as mentioned earlier and the arrangement is mentioned in the part B description of drawing of FIG. 7. Pebbles of granite (low value) of diameter 5 mm to 1 cm are found to be suitable for the heat exchanger of FIG. 7 for the step 10 to step 15 as these have good thermal conductivity $K_{th}$ values $K_{th}$=3.98 W/m·K. and Kth=5.38 W/m·K, respectively [Holman, J. P. Heat Transfer. 7th ed., New York: McGraw-Hill, 1900. (Appendix A.3)]. The said pebble have specific heat of 790 J/K·kg and 830 J/K·kg. Thus, the pebbles also retain the cold from the flowing nitrogen gas in the chamber.

For step 10, the said heat exchanger H8 of chamber of FIG. 7 (or FIG. 8) is placed after the compressor P4 near point d (FIG. 1).

In this invention we find two methods to be very useful for cooling the flue gas below 0 C. In the first method the condensing coil (say, G8 of FIG. 7) is surrounded by a coil of type M5 of FIG. 11 and the heat conducting pebbles or metal chips (not water as in FIG. 11) will be placed in racks surrounding both the coils. There is helium gas at pressure ~1.5 to 2 bars and it is circulated by a small fan inside the chamber. The whole unit is made air tight.

The pebbles will facilitate heat conduction from the flue gas tubes with the help of helium gas to the cold nitrogen gas carrying tubes (which has thermal conductivity 0.15 W/m·K.) at pressure 1 to 2 bars. The helium gas inside the chamber is circulated by a fan (not shown in FIG. 7). Also, the chamber is air-tight with helium gas inside. The helium gas enables good heat conduction for the heat exchange. The helium gas enables much better heat conduction for the heat exchange [Z11] compared to air Kth=0.02 W/m·K and much better than vacuum, the latter can act as heat insulator. Air is not suitable in this heat exchanger as water vapor in air will freeze as ice on tubes. It has been seen by Jiang et al [Z11] that helium filled chambers enhances heat conduction by 41% compared to air filled chamber. Even though hydrogen has slightly higher thermal conductivity (0.18 W/m·K) than helium[Z12], it is not chosen as the filling gas of the chamber, because it is explosive. The thermal conductivity of helium (0.15 W/m·K) is much higher than that (0.026 W/m·K) of air. A small fan (not shown in FIG. 1) inside the chamber H8 operated by a solar power will circulate the helium gas throughout and thus will further enhance the heat exchange rate in chamber of FIG. 7 when used for steps 10-15.

Said cold nitrogen gas obtained after a third turbine (T3 in FIG. 1) expansion, is passed at 2 bar through a tube in this chamber[FIG. 7] such that the chamber H8 (FIG. 1) is cooled to temperature −14° C. by the controlled flow of cold $N_2$ gas (obtained at the end of the cycle). This cold $N_2$ flows from the point k of the $CO_2$ condensation unit in step 11 to the left of FIG. 1 as indicated by the arrow near the point k (FIG. 1). Sulfur dioxide ($SO_2$) of the flue gas is condensed in the bottom of the U-tube part G10 (FIG. 7) of the condensing tube (G18) in the heat exchanger H8 (type II) of FIG. 7 kept after the point d (FIG. 1) which is near the compressor P4. When the flue gas is subjected to 8 to 9 bars the $SO_2$ concentration per unit volume increases 8 to 9 times also. At −10 C to −14 C, $SO_2$ (b.pt −10 C at atmospheric pressure) is then condensed in the form of liquid $SO_2$ in the U-tube section of the condensing coil of FIG. 7. The uncondensed flue gas from each section of the flue gas coil (FIG. 7) passes over the condensed $SO_2$ (G10 in FIG. 7 represents in general a component condensed from the flue gas) to another part of the tube through a connecting tube G9 (FIG. 7) for further condensation. The condensed $SO_2$ from each U-tube part runs down through the pipe G11 (FIG. 7)[the pipe G11 is connected to each U-tube section of the flue-gas tube G8 is collected (G16) in an insulated tank/chamber G15 that is connected to the pipe G11. The collection of sulfur dioxide ($SO_2$) is shown by the arrow pointing to cd6 in FIG. 1. The tank/chamber G16 (FIG. 7) collecting this $SO_2$ is outside the heat exchanger unit, H8 and connected to the condenser coil/tube [FIG. 7 or FIG. 8]. Such arrangement also allows rapid collection of the liquefied form of $SO_2$ captured from the flue gas. This particular step of collection is not necessary for flue gas from clean natural gas fired power plants as it does not contain sulfur dioxide. The cold $N_2$ coming out of the $SO_2$ condensation chamber at point 1 (FIG. 1] is divided in two lines, CN2 and CN3 at point m [FIG. 1]—one line CN3 directly goes to the ammonia condenser unit (AM4 in FIG. 1) to cool the water in AM4 that is used to cool the compressed $NH_3$ gas after the turbine expansion in step 4 above. The other line CN2 of the cold $N_2$ enters the $NO_2$ condensation chamber. All sections of lines (tubes) carrying cold nitrogen gas and outside the heat exchanger chambers are covered with insulation such as polyurethane having low thermal conductivity (Kth between 0.02 and 0.023 W/m·K. at temperatures below 350 K [https://www_engineeringtoolbox.com/polyurethane-insulation-k-values-d_1174.html)]. Other form of good insulations (low effective theitual conductivity ~0.02 W/m·K) have been discussed earlier.

In second type as shown in FIG. 7, there is no coil of type M5 of FIG. 11 surrounding the condensing coil (G8) which is embedded inside the pebbles or metal chips (G14), the latter being arranged in racks (not shown in FIG. 7) surrounding the condensing coil. The cold nitrogen gas flows in through port G6 (FIG. 7) and cools the pebbles and the condensing tube (G18 FIG. 7) directly without using helium gas inside. The nitrogen gas leaves the port G7 of a given heat exchanger unit to enter the port G6 of another heat exchanger unit (FIG. 7). In this second method the nitrogen gas finally exiting the point a in FIG. 1 will not be as pure as the nitrogen gas exiting the point a in the first method described above.

After this process the flue gas contains mostly unreacted $N_2$, $CO_2$, and some small amount of $N_2O$, NO and much smaller amount of CO (carbon monoxide).

Capture of $CO_2$ and Production of Liquefied $CO_2$ from the Flue Gas

Figure 2:
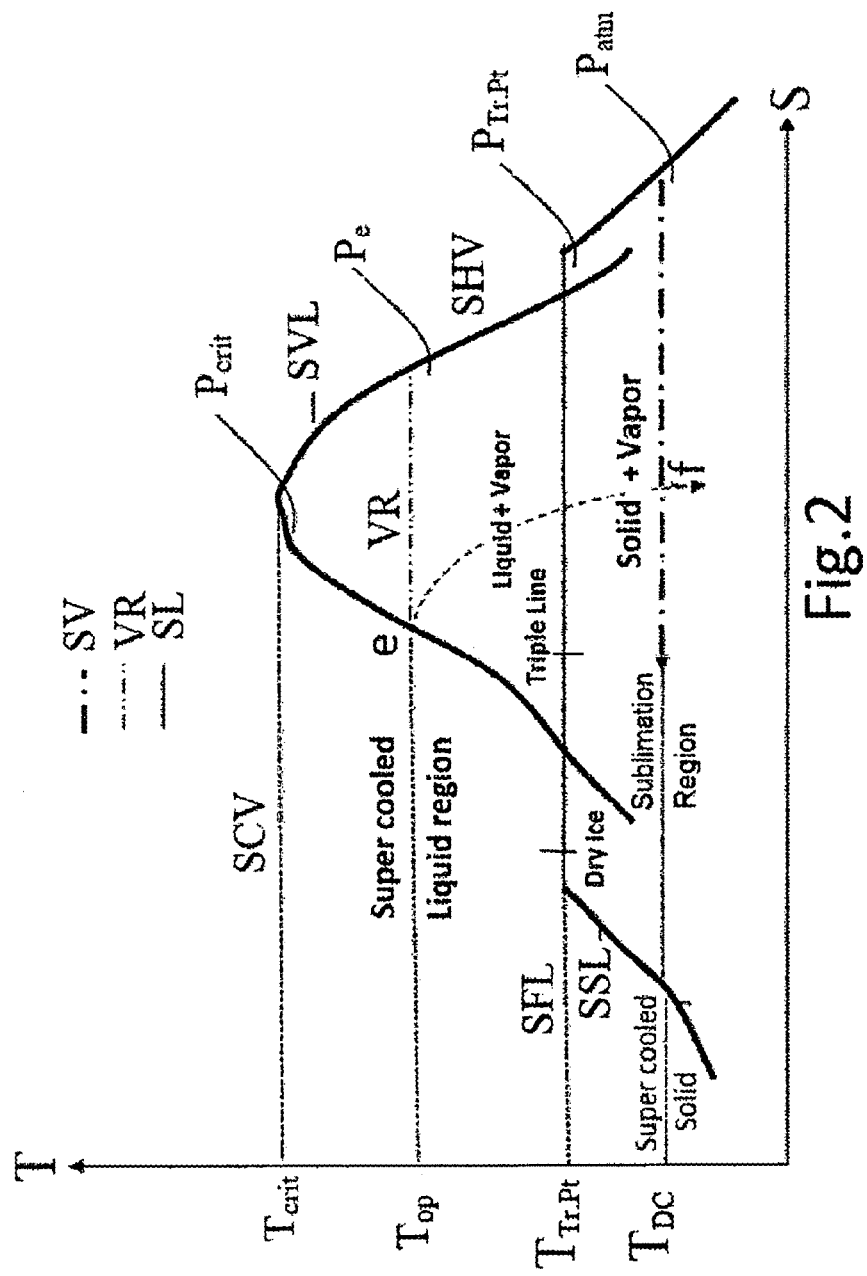
FIG. 2 is the temperature-entropy (T-S) diagram of carbon dioxide during production of liquefied $CO_2$ and dry ice from the flue gas during steps 12 to 14 in section I.1 of STEPS & PROCESSES INVOLVED TO ACHIEVE THE SAID OBJECTS OF INVENTION.

Liquefaction and hence capture of $CO_2$ from an industrial flue gas in this invention is based on the temperature entropy diagram shown in FIG. 2. Referred to FIG. 2, the following notations have been used: $P_{crit}$=73.8 bars. $P_e$=26.49 bars. $P_{Tr.pt}$=5.18 bars; SCV=Super critical vapor region; SHV=Superheated vapor region; SSL=Saturated solid line; SFL=Saturated fusion line; $P_{atm}$=Atmospheric Pressure=1.01325 bars; LV=Liquid+Vapor line; SVL=Saturated Vapor Line; SL=Saturated liquid line; $T_{crit}$=Critical temperature; VR=vaporization line; SV=Solid+Vapor line; Petit=73.8 bars; $T_D$c=Dry ice desublimation temperature=−78 C; $T_{Tr.pt}$=−56.6 C; Top=Operating temperature for liquefaction of $CO_2$=−10 C.

Step 11: All the heat exchangers (H9, H10, H11, H12 in FIG. 1) used for steps 11 to 15 are of the type 11 and shown in FIG. 7. Type H heat exchanger structure is discussed in details earlier. After sulfur dioxide ($SO_2$) is collected by step 10 from flue gas of a coal power plant or after $NO_2$ is captured and collected by step 9 from a flue gas from a natural gas power plant, the flue gas coming out of heat exchanger H8 [FIG. 1] contains mostly $CO_2$ [15 to 25%], unreacted nitrogen [70-74%], and the rest as $N_2O$, NO and CO. This flue gas coming out of H8, from step 10 above, is at temperature ~−10 C but at pressure ~7 bars (less than the compression pressure of 8 to 9 bars at step 10 due to cooling]. This flue gas enters a series of 10 compressors starting at the point t (FIG. 1). This series of 10 compressors near the point t are shown (represented) by one compressor P5 in FIG. 1. Each of these 10 compressors compresses the flue gas isoentropically (adiabatically) at an increasing steps of approximately 2 bars, such that the final pressure is ~26.5 bars to 27 bars. After each compression, the flue gas temperature rises and it is passed through a type H heat exchanger of FIG. 7 maintained at ~−18° C.±2. The temperature is maintained by controlled flow of cold nitrogen gas as discussed earlier for type II heat exchanger. At the last step, i.e., the $10^{th}$ compression of this series at P5 (FIG. 1), the flue gas attains the pressure 26.5 bars to 27 bars. The heat exchangers between H9 and H8 that are maintained at −18° C.±2 to cool the gas after each compression at P4 are not shown in FIG. 1. These additional heat exchangers cool but will not condense any component until the flue reaches the heat exchanger H9. When this flue gas is passing through the heat exchanger H9 which is maintained at −18±2 C, the flue gas at pressure between 26.5 bars to 27 bars cools down fast to −10 C to −11 C. At this point $CO_2$ gas of the flue gas condenses to a liquid $CO_2$ according to the dashed line passing through the point e in FIG. 2, which is the temperature vs entropy curve of $CO_2$. The heat exchanger H9 (FIG. 1) is maintained at −18° C.±2° C. by flow of cold nitrogen gas line CN1 which re-enters the heat exchanger H10 and passes through the heat exchanger H9 in directions from right to left (reverse direction FIG. 1). This line CN1 is made of two cold nitrogen lines: CN4 and CN5. The original cold nitrogen line CN1 (nitrogen gas at −195 to −194° C.) splits up at the point r (FIG. 1) into CN4 and CN5. These two lines, after accomplishing assigned cooling (described later), merge again into a single line at point near q (FIG. 1), which enters heat exchanger H12 from the right [FIG. 1].

The liquefied $CO_2$ in heat exchanger H9 (FIG. 1) is then condensed in the U-tube portion (G10) of the type heat exchanger, H9 (shown in FIG. 7). It then runs down through the slanting pipe G11 (FIG. 7) to the collector pot, G15 as the liquefied $CO_2$, G16 (FIG. 7). The uncondensed flue gas (containing mostly nitrogen gas and small amounts of $N_2O$, NO and CO) passes over the liquid (G10) from one section to other sections of the heat exchanger, H9 of type II, through a connecting tube G9 (FIG. 7) and finally to the exit port (G17), as the flue gas G2 to enter the port G1 of another heat exchanger H10. The liquefied $CO_2$, $LCO_2$, from heat exchanger H9, is shown to be collected in chamber cd7 (FIG. 1), which is the G15 of FIG. 7. The said arrangement allows rapid condensation of liquid $CO_2$ and its ($CO_2$) collection.

The $CO_2$ captured from flue gas in the form of liquefied $CO_2$ in G15 of FIG. 7 (or, cd7 of FIG. 1) can be either collected in tanks (from cd7 in FIG. 1) by industries or be connected to a throttle valve L2, for throttling and expansion into a flash chamber FC (FIG. 1) for dry ice production.

Having separated $SO_3$, $SO_2$, acid vapors, mercury vapors steam (with boiling points above −10 C) earlier and that the flue gas after this separation and separation liquid $CO_2$ in step 11 has components mostly unreacted nitrogen (nearly 75%) and small amounts nitrous oxide (b.pt, −58.5 C), nitric oxide (−152 C) and carbon monoxide (b.pt −191.5), the liquefied $CO_2$ (G16 in FIG. 7) contains pure $CO_2$ is 99.9% or higher. Xu et al[Z18] employing high pressure (>60 bar) and near ambient temperature distillation determined by simulation work that the purity of cryogenically condensed $CO_2$ from a mixture of gases is 99.9%. The $CO_2$ in our case being condensed at lower pressure (26.5 bar) and temperature (−10 C). Based on boiling points, of the components and the fact that their concentrations are much lower [Z19] than. $CO_2$ (concentration between 10-25%) in the flue gas, the liquefied $CO_2$ in this invention is expected to have purity greater than 99.0%.

Production of Dry Ice from the Liquefied $CO_2$ Captured in Step 11.

Step 12: After capturing $CO_2$ in the form of liquefied $CO_2$ ($LCO_2$) in step 11, the flue gas remaining after step 11, mainly comprises unreacted nitrogen, some small amounts of nitrous oxide ($N_2O$), nitric oxide (NO) and carbon monoxide (CO). The liquefied $CO_2$ is collected as discussed earlier. Part or whole of it can also be converted to dry ice. In this step we discuss the process to convert the liquefied $CO_2$ to dry ice. For dry ice production, the insulated chamber G15 (FIG. 7) (corresponding to cd7 in FIG. 1) collecting the liquefied $CO_2$ is connected via throttle valve, L2 (FIG. 1) to the flash chamber FC (FIG. 1, FIG. 9) in this step.

To produce dry ice, the captured $LCO_2$ (at step 11 above in the chamber cd7 (FIG. 1)) (represented by state e in FIG. 2) is made to flow along the insulated line L1 (FIG. 1) to the throttle valve L2, which is throttled adiabatically by sudden opening of the valve L2 into an insulated flash chamber FC (FIG. 1 & FIG. 9), placed between points o & p in FIG. 1. The $LCO_2$ is represented by e in FIG. 2. The throttling follows the path shown by dashed line e-f in FIG. 2. The conversion of liquid $CO_2$ by adiabatic throttling to dry ice is shown by state f in FIG. 2. Process (e-f) (FIG. 2) is the adiabatic throttling of the liquid carbon dioxide ($CO_2$) by an expansion valve L2 to atmospheric pressure at state f in an insulated flash chamber FC (FIG. 1 & FIG. 9), where state f (FIG. 2) is a mixture of solid dry ice (DI) and vapor $CO_2$ (VC) (FIG. 1 & FIG. 9), VC being referred to as dry vapor in FIG. 1. This process is an irreversible adiabatic expansion; hence the dashed line (FIG. 2). The design of the flash chamber FC to collect the dry ice (DI) & vapor (VC) is shown in FIG. 9. It has a throttling valve L2 (FIG. 1 & FIG. 9) for liquid $CO_2$ ($LCO_2$) to enter. It has an inlet for very cold $N_2$ gas line CN5 (FIG. 9 & FIG. 1) to enter (coming after the condensation of CO (carbon monoxide) following the 3rd stage expansion of the turbine T3 (FIG. 1). The chamber FC has an outlet for this $N_2$ gas line (CN5) that enters the heat exchanger H2 through the point q (FIG. 1). This cold nitrogen line CN5 is obtained by splitting the original cold nitrogen line CN1 (FIG. 1) at the point r into two lines: CN4 and CN5. The cold $N_2$ gas flowing in the chamber FC of FIG. 1, freezes the dry vapor (VC) into dry ice (DI) and further freezes the dry ice already formed during throttling of $LCO_2$ [FIG. 9]. The flash chamber FC (FIG. 1 & FIG. 9) contains an outlet with valve I1 (FIG. 9) for the dry ice at the bottom to enter a long column at the end of which there is another valve I2 which opens automatically by the weight of the DI. This arrangement of the DI collection prevents escape of very cold $N_2$ gas which enters the chamber FC [FIG. 9] through the line CN5, while dry ice is continuously formed and collected. The arrangement prevents also the external air to enter the flash chamber FC (FIG. 1). The cold nitrogen gas being regulated to keep the temperature of the flash chamber to ~−88° C.±1° C. (i.e, 10° C. below −78° C., the sublimation point of dry ice). The super cooled $N_2$ gas (−194° C. to −195° C.) is obtained by following the steps 14-15. The insulated flash chamber FC is air tight so that air does not enter from outside. The remaining flue gas after separation of $CO_2$ (in liquefied form in step 11 and in dry ice form in step 12) contains mostly unreacted nitrogen ($N_2$), nitrous oxide, nitric oxide and some traces of carbon monoxide (ignoring traces of noble gases). This remaining flue gas moving in the right after point f in FIG. 1 still is at a pressure of 26.5 bars. The insulation of the flash chamber can be made of materials such as polyurethane, glass wool, or any material(s) with low thermal conductivity, $K_{th}$ ~0.02 to 0.03 W/m·K). All lines carrying cold nitrogen gas is insulated by such materials of thickness 0.2 to 0.25 m. Other means of good insulation as discussed earlier or vacuum insulation as used in Dewar flux can also be employed.

Separation of $N_2O$ (b.Pt −127.3 F=−88.5 C) from the Flue Gas

Step 13: After capture of $CO_2$ from the flue gas through the production of liquefied $CO_2$ and the dry ice in step 12, the remaining flue gas coming out of heat exchanger H9 in FIG. 1 is still at ~−10 C and pressure ~26.5 bars. This flue gas contains unreacted nitrogen gas, small amounts of $N_2O$, NO and CO. It is subject to further cooling by passing it through heat exchanger H10 (type II) (FIG. 1) which is maintained at a temperature of −50° C. to −60° C. by the controlled flow of the cold $N_2$ gas entering the said heat exchanger H10 from the $N_2O$ collection chamber H11 (chamber of $N_2O$, H11 in FIG. 1), through the line CN1 (cold nitrogen gas moving from right to left through the heat exchanger H10). The flue gas flows from left to right while the cold nitrogen gas flows from right to left with respect to FIG. 1. The cold $N_2$ gas along line CN5 from the flash chamber FC (FIG. 1) in step 12 enters the heat exchanger H12 from the right near the point q (FIG. 1) where it also joins the line CN4 coming from J6 (where nitric oxide (NO) is captured). These two lines move as CN1 and passes through H12 and then through H11 where $N_2O$ is condensed. The collection chamber H11 is shown in FIG. 10. Such chamber is used for capture and collection of $N_2O$, NO and CO.

Step 14a: It is (i) the isentropic expansion of the above compressed flue gas from step 13 (containing mostly nitrogen gas) (from step 14) (at pressure 26.49 bars) coming out of heat exchanger H10, by the first stage (T1) of a triple-stage turbine (T1-T2-T3) (FIG. 1) to a pressure of 13.3 bars to 15.6 bars, depending on the initial cooling temperature (−50° C. to −60° C.). This expansion by turbine. T1 lowers the flue gas temperature to −89.9° C. The $N_2O$ at this temperature and pressure 13.27 bars will condense to a liquid $N_2O$ (b.pt −88.5 Cat 1 bar; At 13.27 bars its ($N_2O$) boiling point is expected to be much higher than −88.5 C. Thus at 13.27 bars and temperature −89.9 C, the $N_2O$ of the flue gas condenses to a liquid). To collect the liquefied $N_2O$, this turbine expanded flue gas from first stage turbine T1 (FIG. 1) is led to a condensing chamber J8 of FIG. 10 [at the position of H11 with cd8 in FIG. 1] inside of which is kept at ~−96° C.±2° C. [represented by heat exchanger H11 in FIG. 1] by controlled flow of cold nitrogen gas. It is led through the port J2 into J8 and it exits after condensation of $N_2O$ through the port J3. The chamber J8 is metallic while chamber J6 (FIG. 10) has insulating walls. After exiting through J3 (FIG. 10) [i.e., coming out of H11 to the right in FIG. 1], the flue gas enters the heat exchanger H12 for further processing. The chamber J8 (FIG. 10) is air-tight and is kept within an air-tight insulated chamber J6 (FIG. 10). The walls of the chamber J6 are insulated by a thick (0.2 m. to 0.25 m. thick, $K_{TH}$ 0.02 to 0.03 W/m·K) insulation material (not shown in FIG. 10) as discussed earlier (the thermal conductivity of the insulation material should be ~0.02 W/m·K. to 0.03 W/m·K.). This chamber J8 is maintained ~−96±2° C. by flow of cold nitrogen gas entering J6 (FIG. 10) through the port J4 and the nitrogen leaving through the port J1 (FIG. 10). The control is done by using flowmeter, pressure gauge and temperature controller in all parts of this invention, such control systems being known in existing arts and not shown in FIG. 1. The chamber J8 is made of a metal, like aluminum ($K_{TH}$=205 W/m/K) to enable good thermal conduction between surrounding cold nitrogen gas and the condensed liquid (J9 in FIG. 10) inside. It is standing on insulating supports J10 and ill (FIG. 10) such that it is slightly slanting (tilting from left to right). This enables first rapid condensation of the $N_2O$ of the flue gas after the said turbine expansion (i.e., by T1—FIG. 1) and then rapid collection of the condensed liquid, $N_2O$ (into an insulated container not shown) by opening the tap (FIG. 10). This arrangement of FIG. 10 for collection of liquid $N_2O$ is shown by arrow pointing to cd8 in FIG. 1. Using an external tap (FIG. 10), outside the insulating chamber J6, the liquefied $N_2O$ is collected for use by industry. Using existing art (not shown in FIG. 10) the condensation and collection of liquid $N_2O$ inside J8 is made such that external air does not enter the metallic chamber J8 or the insulating chamber J6, when liquefied $N_2O$ is collected through the tap (FIG. 10). This tap is outside the insulation of the chamber J6, though connected to the metallic chamber J8. H11 and J6 of FIG. 1 are same as J6 of FIG. 10. For commercial application of this invention, the insulating chamber J6 (FIG. 10) has walls made of insulating materials with thermal conductivity 0.02 W/m~K. to 0.03 W/m·K. and thickness 0.2 to 0.25 m. The chamber of FIG. 10 is used to capture also NO and CO as described below. It is represented by H11 pointing to cd8, J6 pointing to cd9, and J6 pointing to cd10 in FIG. 1.

Capture of Nitric Oxide (NO— Boiling Point −152 C at 1 Bar).

Step 14b.

(typical concentration 160 ppm to 1000 ppm for gas fired power plant and 650 ppm to 1420 ppm for coal fired power plants; boiling point −152 C at 1 bar pressure).

After the liquefied $N_2O$ is condensed and collected in a metallic container J8 inside the insulated jacket J6 [FIG. 10] in step 14a, the remaining flue gas coming out of the port J3 (FIG. 10) [i.e., coming out from heat exchanger H11 in FIG. 1] contains mostly unreacted nitrogen ($N_2$), some nitric oxide (NO) gas and carbon monoxide (CO) gas. The typical percentage of these components in a flue gas from coal power plants is: NO— 400 to 600 ppm; CO—40 to 1000 ppm.[Z22]. This flue gas then enters the twelfth heat exchanger H12 at a pressure 14±1 bars. The flue gas is here further cooled to temperature −106 to −110 C by passing through a twelfth heat exchanger H12 of type H (FIG. 1). This heat exchanger H12 is cooled by cold nitrogen gas coming from the point q at the right of H12 (FIG. 1) which is before the second turbine T2 (FIG. 1). The heat exchanger H12 like H11 (FIG. 1) is of type E1 described earlier and shown either in FIG. 7 or FIG. 8. However, in H12 no condensate is collected in this invention. The flue gas coming out of heat exchanger H12 (FIG. 1) (and moving in the forward direction) is then further expanded isentropically through the second turbine T2 (FIG. 1) to a pressure of 4.87 bars. The temperature of the expanded flue gas drops to −155 C. The boiling point of NO is −152 C at 1 bar. So, by thermodynamic principle, the boiling point of NO at 4.87 bars will be above −152 C. This turbine expanded flue gas enters through the flue-gas inlet-port, J2 into a metallic chamber J8 (FIG. 10) kept at −165±2° C. inside an insulated chamber J6 of FIG. 10, using controlled flow of cold $N_2$ gas (−195 C) that comes right after expansion by a third turbine (T3 in FIG. 1) expansion. The cold nitrogen gas flowing in insulated line CN1 (FIG. 1) is split at the point r (FIG. 1) into two lines CN4 and CN5 (both lines being insulated). The line CN4 is fed to this NO (nitric oxide) capture chamber J6 (with condenser pointing to cd9 in FIG. 1). The other half CN5 goes to the dry ice condensation chamber FC through the line CN5 [FIG. 1]. Nitric oxide (NO) of the T2-turbine (FIG. 1) expanded flue gas condenses to a liquid NO at −155 C and pressure 4.87 bars in the metallic chamber J8 [FIG. 10]. J8 is kept within the insulated J6 [FIG. 10]. J6 after turbine T2 is also shown in FIG. 1. The chamber J8 which is contained in J6 (after T2 in FIG. 1) collects the condensed liquid NO (J9 in FIG. 10 and the condenser CC below J6 pointing to cd9 in FIG. 1). cd9 indicates collection of liquid NO. The latter is done by opening the valve (FIG. 10) and letting liquid NO drop in an insulated container (not shown).

The liquid NO collection chamber, J8 [FIG. 10] is jacketed inside an insulated second chamber J6 (FIG. 10). and the inside of this second chamber (similar to FIG. 10) is cooled by controlled flow of said cooled $N_2$ gas (FIG. 1) (which has temperature ~2 degrees above the boiling point −196 C, obtained after third turbine expansion), so that the chamber J8 is maintained at temperatures ~−165±2° C. Chamber J8 is standing on insulating supports J10 and J11 (FIG. 10). This arrangement not only provides further insulation to the metallic chamber J8 but also enables rapid cooling by the cold nitrogen gas which flows in through an inlet-port J4 and leaves through an outlet-port J1 (FIG. 10). The chamber J8 (FIG. 10) is metallic in order to cool the condensate rapidly by the cold nitrogen gas entering J6 through port J4 and leaving J6 through port J1. The conventional insulators such as alternate combination Styrofoam/polyurethane sheet (Kth~0.03 W/m·K) and reflecting aluminum foils or any form of good insulation works well for the external jacket J6. This arrangement is not shown in FIG. 1. The cooled nitrogen gas (temp −195 to −194 C) results from the third stage turbine (T3 in FIG. 1) expansion comes in line CN1 (FIG. 1). The uncondensed flue gas leaves the chamber J8 through the outlet-port J3 (FIG. 10) to enter the third turbine T3 (FIG. 1). After the cold nitrogen gas leaves J6 through the port J1, it then enters the heat exchanger H12 (FIG. 1). The flue gas after leaving J8 (within J6) through the port enters the third turbine T3 (FIG. 1) for further expansion.

Thus, FIG. 10 collection chamber is used three times in this invention (FIG. 1). One for collection of condensed $N_2O$ [H11 & cd8], the second for condensed NO[J6 & cd9 in FIG. 1] and the third for condensed CO (carbon monoxide) [J6 & cd10 in FIG. 1]. Different cooling temperatures are used for condensation and collection of each of these three components. For commercial application the walls of J6 (FIG. 10) needs to be covered with insulation materials having thermal conductivity ~0.02 to 0.03 W/m·K and thickness 0.2 to 0.25 m.

The stage (i) of step 14 may be avoided if the NO concentration overwhelms the $N_2O$ concentration in the flue gas. NB: A triple stage turbine is used rather than a single-stage turbine to avoid the solidification of NO (freezing pt. of −164° C.) from choking and freezing the turbine blades before exiting the turbine. In many boiler or burner, the $N_2O$ concentration is quite significant relative to NO concentration and hence stage (0 is necessary. In this invention we find that it is very important to ensure that the turbine blades do not choke due to freezing of any of the component of the flue gas.

Production of Super-Cooled $N_2$ (Temp: −194 C to −195° C.) and Capture of CO

Step 15: (typical concentration: 50 ppm in the gas burner; 175 ppm in modern coal burner and 200 ppm in old coal burner as typical concentrations)

In this step, the flue gas coming out of J6 (placed after turbine T2, FIG. 1) after collection of nitric oxide in cd9 (FIG. 1) in step 14b is at temperature ~−155 C and at pressure 4.87 bars. This flue gas is made to undergo isentropic expansion by the third turbine T3 (FIG. 1) to atmospheric pressure into an highly air tight chamber J8 contained in an insulated chamber J6 as described earlier (FIG. 10) and this chamber J6 (with the condenser (CC) pointing to cd10-CO collection in FIG. 1) is placed at the point i after turbine T3 (FIG. 1). This expansion lowers the temperature of the flue gas to between −194 C and −195 C at 1 bar. Carbon monoxide (CO) in a flue gas from coal power plant ranges from 40 ppm to maximum 1000 ppm. Its (CO) boiling point at atmospheric pressure is −191.5 C. Here CO (carbon monoxide) at temperature −194 C to −195 C is condensed at the bottom of the chamber J8 (FIG. 10) to a cooled liquid CO which is collected in a well-insulated container (not shown) after opening the valve [FIG. 10] as $N_2O$ and NO are collected before. The cooled nitrogen gas, free of CO, (~−195 C) is then pumped (pump not shown in FIG. 1) out of the said chamber J8 inside J6 near the point i [after turbine T3 in FIG. 1] and the cold nitrogen gas is pumped in reverse direction (FIG. 1) to perform the various cooling processes as described in steps 14 to 6 above. The reverse direction in FIG. 1 points from right to left, while the direction of the flue gas is always from left to right (forward direction) with respect to FIG. 1. The symbol $N_2$ is used to denote not only the nitrogen gas but all also the inert noble gases present in air which remain unchanged throughout the combustion reaction in a power plant, and the negligible unreacted oxygen remaining after the combustion process. Most of the component gases in the flue gas except nitrogen condenses above −194 C. The concentration of this nitrogen ranges from 75% to 80% in the original flue gas. When this nitrogen gas is obtained in this invention at temperature −194 to −195 C, it is enough to carry out all the cooling processes as described earlier. The cooled nitrogen gas (temperature −194 to −195 C) (source of pure nitrogen (purity 99.9% or higher)) obtained at this stage is sent back in reverse direction following first the line CN1 (FIG. 1) to perform the cooling in reverse order. The line CN1, as said earlier is split into lines CN4 and CN5 at the point r (FIG. 1). These two lines join back into line CN1 again after passing through (from right to left) heat exchange H12. The nitrogen gas continues in line CN1 from right to left through heat exchangers H11, H10, H9 and H8. After passing through heat exchanger H8 (FIG. 1) the line CN1 splits into two lines CN2 and CN3. CN3 passes through ammonia condenser AM4 (FIG. 1) and after cooling the water in AM4 continues to pass through heat exchangers H7 through H3. CN2 continues to pass through the heat exchangers H7 through H3 in reverse direction [FIG. 1] and joins CN3 as a single line which passes through heat exchanger H2 before exiting out.

After performing all the cooling in reverse order, the nitrogen gas reaches ambient temperature at point a (FIG. 1) after exiting through the heat exchanger H2. It then can either be exited out to atmosphere or be collected by industries for further use. It is quite pure (except for the inert noble gases and very small amount of mercury vapor in less than ppb (parts per billion) range).

The part of the split lines and all lines carrying cold nitrogen gas in reverse flow direction before entering the various ports/heat exchangers are wrapped with good thermal insulation material (with Kth ~0.02 to 0.03 W/m·K.). Alternate layers of glass wool and reflecting aluminum foil wrapped around such lines with final layers of shining aluminum foil have been found to act as very good insulation in this invention. Reflection of heat from aluminum layers boosts the insulating properties the said insulation. Alternately, the wrapping of the cold nitrogen gas carrying tubes could be accomplished using materials of low thermal conductivity such as polyurethane sheets, foam (thermal conductivity (Kth) 0.02 to 0.03 W/m·K)(Z8) and glass wool (Kth between 0.023 to 0.04 W/m·K)(Z9) or any material having Kth within 0.02 to 0.04 W/m·K and it can serve as good thermal insulation for tubes carrying cold nitrogen gas to various heat exchangers of the equipment (FIG. 1). The said insulating materials need to be finally wrapped with aluminum sheets. This gives better control over the various cooling processes described in this invention. We however find that it is not absolutely necessary that the nitrogen line has to be split twice at the point r and m (FIG. 1) to accomplish the capture processes. In an alternative process, the nitrogen line coming out of third turbine expansion enters directly the $CO_2$ flash chamber FC (FIG. 1) to solidify the cold $CO_2$ vapor (at −78° C.) into solid dry ice. The cold nitrogen that comes out of this chamber then perform the rest of the cooling processes by entering the heat exchanger J6, instead of H12 as in FIG. 1. This latter arrangement is not shown. However, we find that the control of the cooling is better when the lines are split at the point r (FIG. 1) as indicated earlier. If the flue gas from coal fired power plant contains, hydrogen sulfide ($H_2S$, b.pt. −60° C.) [Ref. T5], then it is captured by following the step 13 but passing the flue gas through another heat exchanger (not shown) placed before the heat exchanger H10 (FIG. 1) and maintaining it at −68° C. using cold nitrogen gas coming from heat exchanger H10 on the right, similar to the processes said above.

After the said cold nitrogen gas (−194 to −195 C) is obtained at this step, it is made to flow by pump in reverse direction through beat exchangers to cool the oncoming flue gas at various heat exchangers. The nitrogen gas then exits to outside air after passing through the heat exchanger, H2, between points a and $b_1$ in FIG. 1.

The work obtained from the expansion of the flue gas by three turbines T1, T2 and T3 (FIG. 1) as described in steps 13 to 15 are used to compress the flue gas in various stages as described in steps 6 to 12, using a shaft (FIG. 1) that connects all the compressors as well as the turbines (FIG. 1). This method reduces the energy needed from external sources to compress the flue gas. It may be mentioned that compression works involve the major energy expenditure in cryogenic capture of $CO_2$ of a flue gas.

One Cycle of Flue Gas Capture Operation in this Invention in this invention, a cycle of flue gas capture, [not a cycle of ammonia auxiliary power generation and not a Rankine cycle mentioned in section I.2.1] begins as the flue gas enters the ammonia superheater A2 at point 1 (FIG. 1) and ends when it exits (to atmosphere) as pure nitrogen gas from the heat exchanger placed between a and $b_1$ (FIG. 1).

Use of the Cold Nitrogen Gas Obtained at Step 15 to Cool the Various Heat Exchangers In this invention, cold nitrogen gas is produced from a flue gas of a either a coal power plant or a natural gas power plant. It is used to cool the flue gas at different stages of capturing its (flue gas) components. In step 15, a method of producing cold (at temperature −195 C and at 1 bar) nitrogen gas from the flue gas of a power plant that uses air to burn fuel (either coal or natural gas) is stated. The cold nitrogen gas coming out in line CN1 (FIG. 1) from the chamber (J6) condensing CO (after third turbine expansion) is then used in cooling the various heat exchangers used in cooling, condensing and capturing the various components of the flue gas, such as steam, $SO_3$, mercury vapor, $NO_2$, $SO_2$, $CO_2$, $N_2O$, NO, and CO by a method comprising the following steps: a) splitting the nitrogen gas carried in line CN1 (FIG. 1) coming out of port J3 of chamber J6 in cd10 [FIG. 1] into two nitrogen gas carrying lines CN4 and CN5 at the point r in FIG. 1; (ii) the line CN4 entering the chamber J6 above cd9 (FIG. 1) with the nitrogen gas in CN4 flowing from right to left; (iii) the cold nitrogen gas carried in line CN5 enters the $CO_2$ dry ice flash chamber FC (FIG. 1) and after freezing vapor VC and the dry ice (DI) in FC (FIG. 1) it comes out as line CN5, which joins near the point q the line CN4 coming out of chamber J6 above cd9 (FIG. 1) (through the port J1 (FIG. 10)) and both CN5 and CN4 entering the heat exchanger H12 as a single line (near the point q in FIG. 1) carrying cold nitrogen gas from right to left and then (iii) the nitrogen gas passes the heat exchanger H12 from right to left and enters the heat exchanger H11 (FIG. 1) and passes it to enter again the heat exchanger H10 as a line CN1 (entering H10 on the left), the nitrogen gas in line CN1 then leaves H10 and enters the heat exchanger H9 in FIG. 1, (for capturing $CO_2$ and liquefying it) on the right and leaving it on the left to enter the beat exchanger H8 (FIG. 1) (for capturing $SO_2$); (iv) the cold nitrogen gas line after cooling the heat exchanger H8 splitting into two lines CN2 and CN3 near the point m (FIG. 1); (v) the CN2 line entering the heat exchanger H7 above cd5, the condenser (FIG. 1) used to capture $NO_2$ and the other line CN3 entering the ammonia condensing chamber (AM4) to cool the superheated ammonia after turbine (AM3) expansion (FIG. 1); (vi) the cold nitrogen gas flowing along line CN3 and after cooling the ammonia in AM4 (FIG. 1) passes also as CN3 line and enters back the heat exchanger H7; (vii) these two nitrogen gas lines, CN2 and CN3, are shown to cool the heat exchangers H7, H6, H5, H4 and H3 by passing from right to left, gradually collecting heat from the flue gas which runs from left to right (with respect to FIG. 1) through these heat exchangers. These two lines C2 and CN3 merge into one line after passing through the heat exchanger H3 (FIG. 1). It then passes through the heat exchanger H2 from right to left and thereby reaching ambient temperature as it exits H2, when it (the nitrogen gas) is either to be collected by industries for further use or to be vented out to atmosphere; (viii) alternatively, the two nitrogen lines CN2 & CN3 can join as single line before entering H7 and then passes through one coil of tube in each (instead of two coils) of the heat exchangers H7 through H2 before exiting out; (ix) the nitrogen gas carrying coil could be of the type M5 in FIG. 11. This coil would be wrapped around the flue gas tube/coil, such as G18 in FIG. 7 or coil F1 in FIG. 6. For, capture of components ($H_2O$, $SO_3$, Hg vapor, $NO_2$) with boiling point above 0 C, the heat exchangers (H1, H2, H3, H4, H5, H6 and H7) which are type I, would contain water. The water in each of type heat exchanger is stirred (stirring arrangement not shown). For capture of components ($SO_2$, $CO_2$), $N_2O$, NO, CO) with boiling point above 0 C the heat exchangers (H8, H19, H10, H11, H12) which are type II. Type II heat exchangers would contain conducting pebbles/metal chips instead of water. The structures of both types of the heat exchangers as well as the condensers for $N_2O$, NO and CO are discussed earlier in details. In this invention we don't need storage systems to store the refrigerant (cold nitrogen gas) or a separate refrigerant like liquid natural gas, unlike in methods of Baxter (U.S. Pat. No. 9,410,736, Baxter, Aug. 9, 2016). Thus, the method is much more cost-efficient.
Methods of Reducing the Net Energy Required and to Make the Industrial Emission Capture Most Cost-Efficient and the Novelties of this Invention in Capturing the Components of the Flue Gas In order to capture $CO_2$ and the associated components ($SO_3$, $SO_2$, $NO_2$, $N_2O$, NO and CO and some of the mercury vapor) in the flue gas of a power plant or from an industrial plant in general we adopt the following steps in this invention:

1. Use of only pressures up to 27 bars by 15 compressors. In this convention we compress the flue gas at 15 stages of compressions using 15 compressors, to pressure only up to 26.5 bars to 27 bars, unlike to 100-200 bars as studied by other inventors of cryogenic techniques (Ref Z33—see also U.S. Patent by Baxter—U.S. Pat. No. 9,410,736, Aug. 9, 2016, Baxter]. Compressors consume most of the energy in cryogenic capture of $CO_2$ and other gases. Further reduction in the compression is achieved in this invention by cooling the flue gas after each compression as described in steps 6 to 15.
2. Cooling the entire unreacted nitrogen gas of the flue gas to a temperature 1 or 2 degrees above the boiling point (−196.5 C) of nitrogen using three stage turbine expansions of the compressed flue gas initially at ~27 bars and using the cold nitrogen gas thus produced to cool the incoming flue gas at various stages and using only fixed amount of water that can be repeatedly used. We find that the cold nitrogen gas cooled to −195 C or −194 C is sufficient enough to cool the flue gas in various stages of capturing the component gases According to the equation: The heat $H_N$ gained by the cold nitrogen gas (assuming 75% of the flue gas; We assume 10% H2O as steam and 15% approx. $CO_2$ by volume) in rising from −194 C to ambient temperature 30 C:

$$H_N = 0.75 \cdot V \cdot d_N \cdot C_N (30-(-194)) = 0.75 \cdot V \cdot d_N \cdot C_N \cdot 224 = 168 \times 1.2 \text{ (kg/m}^3) \times 1.03 \text{ (kJ/kg·K)} = 207.6$$

kJ/m³. d=density and C=specific heat in gas-form.

The heat lost, $H_1$, by flue gas in first cooling to temperature 45° C. (step 7): $H_1 \cong (0.75 \cdot d_N \cdot C_N + 0.1 \cdot d]_{H2O(vapor)} \cdot C_{H2O(vapor)} + 0.15 \cdot d_{CO2(gas)} \cdot C_{CO2(vapor)}).(70-8) + (0.75 \cdot d_N \cdot C_N + 0.15 \cdot d_{CO2(gas)} \cdot C_{CO2(vapor)}(8-(-18))) + (0.75 \cdot d_N \cdot C_N) \times (-10-(-55)) + (0.75 \cdot d_N \cdot C_N) \cdot (-89) - (-108)) + (0.75 \cdot d_N \cdot C_N)(-155-(-165)) = 1.2 \times 62 + 1.13 \times 26 + 0.924 \times (19 + 45 + 10) = 172.2$ kJ/m³.

I Thus, $H_1$ is significantly less than $H_N$, a condition sufficient and necessary to carry out all the cooling described in this invention by only the cold nitrogen gas as said earlier.

After the auxiliary power generation, the temperature of the flue gas may be in the range 25 to 70 degrees C., depending on the initial flue gas temperature. We assume the 70 C here.

3. Utilizing the work output obtained during the expansions of the three turbines T1, T2 and T3 for the compressors to compress the flue gas at various stages using a common shaft (FIG. 1) that connects the turbines and the compressors (FIG. 1) and thus to save the overall energy needed for compressors. As analyzed in section I.2 and onwards, the compression works $W_c$, 297.8 kJ per kg of the nitrogen gas and 188.5 kJ/kg of $CO_2$ is reduced to a net compression works 177.7 kJ/kg of a flue gas containing 75% $N_2$ and 25% $CO_2$ using the work output received from turbine expansion and to a net compression works 176.5 kJ/kg of a flue gas containing 85% $N_2$ and 15% $CO_2$ (dry flue gas from a natural gas power plant).

4. Generation of auxiliary power from the flue gas heat to reduce the overall energy needed to compress the gases at various stages and thus to capture the components of the flue gas.
5. Use of no chemicals but fixed amount of water to capture components of the flue gas from an industry, the water being used repeatedly.
6. No additional costs of capturing toxic components SOx and NOx and other acid vapors of flue gas over the cost of capturing $CO_2$. It captures a part of mercury vapor at no additional cost.
7. Lowest cost (223 MJ/ton of $CO_2$) capturing $CO_2$ and the associated toxic components of the flue gas from coal power plants.
8. Zero or negative cost of capturing $CO_2$ and the associated toxic components of the flue gas from natural gas power plants.
9. In this invention we reduce the net compression work by isentropic compression at increment of approx. 2 bars at each step (until 26.5 to 27 bars is reached) and cooling the flue gas after each compression.
10. In this invention we do not need any storage for refrigerant (cold nitrogen gas) unlike in prior arts (Baxter, U.S. Pat. No. 9,410,736, Aug. 9, 2016). This further reduces the cost of capture.
11. In our techniques we do not need any additional energy to capture $N_2O$, $NO_2$, NO of the flue gas from a natural gas power plant and to capture $SO_3$, $SO_2$, part of mercury, $N_2O$, $NO_2$, NO of the flue gas from a coal power plant over the corresponding energy cost to capture $CO_2$ as evaluated and mentioned in this invention.

I.2 Capture of Flue Gas Heat for Production of Auxiliary Power ($W_{12}$) Using Ammonia Turbine for High Energy Efficiency of the Capture Process.
Cost-Effectiveness of the Capture Processes from Step 1 Through Step 15 and the Auxiliary Power Generation The detailed thermodynamic analysis of the process steps in two special cases of power generations in UK in 2010 as given below in section I.2.1, reveals that the above processes lead to capture cost of 223 MJ for one ton of $CO_2$ and the associated toxic components captured from coal power plants and −237 MJ per ton of $CO_2$ and the associated toxic components captured from natural gas power plants.

I.2.1. An Example—the Application of the Above Methods

Figure 3:
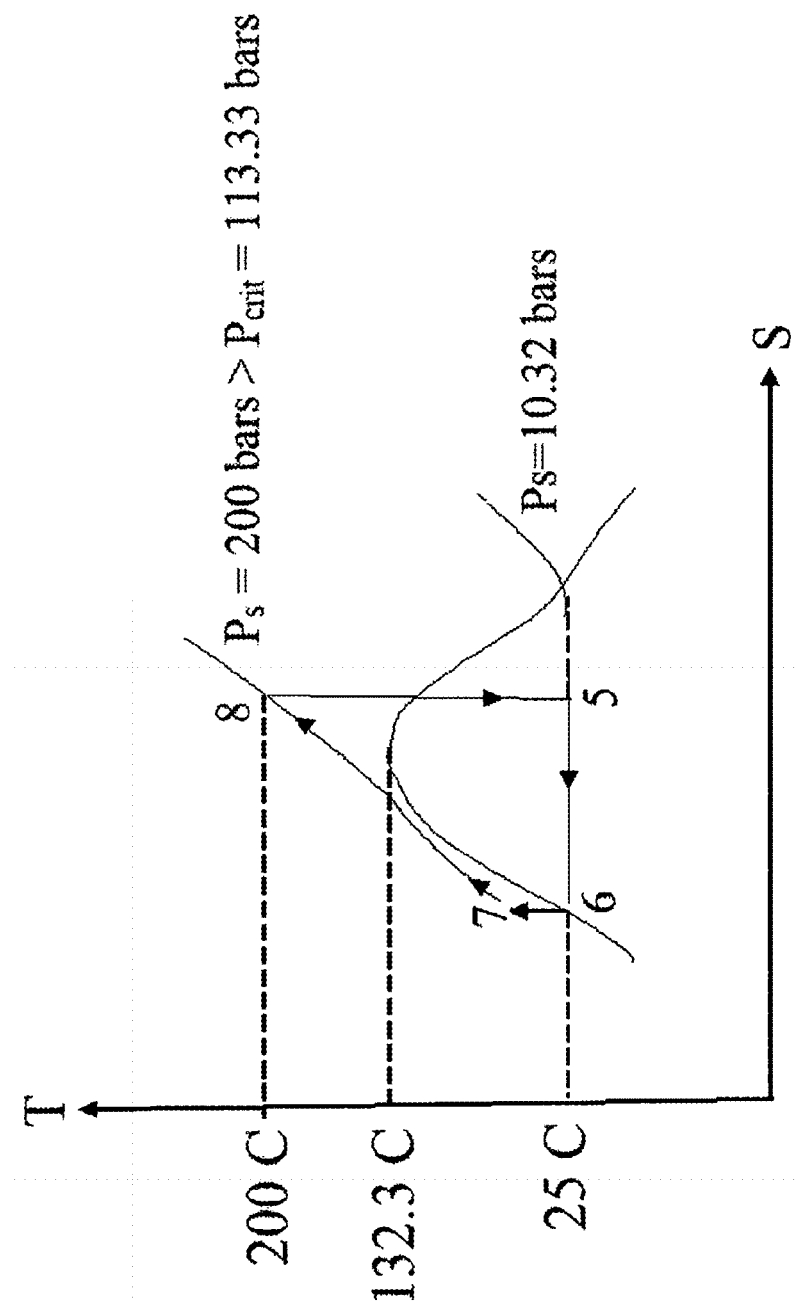
FIG. 3 is a temperature-entropy (T-S) diagram of a super critical anhydrous $NH_3$ power plant used to generate auxiliary power by capturing the heat of the flue gas.
Figure 4:
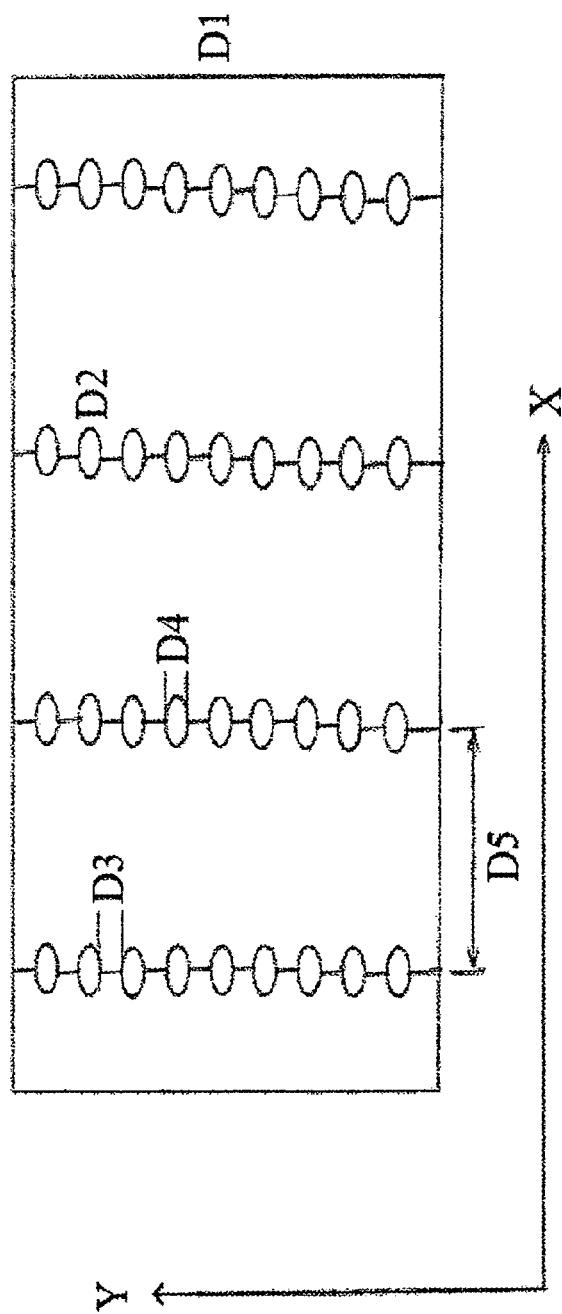
FIG. 4 is cross sectional view of a ceramic plate (D1) used to capture fly ashes of the flue gas. The separation (D3) of the holes (D2) being the same as the diameter (d=D4)) of the holes and the distance between the rows of holes is separated by 3d=D5. D~0.5 mm to 1 mm

The number subscripts in the following example—refer to FIG. 3. The subscripts f & g refer to saturated liquid & gas respectively.
Capture of Flue Gas Heat for Production of Auxiliary Power Using Ammonia Turbine for Cost Efficiency and Low Energy Usage of the Capture Process and its Thermodynamics Analysis In order to make our novel technology of industrial emission capture energy efficient we have incorporated in our technology a method of auxiliary power production using ammonia turbine. It involves the following steps:

FIG. 3 shows the T-s diagram of a super critical $NH_3$ power plant, various process steps of which are described below.

Process (6-7)(FIG. 3) is the adiabatic compression of the saturated liquid at state 6 to a compressed liquid at state 7 by the feed pump (FIG. 1: shows the pump).

Process (7-8)(FIG. 3) is the heating of the compressed liquid $NH_3$ as it cools the flue gas from steps 1 to 4 (sec steps in the specification) discussed above, where it is assumed to attain a super critical temperature of 200° C. at a super critical pressure of 200 bars at state 8. This assumption is very reasonable and attainable with the knowledge that typical temperatures of exhaust flue gases from gas turbines ranges between 370° C.-590° C.[48]. Therefore, by controlling flow rate of $NH_3$ for a particular plant (depending flue gas flow rate) this temperature for $NH_3$ can be attained.

Process (8-5)(FIG. 3) is the expansion of the super critical vapor at state 8 to state 5 [FIG. 3] (step 5 in specification) in a turbine [FIG. 1] to produce the engine motive power.

EXAMPLE

Thermodynamics Analysis of the Auxiliary Power Generation from the Flue Gas Heat Using Ammonia Turbine We assess the energy required to liquefy entire $CO_2$ and to cool the entire unreacted nitrogen gas of the flue gas that would have been emitted if the entire generated electrical energy of $1.4 \times 10^{18}$ J in UK (2010) in UK was by using (i) coal; (ii) Natural gas.

From Thermodynamic Property Table for Ammonia ($NH_3$), PC Model, we find that at State 8 (FIG. 3) (Super Critical Vapor):—$T_8$=200° C., $P_8$=200 bars, $h_8$=1497.7 kJ/kg (specific enthalpy), $s_8$=4.0721 kJ/kg (specific entropy)

In FIG. 2): State 5 is (Wet Vapor):—$T_5$=25° C., $P_5$=10.032 bars, $s_5$=$s_8$=4.0721 kJ/kg (Isentropic Expansion), $v_f$=0.001650 m$^3$/kg (specific volume of saturated liquid at state 5), $h_f$=298.25 kJ/kg, $h_g$=1463.5 kJ/kg, $s_f$=1.1210 kJ/kg, $S_g$=5.0293 kJ/kg Therefore, quality (x) of wet vapor is given as $(x)=(s_5-s_f)/(s_g-s_f)=(4.0721-1.1210)45.0293-1.1210)=0.7551$ Hence specific enthalpy of the wet vapor $h_5=h_f+x(h_g-h_f)=$ 298.25+(0.7551)(1463.5-298.25)=1178.13 kJ/kg The turbine work is $W_{t2}=(h_8-h_5)=(1497.7-1178.13)=319.57$ kJ/kg The feed pump work of compression is $W_p=v_6(P_7-P_6)=0.001650(200-10.032)\times 100=31.34$ kJ/kg Since $v_6=v_f=0.001650$ m$^3$/kg Now $h_6=h_f=298.25$ kJ/kg, and hence $h_7=W_P+h_6=329.59$ kJ/kg The heat supplied is then $Q_{in}=h_8-h7=(1497.7-329.59)=1168.11$ kJ/kg, and the heat rejected in the condenser is $Q_{out}=h_5-h_6=(1178.13-298.25)=879.88$ kJ/kg The net work $W_{net}=W_{t2}-W_p=(319.57-31.34)=288.23$ kJ/kg, and the net heat is $Q_{net}=Q_{in}-Q_{out}=(1168.11-879.88)=288.23$, hence net work is equal to net heat as expected.

Therefore, the thermal efficiency (n) of the ammonia cycle will be $\eta=W_{net}/Q_{in}=288.23/1168.11=24.67\%$ I.3. Application of the Above Technology of Auxiliary Power ($W_{12}$) Generation to Assess the Overall Energy Requirement for Capture of Emission Components from Power Plants.

As mentioned earlier this new technology requires no use of chemicals/reagents but energy (to drive the compressors) to capture the industrial emissions. We take a specific case where correct data are available and assess the total energy required from the output power on top of the auxiliary power generated by methods as mentioned.

1.3.1. Estimation of Auxiliary Power Generated by the Ammonia turbine [FIG. 1] in a Specific Case From Global Trends and Patterns in Carbon Mitigation by Dr Clifford Jones [©2013 Dr. Clifford Jones & bookboon. com, ISBN 978-87-403-0465-7]] the total electric energy generated in the United Kingdom in 2010=$1.4 \times 10^{18}$ J. Imagine that this has been generated by steam turbines on a Rankine Cycle with 35% efficiency [this assumption is quite normal in the case of a coal power plant], then total heat supplied to the steam power plants ($Q_T$) will be $Q_T=(1.4/0.35)\times 10^{18}7=4.0\times 10^{18})$ In general, the combustion efficiencies of power plants are within the range of 70-90% (Rogers and Mayhew 1992). So, in this analysis we have assumed a typical combustion efficiency of 75%. With this efficiency, the enthalpy of combustion ($H_c$) for the fuels in this study will be $H_c=Q_T/\eta_c=(4.0/0.75)\times 10^{18}$ J=$5.33\times 10^{18}$ J. if the total mass (m) of the fuel of combustion is known, then the specific enthalpy of combustion ($h_c$) will be $h_c$=/m, and this is usually referred to as the calorific value of the fuel.

If 75% of the heat of combustion is supplied to the steam boilers, then 25% of this heat will be retained by the flue gases, which can then be used for the heat requirement source of our Ammonia power plant, and this is equivalent to $(0.25)(5.33)\times 10^{18}$ J=$1.333\times 10^{18}$ J.

In FIG. 1; since the $NH_3$ cycle will be cooling the flue gas to temperatures slightly above ambient, the efficiency of combustion ($\eta_e$) of the $NH_3$ power plant can be as high as 85%. With proper heat insulations in step 1 to 5, this can be achieved. With this efficiency of combustion, the total heat supplied to the $NH_3$ power plant ($Q_T$) to heat the working fluid will be $Q_T=(0.85)(1.333)\times 10^{18}$ J=$1.133\times 10^{18}$ J With a thermal efficiency of 24.67% of the $NH_3$ power cycle, the net work output of this power plant will be:

$W_{12}=W_{net}=(0.2467)(1.133)\times 10^{18}$ J=$2.795\times 10^{17}$ J, which will be $(0.2795\times 10^{18}$ J$)/(1.4\times 10^{18}$ J$)$=19.96% of the total energy generated by the steam turbines.

Therefore, the overall energy generated in a flue gas energy capture by the combined power cycles of the steam and ammonia power plants in a year will be $1.4\times 10^{18}$ J+$0.2795\times 10^{18}$ J=$1.68\times 10^{18}$ J. This is a very novel economic concept, since billions of dollars of excess energy can be produced by waste energy globally by all our power plants in a day.

(i) I.3.2. Work of Production of Liquid $CO_2$ from Carbon Capture

Thermodynamic Analysis of the Energy Requirement in the Processes Involved

Since $CO_2$ and $N_2$ are the major constituents of the flue gas from coal and natural gas power plants, and since in our technology nitrogen gas is finally cooled to ~1 to 2 degrees above its (nitrogen gas) boiling point, and this cold nitrogen gas is used to condense most of the component gases of small percentages, it is sufficient to assess the energy required to capture the entire $CO_2$ in the form of liquid and dry ice and the energy required to cool the nitrogen gas. From the methods discussed above, it is obvious that the work of production of the liquid $CO_2$ from carbon capture will involve the difference in the work input to the N-stage compressor and the work output of the nitrogen turbine.

From thermodynamic analysis the minimum specific work done ($W_c$) on an N-stage isentropic compressor is given as $$W_C = c_p T_x N[(P_y/P_x)^{(1/N)(\gamma-1)/\gamma} - 1] \quad (1)$$

Where $c_P$ is the specific heat at constant pressure
$T_x$ is the temperature at inlet to each compressor stage
N is the number of stages
$P_y$ and $P_x$ are the final and initial pressures respectively
$\gamma$ is the specific gas ratio.
The specific work output ($W_t$) by a turbine is given as $$W_t = c_P(T_1 - T_2) \quad (2)$$

Where $T_1$ and $T_2$ are the inlet and outlet temperatures respectively $$\text{Here } T_1/T_2 = (P_1/P_2)^{(\gamma-1)/\gamma} \quad (3)$$

For Isentropic Expansion Process

By the energy conservation law, the work done on the compression of both the $CO_2$ and $N_2$ gases in the N-stage compressor is equivalent to the sum of their individual compressions, and for a reduced compression work as possible, N is taken as 15 (number of compressors) in this study.

The properties of $CO_2$ are $c_p = 0.8464$ kJ/kgK and $\gamma = 1.288$; and the states are N=15 stages, $P_y = 26.47$ bars, $P_x = 1.01325$ bars and $T_x$ is taken as 25° C. (298.15 K) after cooling by ambient water. Then from Equation 1, the specific compression work on the $CO_2$ gas will be $$W_C = (0.8464)(298.15)(15)[(26.12)^{0.0149} - 1]$$

$$= 188.51 \text{ kJ/kg}$$

($T_x$ is the temperature of $CO_2 + N_2$ mixture at state $b_1$ (FIG. 1), and it is assumed to be ambient i.e. 25° C.).

Also the properties of $N_2$ are $c_p = 1.0404$ kJ/kgK and $\gamma = 1.400$; and the states are N=15 stages, $P_y = 26.47$ bars, $P_x = 1.01325$ bars and $T_x$ is taken as 25° C. (298.15 K) after cooling by ambient water. Then from Equation 1, the specific compression work on the $N_2$ gas will be $$W_C = (1.0404)(298.15)(15)[(26.12)^{0.019} - 1]$$

$$= 297.79 \text{ kJ/kg}$$

For the temperature ($T_2$) of the nitrogen gas at stage i (i.e. exhaust temperature) (FIG. 1) to be achieved at the boiling point of nitrogen (−195.8° C.) (77.35 k) at atmospheric pressure (1.01325 bars) for the capture of $CO_2$ (boiling pt. of −191.5° C.), the temperature $T_1$ at stage g (FIG. 1) from equation 3 will be $$T_1 = T_2(P_1/P_2)^{(\gamma-1)/\gamma}$$

$$= 77.35 \text{ k } (26.471/1.01325)^{0.2857}$$

$$= 77.35 (2.5406)K$$

$$= 196.52K \ (-76.63° \text{ C.})$$

The pressure at stage h (FIG. 1) at the boiling point of NO (−152° C.) (121.15 k) for the capture of NO under pressure will be $$P_h = P_g(T_h/T_g)^{\gamma/(\gamma-1)}$$

$$= 26.49 \ (121.15/196.52)^{3.5}$$

$$= 4.87 \text{ bars}$$

Hence from Equation 2, the specific work output ($W_t$) by the 2-stage turbine will be $$W_t = 1.0404 \ (196.52 - 121.15) + 1.0404 \ (121.15 - 77.35) \text{ kJ/kg}$$

$$= (78.41 + 45.57) \text{ kJ/kg}$$

$$= 123.98 \text{ kJ/kg}$$

In coal fired power plants the average constituents for 1.00 kg of dry flue gases containing $CO_2$ and $N_2$ is estimated at 0.25 kg for $CO_2$ and 0.75 kg for $N_2$ (Rogers and Mayhew 1992). While in gaseous fuelled power plants the average constituents for 1.00 kg of dry flue gases containing $CO_2$ and $N_2$ is estimated at 0.15 kg for $CO_2$ and 0.85 kg for $N_2$ (Rogers and Mayhew 1992).

Therefore, for 1.00 kg of dry flue gases in a coal fired plant, the compression work input for $CO_2$ will be (0.25) kg×(188.51) kJ/kg=47.13 kJ, and (0.75) kg×(297.79 kJ/kg)= 223.34 kJ for $N_2$, given a specific compression work input of 47.13 kJ+223.34 kJ=270.47 kJ/kg for the mixture of the gases (0.25 kg $CO_2$ plus 0.75 kg) $N_2$ by the energy conservation law.

By the above method, the gaseous fueled (or gas fired) plant will have a specific compression work input of 281.40 kJ/kg for the mixture of the gases.

Since the specific work output of the turbine is 123.98 kJ/kg, the turbine work from the nitrogen in the flue gases in a coal fired plant is estimated at (0.75) kg×(123.98) kJ/kg=92.99 kJ, and that from a gaseous fueled plant is estimated at (0.85) kg×(123.98) kJ/kg=105.38 kJ.

Therefore, the network input into the production of 0.25 kg of liquid $CO_2$ at state n from a coal fired power plant is estimated at 270.47−92.99=177.48 kJ, which is equivalent to 709.92 kJ per kg of liquid $CO_2$ at state n [FIG. 1]. 177.48 kJ is the net compression work in this invention per kg of flue gas containing 0.25 kg of $CO_2$ and approx. 0.75 kg of $N_2$ gas.

Also the network input into the production of 0.15 kg of liquid $CO_2$ from a gaseous fuel fired power plant is estimated at 281.40−105.38=176.02 kJ. 176.02 kJ is the net compression work in this invention per kg of flue gas containing 0.15 kg of CO2 and approx. 0.85 kg of $N_2$ gas (i.e., the dry flue gas containing 15% $CO_2$ gas), which is equivalent to 1,173.47 kJ per kg for liquid $CO_2$. It is to be remembered that though we have mainly considered flue gas produced in coal or natural gas power that uses normal air instead of pure oxygen for burning the fuel in this section, the technology should be applicable to flue gases from other industries where carbon and oxygen based fuels are burnt in air for energy.

I.3.3. Cryogenic Cooling Process of the Nitrogen Gas Contained in the Flue Gas

We have earlier described in details the methods involved in cooling the nitrogen gas of the flue gas.

The cooling process of the cold $N_2$ gas at state i starts with cooling the nitrogen gas from −10° C. to −76.63° C. in process (f-g) (FIG. 1) and in steps 12 to 14 of section I.1.

The heat reduction in this process for a coal fired plant is given as $$0.75 \times 1.0404 \times (-10+76.63) = 0.75 \times 1.0404 \times dt$$

dt=66.63° C. (which is the rise in the temperature of the cooling nitrogen in process (i-j)).

Hence the temperature of $N_2$ at state j will be $T_j$=−195.8+66.63=−129.17° C.

The heat reduction in cooling of the flue gas from ambient temperature (25° C.) to −10° C. in processes ($b_1$-$b_2$ ... d-$e_1$-$e_2$ in FIG. 1 corresponding to steps 6 to 11 in section I.1) is given as $$0.25 \times 258.62 + 0.75 \times 1.0404 \times 35 + 0.25 \times 0.8464 \times 35 = 0.75 \times 1.0404 \times dt$$

dt=127.35° C. (which is the rise in the temperature of cooling nitrogen in processes (j-k-l-m), summary of invention), where 258.62 kJ/kg in the latent heat of evaporation of $CO_2$, at saturated pressure of 26.49 bars.

Hence the temperature of $N_2$ at state m will be $T_m$=−129.17+127.35=−1.82° C.; which can be used to enhance the cooling water in the $NH_3$ power plant and the multi-stage compressor.

Similarly, the heat reduction for a gaseous fuel fired plant is given as $$0.85 \times 1.0404 \times (-10+76.63) = 0.85 \times 1.0404 \times dt$$

dt=66.63° C. (which is the rise in the temperature of the cooling nitrogen in process (i-j) in FIG. 1).

Hence the temperature of $N_2$ at state j will be $T_j$=−195.8+66.63=−129.17° C.

The heat reduction in cooling of the flue gas from ambient temperature (25° C.) to −10° C. in the said processes (i.e. steps 6 to 11 in section 1.6) is given as $$0.15 \times 258.62 + 0.85 \times 1.0404 \times 35 + 0.15 \times 0.8464 \times 35 = 0.85 \times 1.0404 \times dt$$

dt=83.90° C. (which is the rise in the temperature of the cooling nitrogen in processes (g to m in Summary of inventions and in steps 11 to 15 of section I.1).

Hence the temperature of $N_2$ at state m will be $T_m$=−129.17+83.90=−45.27° C.; which can also be used to enhance the cooling water in the $NH_3$ power plant and the multi-stage compressor.

Therefore, analyses have shown that with a nitrogen temperature of $T_i$=−195.8° C. (77.35 K) at state i for both the gaseous and coal fired plants, the cryogenic cooling procedure of the system will effectively cool the various gases to the required temperatures needed for carbon capture.

Thus the above analysis shows that using the methods of invention (as described earlier in details) to capture $CO_2$ from the flue gas emission in the form of liquid $CO_2$, the net energy required is (i) 1,173.47 kJ per kg of liquid $CO_2$ from the flue gas from natural gas power plants; (ii) 709.92 kJ per kg from coal power plants.

I.4. Total Energy Required for Carbon Capture Vs Output Power:

a. I.4.1 from Natural Gas Power Plants:

Also, from Global Trends and Patterns in Carbon Mitigation by Dr Clifford Jones, if gaseous fuel (methane) is used in generating the $1.4 \times 10^{18}$ J of electric energy (UK 2010), the estimated $CO_2$ emitted is 198 million tons, which is equivalent to $198 \times 10^9$ kg. In the above analysis of a gaseous powered plant the energy required to produce 1 kg of liquid $CO_2$ is estimated at $1,173.47 \times 10^3$ J/kg, therefore, the total energy required to produce $198 \times 10^9$ kg of liquid or dry ice $CO_2$ will be equivalent to $198 \times 10^9$ kg $\times 1173.47 \times 10^3$ J/kg=$2.323 \times 10^{17}$ J.

Now as shown earlier the auxiliary power generated by the ammonia power plants is: $2.795 \times 10^{17}$ J. Thus, the auxiliary power generated by the ammonia turbine is sufficient enough to capture the entire $CO_2$ of the flue gas emission from natural gas power plants. Thus, the capture of $CO_2$ and the associated toxic components from a natural gas power plants will leave a surplus energy of $4.7 \times 10^{16}$ J of energy, which translates to 237 MJ/ton of $CO_2$ avoided. This is not possible with technology of emission capture hitherto known. As mentioned earlier in the process the $N_2$ gas is cooled a few degrees above its (nitrogen gas) boiling point and it is sufficient to condense all the nitrous oxides and CO of the flue gas (flue gas from natural gas fired power plants does not contain usually sulfur oxides, mercury, HCl, $H_2S$). Thus, entire capture of emissions from the natural gas power plants can be accomplished using only the auxiliary power generated by the new technology of this invention. The total output power of the plant will remain untouched in this technology. As it does not require any chemicals/reagents unlike all existing technologies, it is the most cost-efficient of all existing other clean energy technologies that have been seen by the inventors.

Average cost of electricity in USA is ~$0.12 per kWH. With this rate the cost of converting the entire $CO_2$ to $LCO_2$ is $5.76 \times 10^9$. Now $LCO_2$ sells at $2-6 per kg. Even after adoption of this technology when $LCO_2$ will be abundantly available, if $LCO_2$ sells as low as S 0.15 per kg, the 198 million ton of $LCO_2$ will cost S $59 \times 10^9$ and thus the use of 1.4% of electrical power output will be well-paid off. It would be quite profitable for natural gas fired power plant to implement the new technology discussed in this paper.

b. I.4.2. From Coal Power Plants

If coal fuel (80% carbon content) is used, the estimated $CO_2$ emitted is 587 million tons, which is equivalent to $587 \times 10^9$ kg. In the analysis of a coal fired plant the energy required to produce 1 kg of liquid $CO_2$ is estimated at $709.92 \times 10^3$ J/kg; therefore, the total energy required to produce $587 \times 10^9$ kg of liquid $CO_2$ is equivalent to $587 \times 10^9$ kg $\times 709.92 \times 10^3$ J/kg=$4.17 \times 10^{17}$ J. Subtracting the auxiliary energy generated by the ammonia plant, the net energy required from the total output energy=$4.17 \times 10^{17}$ J−$2.795 \times 10^{17}$ J=$1.305 \times 10^{17}$ J. This is just 9.3% of the original total output energy before the auxiliary power plant and carbon capture. With $0.12 per kWh, this (i.e., capture of entire $CO_2$ emissions and the associated toxic components) would cost=$0.12 \times 1.305 \times 10^{17}$ J/3600000=$4.35 BN. This translates to energy expenditure of 223.3 MJ/ton (or, 62.1 kWh/t) of $CO_2$ avoided which costs $7.41 per ton of $CO_2$ capture at $0.12 per kWh, the latter being the average plant production cost of electricity. This is much lower than the projected capture cost of $CO_2$ at $30 per ton. This is much lower than the current energy demand for direct capture of $CO_2$ from air by the following techniques: (i) 200-300 kWh/t for amine based (Clime works (2018b), Z13; Vogel (2017), Z14); (ii)150-260 kWh/ton for amino-polymer (Ping et al 2018b), Z15; (iii) 997 kWh/ton using metal organic frame work (MOF), Sinha et al (2017) Z16; (iv) 694 kWh/ton using $K_2CO_3$,[Z17]. Xu et al's (Z18) simulation works show that using high pressure (>78 bars) and ambient temperature, condensation of $CO_2$ is possible at energy expenditure of 425 MJ/ton of $CO_2$. Comparing the cost of $CO_2$ capture per ton by various techniques to date [Z17] we find that our new technology provides the lowest cost $7.41 per ton for $CO_2$ captured from flue gas emission of coal power plants. The capture becomes profitable for the natural gas power plant.

It is to be noted that the liquefied $CO_2$ is a source of pure $CO_2$ (purity 99% or higher) which can be easily used in food industries, electronics industries, and research laboratories unlike the $CO_2$ captured with chemical based technologies. As of Jul. 16, 2018 the cost of direct capture of $CO_2$ (using alkali materials to absorb $CO_2$ from air and regenerating it by applying heat) has fallen from $600 per ton to $94-232 per ton [Sinha et al 2017] Sucking carbon out of the air won't solve climate change, https://www.vox.com/energy-and-environment/2018/6/14/17445622/direct-air-capture-air-to-fuels-carbon-dioxide-engineering]. The current cost of $CO_2$ capture from power plant flue gas by amines technique stand at $52-77 per ton. The minimum cost with the existing amine based technique of carbon capture is $65 per ton of $CO_2$ gas from the flue gas (Luis M. Romeo, Irene Bolea, Jesús M. Escosa, Integration of power plant and amine scrubbing to reduce $CO_2$ capture costs, Volume 28, Issues 8-9, June 2008, Pages 1039-1046]; [https://hub.globalccsinstitute.com/publications/global-status-ccs-2014/74-carbon-capture-cost].

For second-generation technologies (defined as those technologies that will be ready for demonstration in the 2020-25 time frame with deployment beginning in 2025) the US DOE has targeted a goal of reducing capture cost to US$40/t $CO_2$ [Carbon capture Cost-https://hub.globalccsin.stitute.com/publications/global-status-ccs-2014/74-carbon-capture-cost].

With our technology the $CO_2$ capture can be accomplished at a cost of $7.41 per ton, if the auxiliary power is used and $13.42 per ton, if auxiliary power is not generated (assuming electricity rate $0.12 per kWh). Thus, our technology is far more cost effective than any existing technologies and the technologies envisioned by DOE up to 2025. Moreover, with amine technologies, $SO_x$, $NO_x$ and mercury must be scrubbed using other existing technologies like FGD (Flue gas desulphurization), SCR (Selective non-catalytic Reaction), SNCR (Selective non-catalytic reaction) etc. The operating costs are very high with these techniques. If $SO_x$ and $NO_x$ are captured by amines, amines would be lost and the techniques would be much more costly and prohibitive. With our new methods of invention, the vast amount of unreacted $N_2$ of the flue gas is cooled a few degrees above the boiling point. This cold nitrogen gas accomplishes the capture of $SO_x$, $NO_x$ and Hg without any additional requirement of energy and hence cost.

The cost of pure liquefied $CO_2$ is $128 per ton and cost of dry ice is much more than this. BiofuelsDigest mentions the price of 1 ton of pure $CO_2$ to be $160 [http://www.biofuelsdigest.com/bdigest/2014/10/27/liquid-co2-or-liquid-gold-maybe-both-as-aemetis-adds-cofliquefaction-at-its-keyes-ca-plant/]. Even at half of the former price (i.e., $64 per ton) the 587 MT of pure $LCO_2$ would fetch $37.5 BN. Thus, the capture cost will be paid off with a very good profit left for the power plants with this technology. The new technology allows complete capture (100%) of $CO_2$ and the toxic gases such as $SO_3$, $SO_2$, $NO_2$, NO, CO etc. each separately. It involves no use of chemicals or reagents unlike the existing state-of-the-art technologies for clean coal. The additional cost of capture of these toxic gases with the new technology is insignificant compared with the huge cost with existing technologies as discussed in the beginning.

*An overview of current status of carbon dioxide capture and storage technologies—Edward S. Rubin, John E. Dawson, Howard J. Herzog, International Journal of Green House and Gas Control, vol. 40, P. 378-400. https://doi.org/10.1016/j.ijggc.2015.05.018

Cost of Carbon Capture Using Existing Amine Technology and Comparison with Our Technique.

According to DOE estimate (2014) the cost of $CO_2$ capture at 2012 dollar value is $61 per ton of $CO_2$ avoided. According to MIT estimate, using the EMAR technique (Electrochemically mediated amine regeneration technique, the projected cost of $CO_2$ capture is coming down to $45-55 per ton of $CO_2$ avoided. With the existing cost of $SO_2$ capture it costs $200 as the materials and energy cost to capture 1 ton of $SO_2$ (sulfur dioxide) avoided. With our novel invention the cost of $CO_2$ avoided is $8 per ton of $CO_2$ avoided. With our technique, this cost includes also capture of associated components from coal power plants. These associated components are: mercury vapor, acid vapors, $SO_3$, $SO_2$, $N_2O$, NO, $NO_2$, CO. Thus, the latter components are also captured with our new technology with no additional cost. This is not possible with any other existing technology. It needs to be noted that this technology may not capture all of mercury vapor, but only part of it as the mercury content is quite small, specially after capture of some part in steps 1 through 7 in this specification.

II. THE MAJOR ADVANTAGES OF THE NEW TECHNOLOGY OVER THE EXISTING TECHNOLOGIES IN CAPTURING INDUSTRIAL CARBON a. Our technology is far more economical and cost saving compared to existing technologies of carbon capture and including those cryogenic capture technologies that have been attempted in the past [Ref. T1, T2, T3, T4]. Cryogenic capture technology in the past required 660 kWh of energy per ton of $CO_2$. With our technology, excluding the auxiliary power generation, it requires 197-198 kWh of energy per ton of captured liquefied co, if flue gas is from coal power plant. With the auxiliary power, the technique requires only 62 kWh of energy per ton of liquid $CO_2$ or dry ice capture. For the flue gas from natural gas power plant, our technology requires 0.327 kWh of energy per ton of $LCO_2$ capture, if we exclude auxiliary power generated from the heat of the flue gas. The auxiliary power generated is sufficient enough to capture the entire $CO_2$ emissions from natural gas power plants, without putting any stress on energy output. Thus our technology is superior to that of the past cryogenic technology. Our technology is much energy efficient compared to the amines techniques of $CO_2$ separation from flue gases. The energy requirement in the amine technologies range from $3\times10^9$ J (833 kWh) to $3.7\times10^9$ J (1027 kWh) [Z1-Z4] per ton of $CO_2$ capture, which is much higher than that of our technology. With or without the auxiliary power generation method of our technology, the net energy stress is the minimal of all existing technologies of $CO_2$ capture. The overall cost of capture of $CO_2$ by amine-based technique stands currently at $52-77 per ton. Using existing cryogenic carbon capture technologies (different from ours) $CO_2$ can be captured at a cost of $35/ton avoided. The cost drops to $14/ton avoided [23], when the additional benefits of the cumulative effects of cryogenic carbon capture are considered. The corresponding cost in our case is either zero or negative. Moreover, unlike existing technologies of $CO_2$ capture, our technologies capture all components of flue gas emissions including mercury, sulfur oxides, nitrogen oxides and carbon monoxide. With the existing technologies, capture of these components involve huge additional capital and operating costs as they require constant use of chemicals/reagents.

b. Our technology captures industrial carbon dioxide in the form of liquefied or frozen (dry ice) which is a pure form of carbon dioxide (purity 99% or higher) unlike the impure carbon dioxide captured with existing technologies. The liquefied or dry ice form of $CO_2$ has tremendous industrial applications and can be used up faster than gaseous $CO_2$. These can also be stored in well-insulated container much longer than gaseous $CO_2$ which require high pressure vessel. It can be transported to far distance better than gaseous $CO_2$ as the latter requires long pipe lines to be built, maintenance of which can be problematic in many countries.
  c. The cost of capture of $CO_2$ from coal power plant with our technology can be recovered by selling a fraction such as 6.5% of the captured $LCO_2$ or 1% the total dry ice captured. The other captured products can also find good market.
  d. There is no energy cost (from the power output of the main power plant) to capture $CO_2$ from natural gas power plant using this new technology. In the claims below the term "the said cold nitrogen gas" refers to the cold nitrogen gas obtained at the end of the third turbine expansion and this cold nitrogen gas as it flows in reverse direction through different heat exchangers.

Industrial Uses of the Components of the Flue Gas from Power Plants Captured by the Methods of this Invention:

Use of Liquid $CO_2$ and Dry Ice

As said clearly in the specification, the $CO_2$ of the flue gas from power plants is captured in the form of cold liquid $CO_2$ and which can be converted to dry ice by a method of this invention. The methods are also applicable to any industries emitting $CO_2$, such as steel and cement which emit $CO_2$ and associated toxic components. The liquid $CO_2$ and dry ice are both sources of very pure $CO_2$ (purity greater than 99.9%). These have large number of applications, which can be met by the captured liquid $CO_2$ or converted dry ice. Some of these applications, but not limited to are:

Refrigeration and freezing in food processing and production.
Refrigeration and freezing in food processing and production
Shield gas in welding applications to prevent weld oxidation
pH balance in water treatment plants
Fire suppression systems
Plant growth stimulation in greenhouses
Enhanced oil recovery of oil and gas wells
Food and Beverages
Chemicals, Pharmaceuticals and Petroleum Industry
Health Care
Rubber and Plastics Industry
Environmental Uses
Metals Industry
Manufacturing and Construction Uses
Dry ice for restaurants and supermarkets
Dry ice in the medical field
Dry ice blasting
Fire remediation
Cleaning electrical motors and printing presses Uses of Nitrous oxide ($N_2O$)
Nitrous oxide has significant uses:
  medical uses: surgery and dentistry, for its ($N_2O$) anaesthetic and pain reducing effects.
  Recreational use as a dissociative anaesthetic.
  It is on the World Health Organization's List of Essential Medicines, the most effective and safe medicines needed in a health system.[3] It is also used as an oxidiser in rocket propellants, and in motor racing to increase the power output of engines.

Uses of Nitrogen Dioxide ($NO_2$)
Catalyst in Certain Oxidation Reactions;
as an inhibitor to prevent polymerization of acrylates during distillation;
as a nitrating agent for organic compounds; as an oxidizing agent;
as a rocket fuel;
as a flour bleaching agent and in increasing the wet strength of . . .
as an intermediate in the manufacturing of nitric acid,
as an oxidizer in rocket fuel, Uses of Nitric Oxide (NO)
As an muscle relaxer to widen blood vessels
As an intermediate in chemical industry, specially for manufacture of nitric acid Uses of $SO_3$
As an intermediate in manufacture of sulfuric acid, other chemicals and explosives
As an essential reagent in sulfonation reactions for making detergents, dyes, and pharmaceuticals.

Uses of $SO_2$
  In the preparation of sulfuric acid, sulfur trioxide, and sulfites,
  as a disinfectant,
  as a refrigerant,
  as a reducing agent,
  as a bleach,
  as and a food preservative, especially in dried fruits.

Uses of CO(Carbon Monoxide)
  In a variety of industries for a wide range of applications including:
    Metal Fabrication: Used in fuel gas mixtures with hydrogen and other gases for industrial and domestic heating.
    Chemicals: In the manufacture of a variety of chemicals such as acids, esters and alcohols.

We claim:

1. An equipment that can be connected as a bolt-on to a flue gas emission line from a power or industrial plant in general, for cost-effective and energy-efficient capture of emission components from an industrial flue gas, the flue gas containing but not limited to Carbon Dioxide (CO2), mercury vapor, oxides of sulfur, oxides of nitrogen, acid vapors, each component being captured separately, without using any chemical/reagent, without using any storage systems for refrigerants and using only fixed amount of water that is repeatedly usable and for production of large amount of liquefied CO2 and a frozen dry ice, which are sources of very pure CO2, the equipment comprising:
  a. a plurality of chambers containing a plurality of ceramic filters to remove a fly ash including oxides of mercury from the said flue gas;
  b. a plurality of fabric filters and a plurality of electro static precipitators to remove a soot, smoke, and floating particles such VOCs (volatile organic compounds) from the said flue gas;
  c. an ammonia super heater with an ammonia turbine for generation of an auxiliary power using a heat of the flue gas via a turbine expansion of an ammonia, a surface of the ammonia super heater chamber is coated with a film of material with high heat absorptivity and low emissivity, said film of materials being nickel oxide;
  d. an ammonia-condenser, for the ammonia to cool further and condense the ammonia after the turbine expansion and a pump to push the cooled ammonia to capture some of the heat with a first heat exchanger from the said flue gas;

e. a plurality of a first type of heat exchanger comprising, the first heat exchanger, a second heat exchanger, a third heat exchanger, a fourth heat exchanger, a fifth heat exchanger, a sixth heat exchanger and a seventh heat exchanger, wherein all of said heat exchangers contain water, the first heat exchanger, the third heat exchanger, the fifth heat exchanger, and the seventh heat exchanger each having a collecting chamber for cooling and capturing components including Hg vapor, H2O, SO3, NO2 which have a boiling point above 0° C. from the said flue gas, the heat exchangers containing water within a heat exchanger chamber which is cooled by passing a cold nitrogen gas through a plurality of tubes wrapped around a flue gas tube, the tubes all being embedded in the water inside the heat exchanger chamber, wherein the flue gas tube is made of materials that can stand a temperature up to 300° C. and with high heat conductivity (>100 W/m·K) and non-corrosive to a toxic components, said toxic components comprising SO3, SO2, N2O, NO and acid vapors contained within the flue gas;

f. a plurality of a second type of heat exchanger for cooling and capturing components of a flue gas with boiling point below 0° C., the cooling being accomplished by passing a very cold nitrogen gas having a temperature between −194 C to −195 C, in a direction opposite to a direction of flow of flue gas, through a coil of a tube that surrounds the coil of a tube carrying the flue gas, the coil of the tube and the tube carrying the flue gas being embedded within each of the plurality of second type of heat exchangers;

g. the plurality of second type of heat exchangers each containing conducting pebbles or metal chips arranged on a plurality of racks surrounding the flue gas flow tube and a heat exchanger chamber containing helium gas for superior heat conduction (compared to air or vacuum) for the capture of components with boiling point below 0° C. in the flue gas flow tubes;

h. the flue gas-flow tubes and cold nitrogen gas flow tubes of the plurality of second type of heat exchangers being made of materials that can tolerate temperatures up to 300° C. and low temperatures down to −195 C in respect of no structural changes in these temperature range and that have high thermal conductivity (>100 W/m·K), an external surface of the flue gas flow tube painted black for superior heat radiation inside the heat exchanger for further enhancement in cooling of flue gas and an internal surface being coated with toxicity resistant materials, wherein a portion of the flue gas lines and cold nitrogen gas lines extend outside the heat exchangers and are insulated;

i. Fifteen compressors to compress the said flue gas to specific pressures and at specific temperatures required during the capture processes;

j. wherein at least one of the chambers is for condensation of a CO2 of the flue gas and for rapid collections of liquefied CO2 while a non-condensed component of the flue gas can pass to other heat exchangers for further processing;

k. a flash chamber for throttling of liquefied CO2 and an arrangement for production of dry ice, wherein a cooling and freezing of a dry ice vapor and the dry ice is accomplished by passing the very cold nitrogen gas exiting from the flash chamber to enter the a twelfth heat exchanger, so that the very cold nitrogen gas from the twelfth can cool a condenser to condense a nitrous oxide, with an arrangement for collection of dry ice from the flash chamber, the flash chamber being airtight to prevent the cold nitrogen gas escaping to outside air;

l. a first turbine expander, a second turbine expander, and a third turbine expander for performing the turbine expansion of flue gas;

m. a metallic chamber embedded in an insulating chamber for rapid condensation & collection of a liquefied N2O of the flue gas, after the first turbine expander causes expansion of the compressed flue gas, said metallic chamber including an arrangement for cooling the chamber to a temperature 6 to 10 degrees below the boiling point of N2O at 1 bar by the very cold nitrogen gas flowing through the insulating chamber, the very cold nitrogen gas being obtained after condensation of a carbon monoxide following a third turbine expansion of the flue gas by the third turbine expander;

n. a second metallic chamber embedded in a second insulating chamber for rapid condensation & collection of liquefied NO of the flue gas, after the second turbine expander causes expansion of the compressed flue gas, with an arrangement for cooling the chamber to a temperature 10 to 14 degree below the boiling point of NO at 1 bar by the very cold nitrogen gas flowing the very through the second insulating chamber, o. a third metallic chamber embedded in a third insulating chamber for rapid condensation & collection of liquefied CO (carbon monoxide) of the flue gas, after a third turbine expansion of the third turbine expander causes expansion of the compressed flue gas, with an arrangement for rapid collection of the condensed CO, wherein the very cold nitrogen gas is pumped a reverse direction (opposite to the direction of flow of the flue gas) to cool the the twelfth heat exchanger;

p. a plurality of split lines to pass the said cold nitrogen gas through different first, second, third, fourth, fifth, sixth, seventh and twelfth heat exchangers a portion of the split lines that extend outside the heat exchangers are covered with thermally insulating materials;

q. a plurality of temperature sensors & a temperature controller and a plurality of pressure sensors and a plurality of pressure controllers and a gas flow meter for said very cold nitrogen gas flow and the flue gas;

r. insulation materials to thermally insulate the all of the heat exchangers, all of the condensing chambers and a plurality of connecting flow lines, through which flue gas and the very cold nitrogen gas pass and the coatings of tubes, and the ammonia superheat surface being applied prior to the use of the apparatus.

2. A method of generation of auxiliary power from a heat of a flue gas using an anhydrous ammonia comprising, Providing the apparatus of claim 1;

the anhydrous ammonia entering the ammonia super heater chamber through a port after collecting the heat delivered by a flue gas in a first heat exchanger, an electrostatic precipitator and a fabric filter, the said super heater chamber being situated in a second chamber of fly ash removal unit to collect the heat of flue gas as the flue gas enters a first chamber of the fly ash removal chamber containing a plurality of ceramic filters, and leaves through a port of a second chamber of the fly ash removal unit, said second chamber also containing a plurality of ceramic filters, the heat collection of the ammonia from the flue gas is enhanced by a coating of a material with high heat absorptivity (with absorptivity ≥0.92) and low emissivity (emissivity ≤0.08), wherein said material is nickel oxide, and thus raise the temperature and pressure of the anhydrous ammonia to 200° C. and 200 bars respectively within the ammonia super heater chamber, the superheated and pressurized anhydrous ammonia coming out of the ammonia chamber through an exit port drives and is expanded by an ammonia turbine, for auxiliary power generation, the ammonia after said turbine expansion being cooled and condensed by pushing into an ammonia-condenser containing water cooled by passing a cold nitrogen gas into the first heat exchanger and then through the said electrostatic precipitator and fabric filter by means of a pump to complete the cycle of auxiliary power generation, the efficiency of auxiliary power generation is 24.67%.

3. A method of removing or capturing steam (boiling point 100° C.), sulfur trioxide ($SO_3$, boiling point 44.9° C.;), and mercury (Hg, boiling point 356.7° C.) vapor of a flue gas from a power plant after removal of a fly ash of the flue gas by passing the said flue gas through a plurality of ceramic filters, an electrostatic precipitators and a plurality of fabric filters, the fly ash that may contain oxides of mercury, soot and volatile organic compounds (VOCs) as well, the said method comprising:
providing the apparatus of claim 1;
performing three successive steps of partial removal of steam, $SO_3$ and mercury vapor:
(i) passing through a condensing coil embedded in a first heat exchanger, that is used for cooling ammonia to collect heat from the flue gas;
(ii) further cooling of the flue gas by passing through a second heat exchanger of the first type kept at 45±2° C., and then compressing the flue gas to 2 to 3 bars using a compressor and then further passing the compressed flue gas through a third heat exchanger of the first type maintained at 35±2° C., the temperature being controlled by passing a cold nitrogen gas through a coil of tube surrounding a coil of tube through which the flue gas passes, the coils being kept inside water in said heat exchanger;
(iii) further cooling of the compressed flue gas to a temperature 30 C±2° C., by passing through a fourth heat exchanger of the first type and then compressing the flue gas to 4.5 bars by a second compressor and further cooling to 25±2° C. through a fifth heat exchanger of the first type, said fifth heat exchanger containing water cooled by the flow of cold nitrogen gas flowing in a direction opposite to a direction of flow of the flue gas, the cold nitrogen gas having been obtained after an expansion of the flue gas by a third turbine expander.

4. A method of removal of $NO_2$ (nitrogen dioxide, boiling point 21° C. at 1 bar) and complete removal of a remaining steam and a further removal of a mercury vapor that may still remain (due to its low concentration in a flue gas) after removal of $SO_3$ (sulfur trioxide), mercury vapor and steam by method of claim 3, further comprising steps subjecting the remaining flue gas to isentropic compression to 5.5 bars first by the third compressor and then cooling to 18±2° C. by passing the compressed flue gas through a coil of tubes in a sixth heat exchanger of the first type, that contains water cooled by passing the cold nitrogen gas in a plurality of tubes wrapped around said coil of flue gas tubes and then further subjecting the flue gas to an isentropic compression to a pressure of 7 bars by a fourth compressor and further cooling the compressed flue gas by passing through a coil of tubes kept in a 7th heat exchanger of the first type that contains water which is cooled to 8±2° C. by the reverse flow of cold nitrogen gas, this method completing the capture of steam of the flue gas, needed to avoid choking of compressors due to ice formation, and used for the capture of components with boiling points below 0° C., with arrangement for the condensates being collected as the flue gas passes above the condensates in the coil of flue gas tubes in the said heat exchangers.

5. A method of capturing sulfur dioxide ($SO_2$, boiling point $-10°$ C. at 1 bar pressure) wherein the sulfur dioxide has a concentration estimated at 0.1% to 1% by volume in a flue gas from a power plant) of the flue gas from the power plant, after capture of $NO_2$ and the remaining steam of the flue gas by method of claim 4, the method of capturing $SO_2$ further comprising, subjecting the flue gas remaining after capture of $NO_2$ to pressure of 8 to 9 bars by a fifth compressor and passing the compressed flue gas through an eighth heat exchanger, which is of the second type that contains a plurality of conducting pebbles or metal chips arranged on a plurality of racks, an inside of the eight heat exchanger being kept at $-14±2°$ C. by the controlled flow of cold nitrogen gas using either of the two ways:
(i) passing the cold nitrogen gas through a port of the eighth heat exchanger to cool the plurality of pebbles and a flue gas tube before the nitrogen gas exits through a second port in the eighth heat exchanger or,
(ii) passing the cold nitrogen gas through a tube that surrounds the said flue gas tube and with a chamber kept air-tight but filled with a helium gas at ~2 bars which is circulated by a fan;
the flue gas pressure being at 8 to 9 bars which causes a raising both a concentration of sulfur dioxide ($SO_2$) weight by volume and a boiling point of liquid $SO_2$ to enable the SO2 to be liquified at temperature $-5°$ C. to $-10°$ C. inside a bottom part of a U-tube, which acts as a condensing coil in the eighth heat exchanger, and is kept at $-14±2°$ C., while an uncondensed part of the flue gas passes through a connecting tube to an exit port for further processing, with further arrangement for the condensed $SO_2$ to be collected from the U-tube part of the flue gas tube, for use in an insulated collector tank as the condensed liquid runs down through a slanting pipe connected to bottom of each U-tube of the flue gas tube, to the insulated collector tank.

6. A method of capturing $CO_2$ of the flue gas (a) remaining after capture of $SO_2$ (for flue gas from a power plant) of claim 5 further comprising the steps of:
(i) subjecting the flue gas, to a final pressure of 26.5 bars to 27 bars, the compression being carried out by 10 additional compressors in succession, each compression being isentropic and at approximately equal step (~1.9 bars to 2 bars by each of the 10 compressors) and each compression being followed by cooling the compressed gas at a second type of heat exchanger of the second type, each the second type of heat exchanger maintained at a temperature of $-18±2°$ C., by the controlled flow of the cold nitrogen gas, so that the compressed flue gas cools to a temperature of ~$-10°$ C. to $-12°$ C. after each compression and so that after the final isentropic compression of 26.5 bars, the $CO_2$ of the compressed flue gas inside a flue gas tube located inside the second type of heat exchanger, attains the temperature of $-10°$ C. to $-12°$ C. to enable the $CO_2$ of the flue gas to condense as a liquefied $CO_2$ ($LCO_2$) in a bottom part of the flue gas flow tube, with arrangement for the $LCO_2$ either being collected in a collection chamber attached to a slanting pipe that is connected to the bottom of the said flue gas tube, or, being sent to a flash chamber (FC) for production of dry ice, the chambers or collecting vessels, and plurality of pipes being insulated using materials with thermal conductivity 0.02 W/m·K to 0.03 W/m·K, and kept air-tight; the uncondensed part of the flue gas flowing out through an outlet port of the said flue gas tube to the inlet port of another one of the plurality of heat exchanger of second type, for further processing of the flue gas.

7. A method of production of dry ice and rapid collection of dry ice after its production, using the liquefied $CO_2$ obtained from a flue gas by method of claim 6, further comprising the steps that the liquefied $CO_2$ ($LCO_2$) collected in the said collection chamber flows along an insulated line (insulated with materials of Kth ~0.02 W/m·K and of thickness 0.15 m to 0.20 m), for $LCO_2$ to be throttled by opening a throttle valve into an insulated flash chamber, thereby the $LCO_2$ been converted to a solid dry ice (DI) and a cold vapor $CO_2$ (VC) in the said flash chamber, the VC being further converted to additional solid dry ice (DI), while the earlier formed solid dry ice (DI) being further frozen by passing a cold nitrogen gas at −194° C. to −195° C., into the chamber FC through an inlet port, the cold nitrogen gas exiting the through an outlet port, going back to a twelfth heat exchanger chamber that is placed before the second turbine expander; the dry ice thus formed in the said flash chamber (FC) being collected automatically into an insulated chamber with the help of two mechanical valves that prevent the cold nitrogen gas from escaping from the flash chamber and also keep the flash chamber air tight.

8. A method, after capturing $CO_2$ of the flue gas in the form of liquefied $CO_2$ ($LCO_2$) by method of claim 6, of capturing nitrous oxide ($N_2O$, boiling point −88.5° C. at 1 bar) contained in the remaining flue gas, comprising the following steps:
 (i) the flue gas remaining after capture of $CO_2$ (as $LCO_2$) pass from a 9th heat exchanger to a 10th heat exchanger, the 10th heat exchanger being of the second type which is maintained at a temperature of −50° C. to −60° C., the temperature being maintained by the flow of cold nitrogen gas, an 11th heat exchanger is maintained at temperature −96±2° C. by passing the cold nitrogen gas through the 11th heat exchanger, and
 (ii) the cold compressed flue gas coming out from the 10th heat exchanger undergo first an isentropic turbine expansion at the first turbine expander, from pressure 26.5 bars to a pressure of 13.3 bars to 15.6 bars, depending on the initial temperature of the flue gas (−60° C. to −50° C.), the isentropic expansion reducing the flue gas temperature to −89.9° C., and a pressure of ~14 bars which is below the boiling point of $N_2O$ −88.5° C. at atmospheric pressure, the $N_2O$ of the flue gas thus being condensed to a liquid $N_2O$ and
 (iii) the flue gas with the condensed liquid $N_2O$ being led through an inlet port into a metallic condensing chamber an inside of which is kept at temperature ~−96° C.±2 and the flue gas exiting, after condensation of $N_2O$ in the said chamber, through an outlet port of the said metallic chamber to enter a twelfth heat exchanger, the chamber of 11th heat exchanger being maintained at −96±2° C. inside an insulated jacket chamber through the controlled flow of cold nitrogen gas which enters the said insulated jacket through an inlet port and exits through an outlet port of the insulated jacket to then enter the 10th heat exchanger, the condensed liquid $N_2O$ inside the metallic chamber trickles down through a slanting base and is collected into an insulated container by opening a tap valve connected to the said metallic chamber, the tap valve and the insulated container being outside the insulation of the insulated jacket chamber.

9. A method of capturing nitric oxide (boiling point −152° C. at I bar pressure) of a flue gas from a power plant, after capture of $N_2O$ by method of claim 8, said flue gas being at a pressure ~14 bars and temperature ~−96±2° C. as it comes out of the exit port after condensation of $N_2O$, to a further cooling to a temperature of −108±2° C. by passing it through the twelfth heat exchanger, which is cooled by passing of the cold nitrogen gas flowing in reverse direction through two cold nitrogen gas carrying lines joining into a single line before entering the twelfth heat exchanger, thus resulting in a cooled flue gas coming out of the twelfth heat exchanger, to a isentropic expansion by the second turbine expander, the expansion being carried from initial pressure ~14 bars to a pressure ~4.87 bars and thus decreasing the temperature of the flue gas from about −108° C. to −155° C., the flue gas then being directed through an inlet port of a second metallic condensate-collection chamber, whereby the condensed nitric oxide condenses and collects as a liquid nitric oxide in the said metallic chamber which is kept at a temperature of −165±2° C. inside an insulated chamber, the cooling of the metallic chamber to the said temperature −165±2° C. being performed, using the cold nitrogen gas coming from the the third turbine expander, and entering through a cold nitrogen inlet port and exiting through an outlet port to enter the twelfth heat exchanger, the liquid nitric oxide condensate as it runs down a slanting base of the said metallic chamber is collected in an insulated container by opening a valve, while the uncondensed flue gas at pressure ~4.87 bars, leaving the NO collection chamber, enters the third turbine expander for further expansion.

10. A method of capturing carbon monoxide of the flue gas after capture of nitric oxide by method of claim 9, the method further comprising:
 (i) subjecting the flue gas coming out of the NO collection chamber at pressure 4.87 bars and at temperature −155° C., to an isentropic expansion by the third turbine expander from 4.87 bars to atmospheric pressure (~1 bar), thereby reducing the temperature of the flue gas to ~−195° C.,
 (ii) directing the expanded & cooled flue gas into a third metallic condensate-collection chamber, the expanded flue gas enters the metallic chamber contained in an insulated chamber, thereby dropping the condensed liquid carbon monoxide (CO) into the metallic chamber and the uncondensed flue gas from the metallic chamber, escaping through an outlet-port of the metallic chamber, the uncondensed flue gas being a nitrogen gas mostly, except trace amount of impurities such as noble gases, very small amount of mercury vapor that could not be condensed due to extreme low concentrations in parts per billion range at a temperature of −195° C. to −194° C., the uncondensed flue gas is pumped back in reverse direction to cool the plurality of heat exchangers and then to either exit to atmosphere or to be collected for use by industries.

11. A method of producing cold (at temperature −194° C. to −195° C. and at 1 bar) nitrogen gas with a purity of ~99.9% from the flue gas of a power plant after capture of condensed carbon monoxide by the method of claim 10, and using the cold nitrogen gas in cooling the the plurality heat exchangers used in cooling, condensing and capturing the various components of the flue gas, the plurality of heat exchangers from the twelfth to second in a reverse direction, which is a direction opposite to a direction of flow of the flue gas whose components are to be captured, the nitrogen gas after exiting from second heat exchanger is either collected for use or exited to atmosphere.

12. A method as described by claim 11, wherein the capturing of $CO_2$ of the flue gas of a coal power plant is done using no chemicals and using a fixed amount of water that is repeatedly usable, and only a small amount energy for the flue gas, to produce a liquefied $CO_2$ from the $CO_2$ that has been captured.

13. A method as described by claim 11, wherein the capturing of the flue gas $CO_2$ of a natural gas power plant using no chemicals and using only a fixed amount of water that is repeatedly usable, and no additional energy being needed from the power plant or any other energy source while the method produces an energy surplus from the flue gas of the natural gas power plant, if the flue gas temperature entering the capture equipment is between 250° C. and 350° C.; the $CO_2$ is captured in the form of liquefied $CO_2$.

14. Methods of capturing $CO_2$, $NO_2$, NO, CO in the flue gas from a natural gas power plant and capturing $CO_2$, $SO_3$, $SO_2$, partial mercury, $NO_2$, NO, CO in the flue gas from a coal power plant as described by claim 11 above wherein each component is captured separately, using no chemicals but only a fixed amount of water that is repeatedly usable, at costs significantly lower than the costs of capture of $CO_2$ by existing arts and thus to enable clean energy generation for clean environment.

15. Using an equipment of claim 1 to perform methods of capturing carbon dioxide ($CO_2$) and components associated with $CO_2$ in the flue, such components being water ($H_2O$), nitrogen dioxide $NO_2$), nitrous oxide ($N_2O$), nitric oxide (NO) and carbon monoxide (CO) in the flue gas of a natural gas power plant, using no chemicals and requiring no extra energy other than the energy required for capture of $CO_2$ from the said natural gas power plant and a fixed amount of water, the use creating a surplus amount of auxiliary energy, 237 MJ, is generated per ton of carbon ($CO_2$) captured during the method of capture, the items $CO_2$, $NO_2$, $N_2O$, NO and CO each being captured separately in liquefied form.

16. Methods of claim 11 wherein the method reduces the net energy and hence the cost required to capture $CO_2$ and the associated components ($SO_3$, $SO_2$, $NO_2$, $N_2O$, NO and CO and some of the mercury vapor) in the flue gas of a power plant or from an industrial plant in general, through:
 (i) production of auxiliary power;
 (ii) production of very cold nitrogen gas (temperature, −194° C. to −195° C.) and using the very cold nitrogen gas to cool the heat exchangers utilized during the processes of capture of the various components of the flue gas;
 (iii) using the 15 compressors for isentropic compression of the flue gas at an average increment of approximately 1.8 to 1.9 bars by each compressor and cooling the flue gas after each isentropic compression;
 (iv) utilizing the turbine expansion works of 123.98 kJ/kg of nitrogen gas for the compression of the flue gas through the use of a common shaft that connects the turbines and the compressors, to reduce the compression works to a net compression works 177.5 kJ/kg of a flue gas containing 75% $N_2$ and 25% $CO_2$ (from a coal power plant) or to a net compression works 176.0 kJ/kg of a flue gas containing 85% $N_2$ and 15% $CO_2$ (dry flue gas from a natural gas power plant).

17. A method of capturing and producing a liquefied $CO_2$, and a frozen $CO_2$ (dry ice) from an industrial flue gas as described by claim 11 with a means of rapid collection of these items, without use of any chemical/reagent, except a fixed amount of water that is repeatedly usable and a small amount of energy (223.3 MJ/ton of $CO_2$ captured from the flue gas from a coal power plant, when the dry $CO_2$ concentration is 25% by weight)).

18. A method of capturing and producing liquefied $CO_2$, and frozen $CO_2$ (dry ice), from the flue gas of a natural gas power plant as described by claim 11, without use of any chemical/reagent, except a fixed amount of water and requiring no energy from the power plant or any other external source, when the temperature of the flue gas exiting from the natural gas power plant is 250° C. or more.

19. A method to capture $CO_2$, $NO_2$, $N_2O$ and CO, each component separately and in a form(s) that has industrial uses from the flue gas from a natural gas power plant as described by claim 11 wherein the method does not produce any secondary pollution and thus to help mitigate global warming and climate changes including effects on health and environment arising due to emissions of $CO_2$, $NO_x$ and CO from industries.

20. A cost-efficient method of capturing emission components $CO_2$, $SO_3$, $SO_2$, $NO_2$, $N_2O$, NO, and CO of a flue gas from a coal power plant or from any industries as described by claim 11, without requiring any chemical or reagent or a natural gas to be used as a refrigerant or any storage system for storing the refrigerant to cool the various components of the flue gas, the said method enabling the capture of each component in a liquid form or a solid form (for dry ice) that has industrial uses and the capture that can enable mitigation of global warming and climate changes including effects on health and environment arising due to emission of the said components in the most cost-efficient way and without producing any secondary emissions.

* * * * *